Inventors:
BERTRAM V. BOWDEN
FRANZ KOENIGSBERGER
JOSEPH K. ROYLE

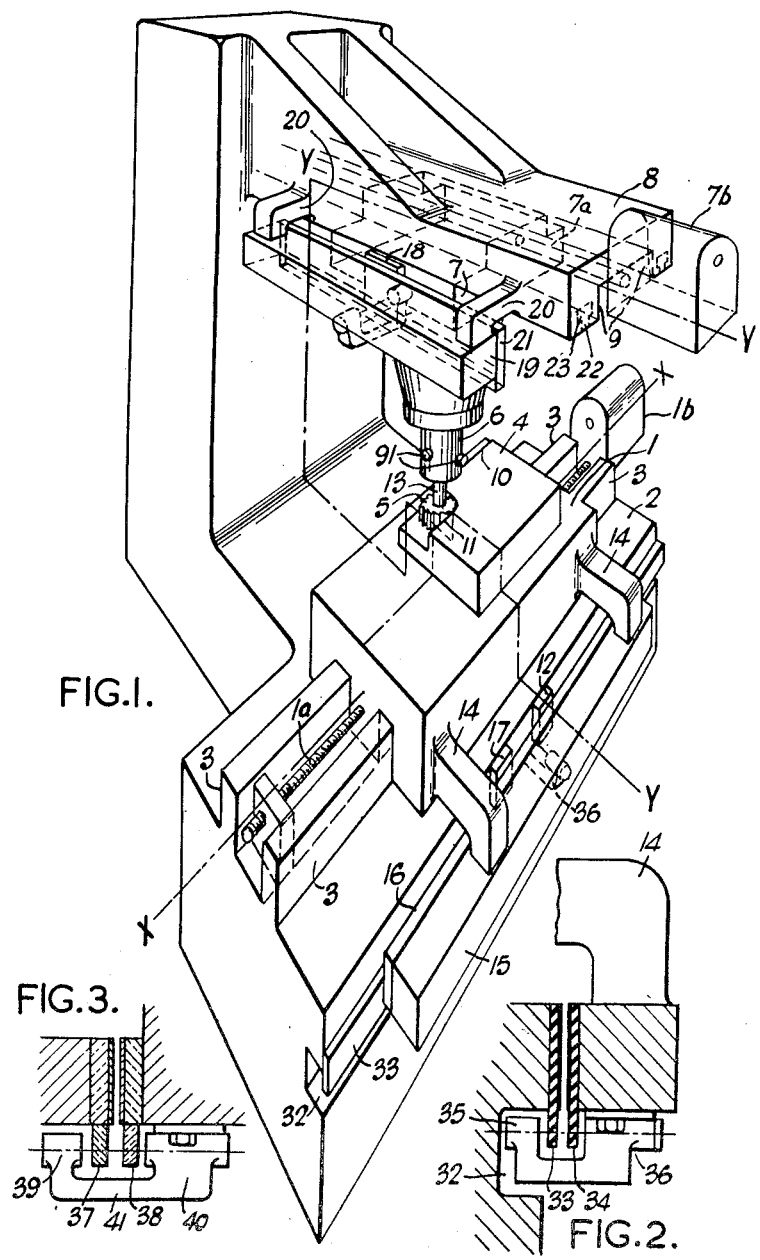

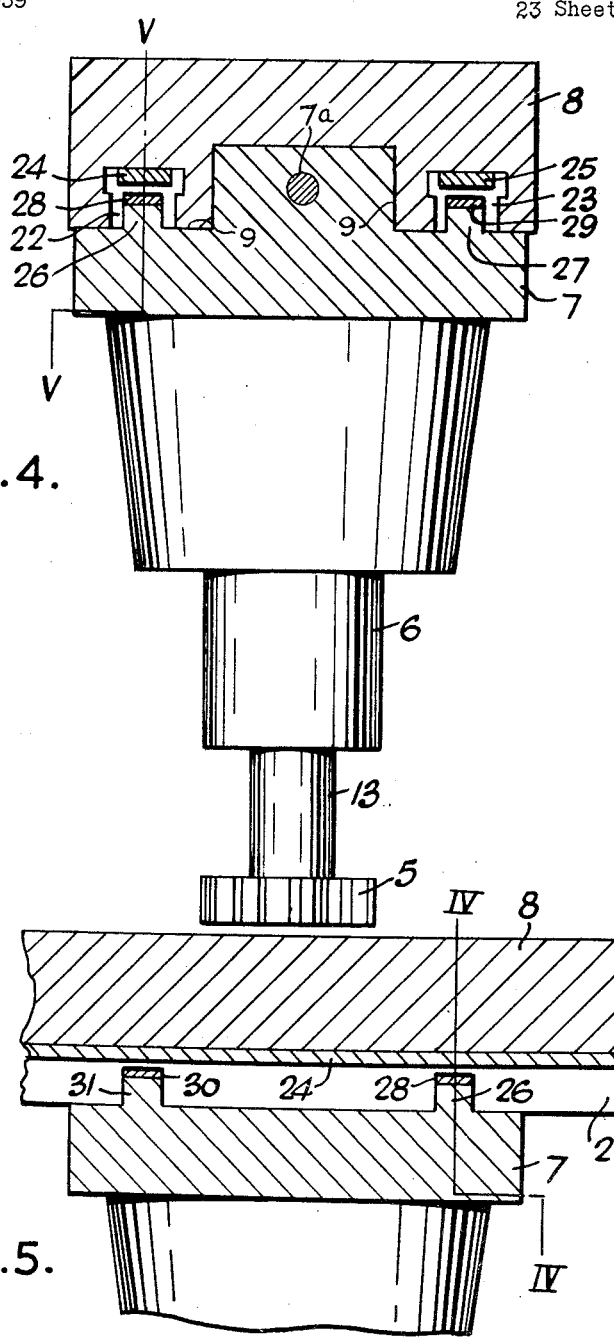

Attorneys

May 21, 1963 B. V. BOWDEN ETAL 3,090,896
PLURAL MOTOR APPARATUS FOR CONTROLLING THE MOVEMENT OF AN OBJECT
Filed May 7, 1959 23 Sheets-Sheet 5

Inventors:
BERTRAM V. BOWDEN
FRANZ KOENIGSBERGER
JOSEPH K. ROYLE

Stevens, Davis, Miller and Mosher
Attorneys

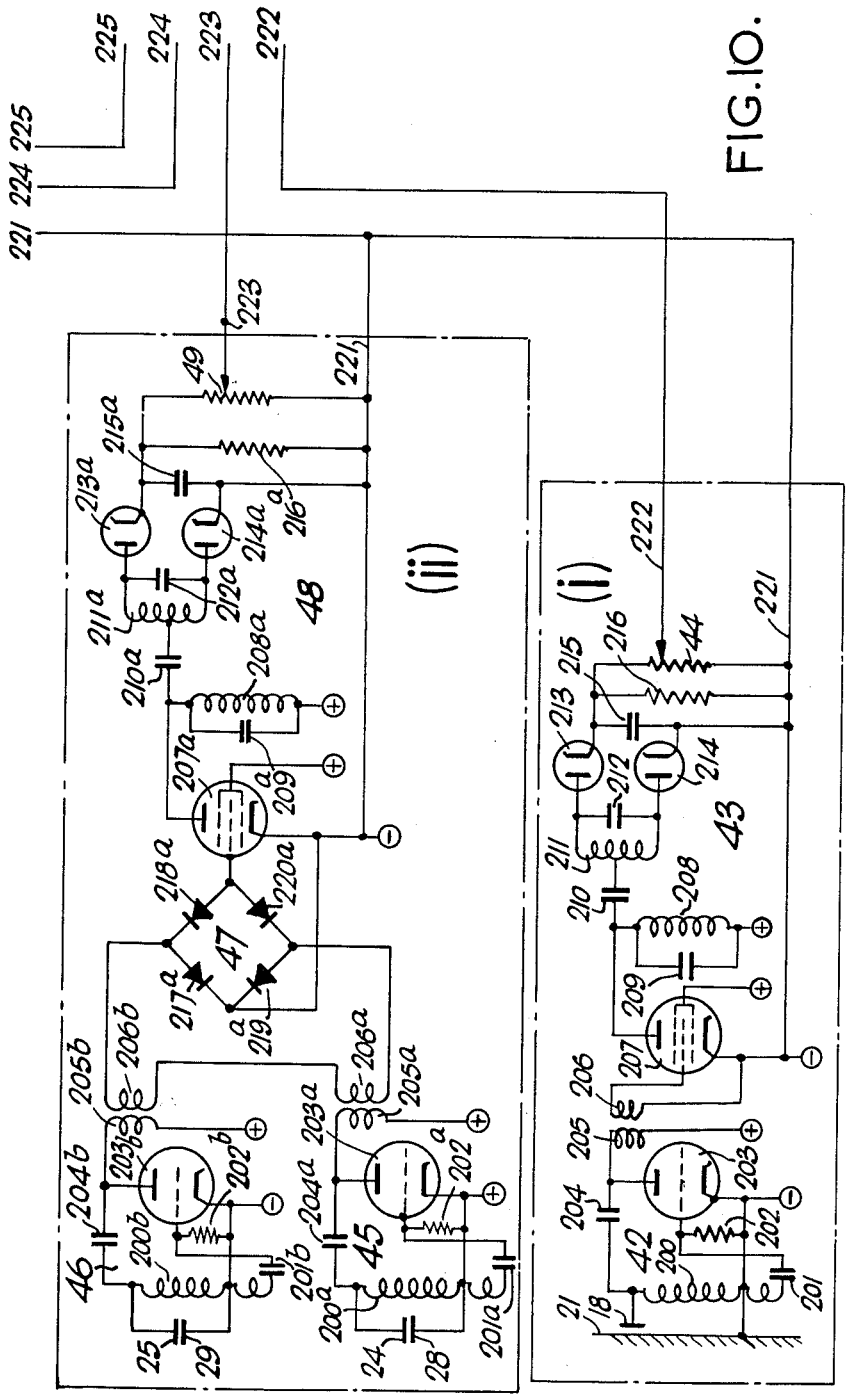

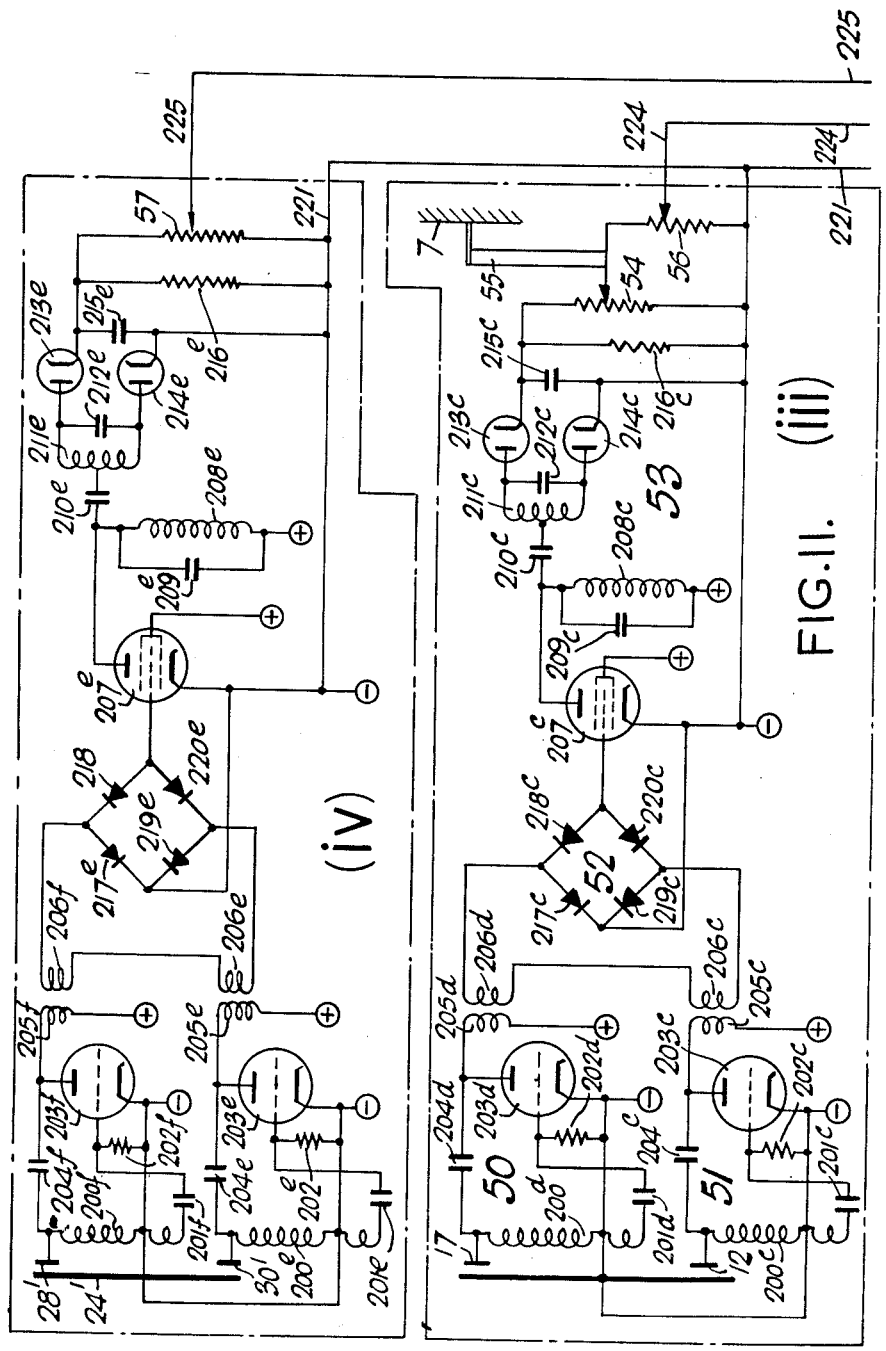

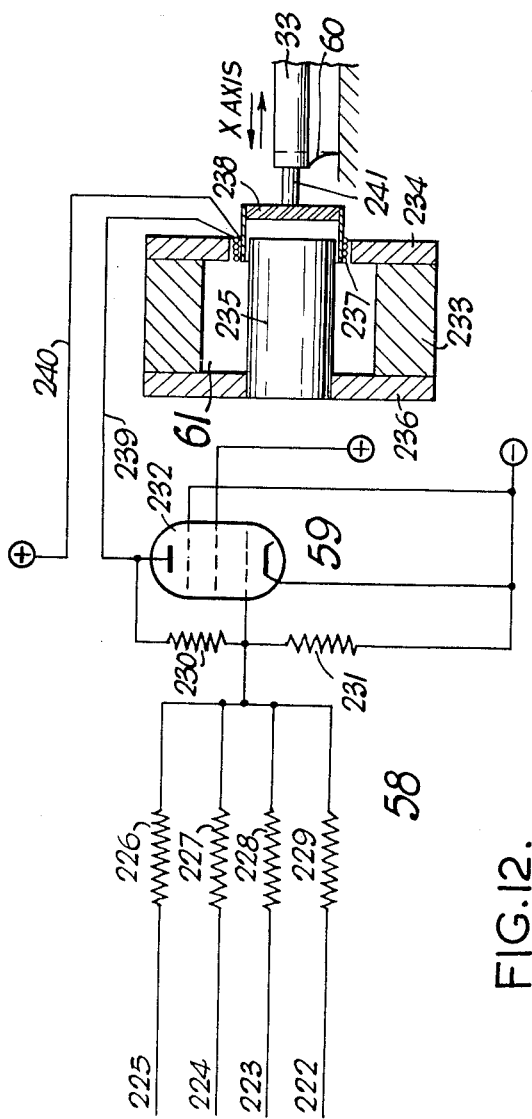

FIG. 15.

May 21, 1963 B. V. BOWDEN ETAL 3,090,896
PLURAL MOTOR APPARATUS FOR CONTROLLING THE MOVEMENT OF AN OBJECT
Filed May 7, 1959 23 Sheets-Sheet 12
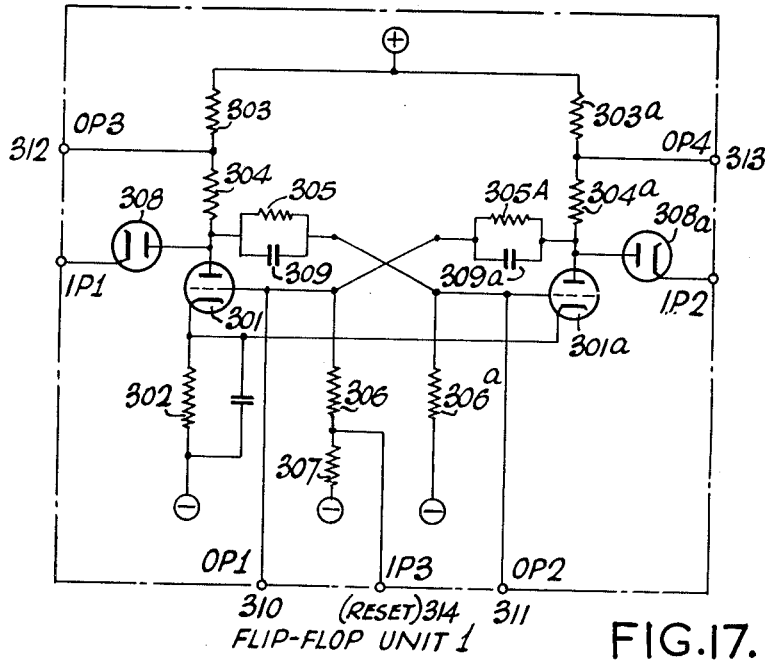
FIG.17.
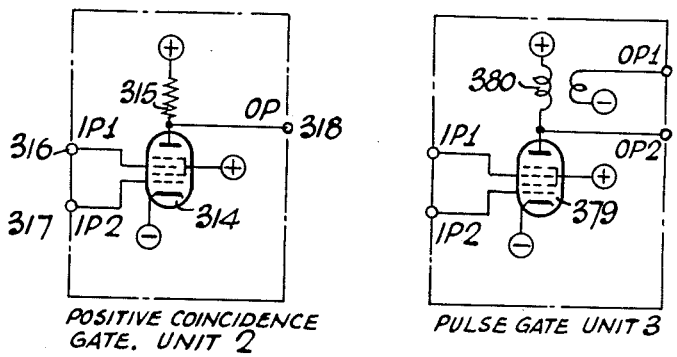
POSITIVE COINCIDENCE GATE. UNIT 2
PULSE GATE UNIT 3
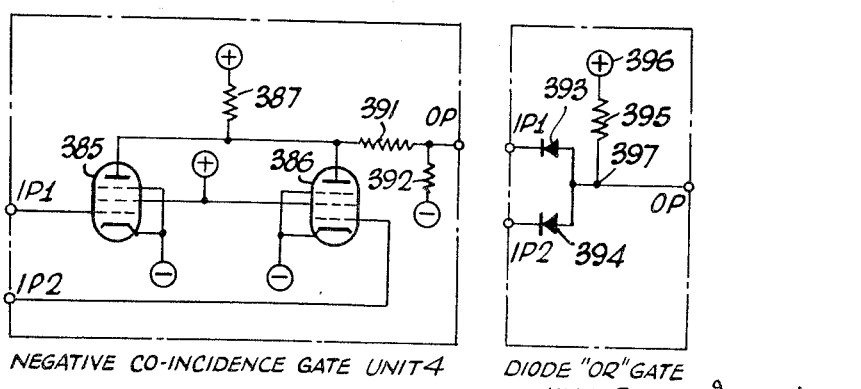
NEGATIVE CO-INCIDENCE GATE UNIT 4
DIODE "OR" GATE UNIT 5
Inventors:
Bertram V. Bowden, Franz Koenigsberger
and Joseph K. Royle
By: Stevens, Davis, Miller & Mosher, Attorneys

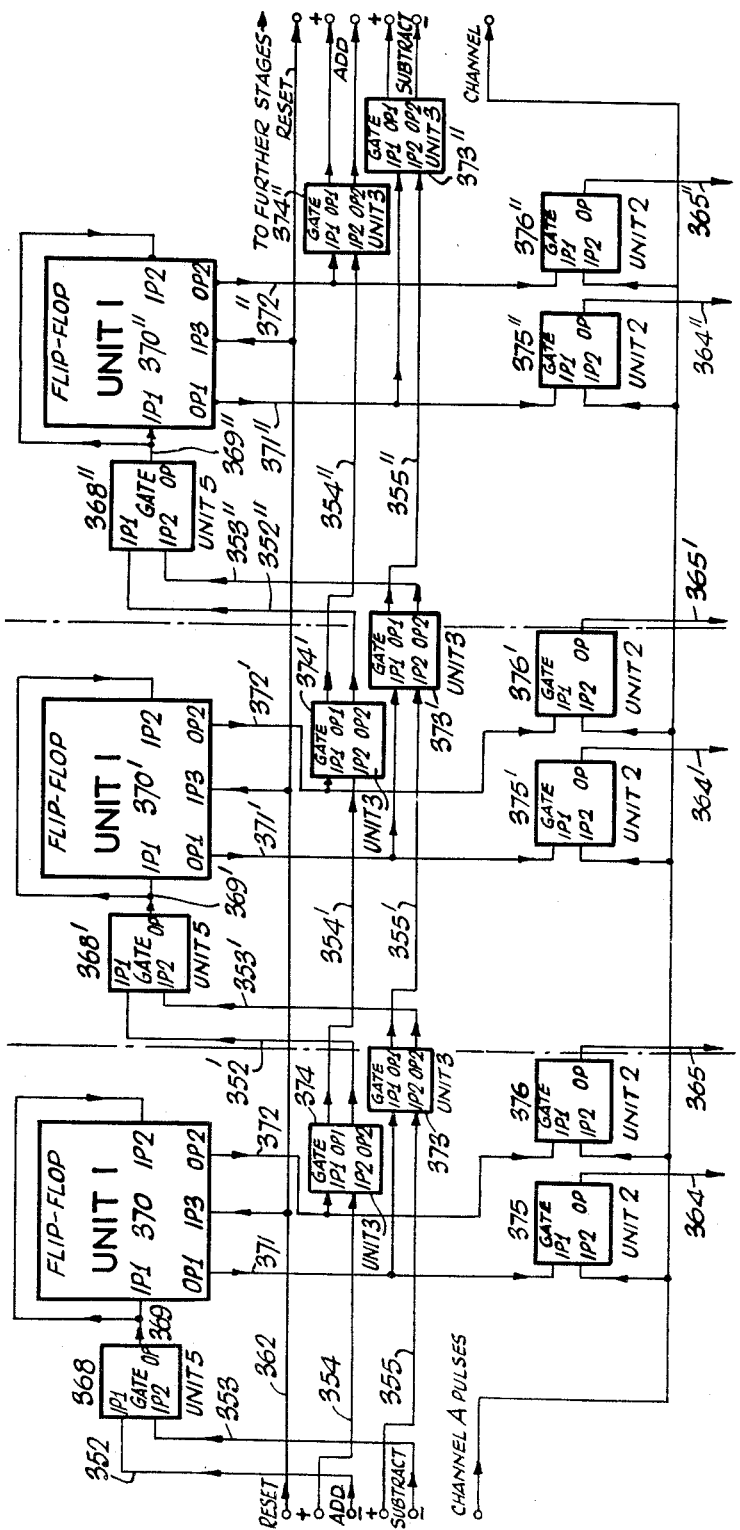

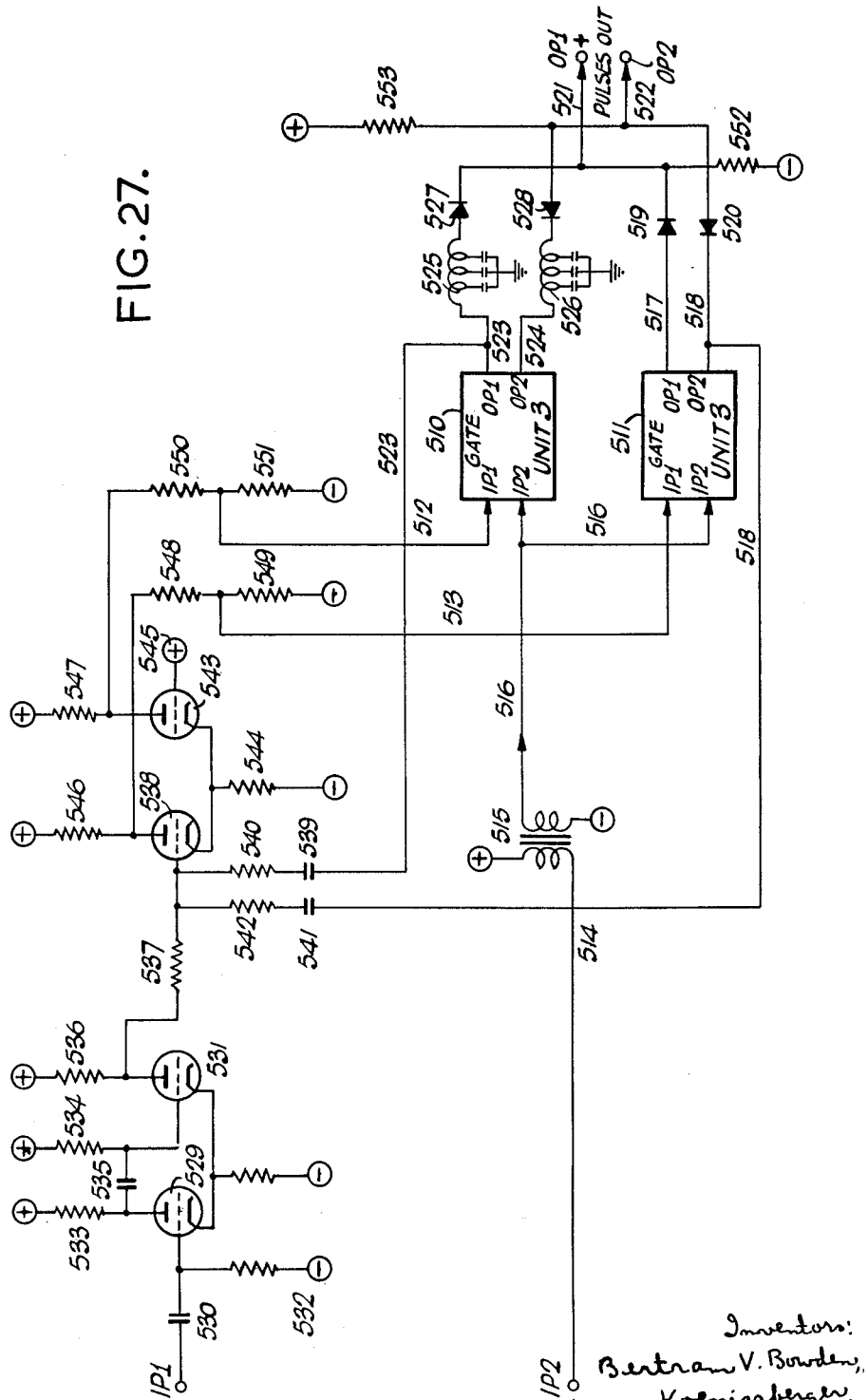

United States Patent Office 3,090,896
Patented May 21, 1963

3,090,896
PLURAL MOTOR APPARATUS FOR CONTROL-
LING THE MOVEMENT OF AN OBJECT
Bertram V. Bowden, Hale, and Franz Koenigsberger and
Joseph K. Royle, Stockport, England, assignors to Na-
tional Research Development Corporation, a corpora-
tion of Great Britain and Northern Ireland
Filed May 7, 1959, Ser. No. 811,637
Claims priority, application Great Britain Oct. 29, 1954
12 Claims. (Cl. 318—19)

This application is a continuation-in-part of our appli-
cation Serial No. 542,734, filed October 25, 1955, now
abandoned.

This invention relates to apparatus for controlling the
movement of one object relative to another object and is
particularly, though not exclusively, suitable for control-
ling the movement of a tool relative to a workpiece,
or vice versa, on a machine tool. The terms "tool" and
"machine tool" are not confined to tools which engage
a workpiece to shape it but include also tools which en-
gage a workpiece to gauge it, to measure it or to per-
form any other operation with respect to such workpiece.

According to the invention there is provided apparatus
for controlling a machine which has provision for pro-
ducing relative movement between a workpiece and a
tool along two predetermined paths, a first path and a sec-
ond path which are at an angle to one another, and
provision for indicating the position along at least the
first path of a first member movable along that path com-
prising means for measuring displacements in the direc-
tion of the first path of a second member movable along
the second path, means for deriving a signal varying ac-
cording to the extent of such displacements of the sec-
ond member and means under control of that signal for
modifying the movement of the first member movable
along the first path to compensate for the said displace-
ments.

According to the invention there is further provided
apparatus for controlling a machine tool of the type
which has at least two slides, a first slide and a second
slide, and at least two slideways, a first slideway and a
second slideway, upon which the first and second slides
are respectively movable along a first path and a sec-
ond path substantially at right angles to the first path,
so as to provide relative movement between a tool and
a workpiece in two orthogonal directions in a plane, a
first slide-moving mechanism for moving the first slide
along the first path, a second slide-moving mechanism
for moving the second slide along the second path, an
automatic control system for controlling at least the first
slide-moving mechanism, such control system compris-
ing means for receiving control signals characteristic of
a desired relative movement between the tool and the
workpiece along the first path, means for indicating the
position of the first slide along the first path and slide
movement control means responsive to the signal receiv-
ing means and position indicating means for controlling
the first slide-moving mechanism according to the said
signals, the said apparatus further comprising displace-
ment measuring means having at least one pair of co-
operating measuring elements, one element of such pair
being attached to a first part and the other element
to a second part (movable relative to the first part), of
a group of parts of the machine tool which provide a
mechanical linkage from and including the second slide-
way on the one hand to the point of contact between
the tool and the workpiece on the other hand, means
for measuring relative movements between the two ele-
ments of a pair of measuring elements resulting from
those relative displacements, of the machine tool parts
to which the said elements are attached, which result in
relative movement between the tool and the workpiece
in the direction of the first path, means for generating
correction signals characteristic of such relative move-
ments between the said elements of the said pair of meas-
uring elements and means for applying those signals to
the said automatic control system associated with the
first slide to modify the effect of the control signal re-
ceiving means and the position indicating means to the
extent and in the sense required to compensate for the
said displacements.

Further according to the invention there is provided a
method of controlling a machine tool comprising the
steps of preparing signals characterising the movement
of a tool relative to a workpiece in relation to at least
two postulated axes inclined to one another, applying
the prepared signal to slide motion control mechanisms
associated with slides of the machine tool which are
mounted on tracks for movement in paths only approxi-
mately parallel to the said axes respectively, measuring
the positions and movements of the slides relative to
their tracks, in the directions of the said axes in the
approximate directions of which they move on their
tracks respectively, deriving monitoring signals accord-
ing to such measured positions and movements, com-
bining the monitoring signals and the prepared signals
to control the movement of the respective slides in ac-
cordance with the said prepared signals, measuring the
deviations of reference points on the slides from the said
axes during movement of the slides as aforesaid, gen-
erating correction signals characterising such deviations
and applying the correction signals characterising each
such deviation of a slide, to slide motion control means
associated with a slide of the machine tool which runs
on its track in a path approximately parallel to the di-
rection of that deviation in a sense and to a degree such
that the tool moves relative to the workpiece in con-
formity with the said prepared signals as referred to
the said axes and not as referred to the paths of the
slides on their tracks, where the same are not respectively
parallel to one another.

According to the invention there is further provided
apparatus for controlling a machine tool comprising
means for supplying control signals representing a rela-
tive movement required to take place between two rela-
tively movable parts of the machnie tool intervening
between the fixed body of the machine tool and the
point of contact between a tool and a workpiece, means
for producing relative movements between the said two
parts, control means for the movement producing means
for applying the control signals to the control means,
means for indicating the relative position of and move-
ments between the said two parts and generating moni-
toring signals corresponding to such position and move-
ments, means for applying such signals to the said con-
trol means to complete a servo control loop regulating
the response of the movement producing means to the
control signals, means for measuring displacements oc-
curing between any two points on the machine tool be-
tween the fixed body thereof and the point of contact
between the tool and the workpiece, which are not in-
cluded in the said control loop, means for generating
correction signals representing such displacements and
means for applying the correction signals to the con-
trol means to modify the operation of the control loop
and the response of the movement producing means by
an amount corresponding to the said displacements.

In carrying out machining operations by conventional
methods it is necessary for the operator to measure the
workpiece from time to time and thus the effective speed
of working is far below the speed of which the machine
is theoretically capable.

Automatic methods of controlling machines have been proposed in which instructions are signalled to a servo system which advances a slide of the machine, accurate devices for recording the position and movement of the slide being provided which pass signals to the servo system to stop the feed when a desired movement has been completed.

To take full advantage of the accuracy of which such automatic devices are capable it is necessary for the machine tool itself to have a degree of accuracy seldom attainable in practice, and it is an object of the invention as applied to machine tools to minimise errors arising from imperfections of the machine tool itself.

In machining operations, the force required to drive the slides of the machine tool against the cutting load, is subject to considerable variation and it is difficult to ensure accurate movement of these slides when this force has to be provided solely by the rotation of a lead-screw or the like and this is particularly the case with automatic control devices of the type described above where the force is provided by a servo motor which becomes slow to respond to the instructions signalled to it if its size is unduly increased. It is a further object of the invention as applied to machine tools to overcome this difficulty by divorcing the function of providing the force required for the movement of a slide or the like, from the function of controlling such movement.

The invention will be more readily understood from the following description of certain embodiments therefor illustrated in the accompanying drawings in which:

FIG. 1 is a perspective drawing of parts of a machine tool incorporating one embodiment of the invention.

FIG. 2 is a partly sectioned detailed drawing of one part of FIG. 1.

FIG. 3 is a partly sectioned detailed drawing of another part of FIG. 1.

FIG. 4 is a partly sectioned drawing of parts of the machine tool shown in FIG. 1.

FIG. 5 is a drawing, partly sectioned in a different plane, of the parts of a machine tool shown in FIG. 4.

Figure 6:
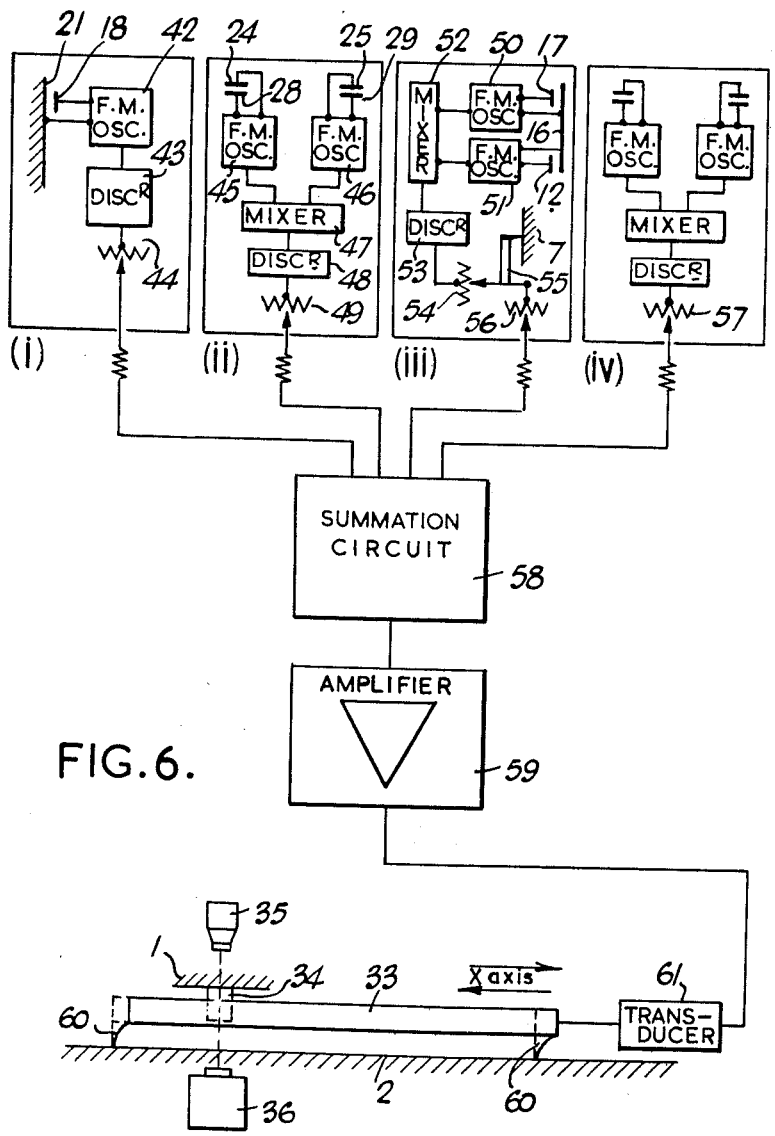
FIG. 6 is a schematic diagram of electronic circuits and other ancillary equipment for use with the embodiment illustrated in FIG. 1.

FIGS. 10, 11 and 12 which should be placed together as shown in FIG. 13, and treated as a single figure, show details of the circuits indicated schematically in FIG. 6.

FIG. 13 is a diagram indicating how FIGS. 10, 11 and 12 should be fitted together.

Figure 7:
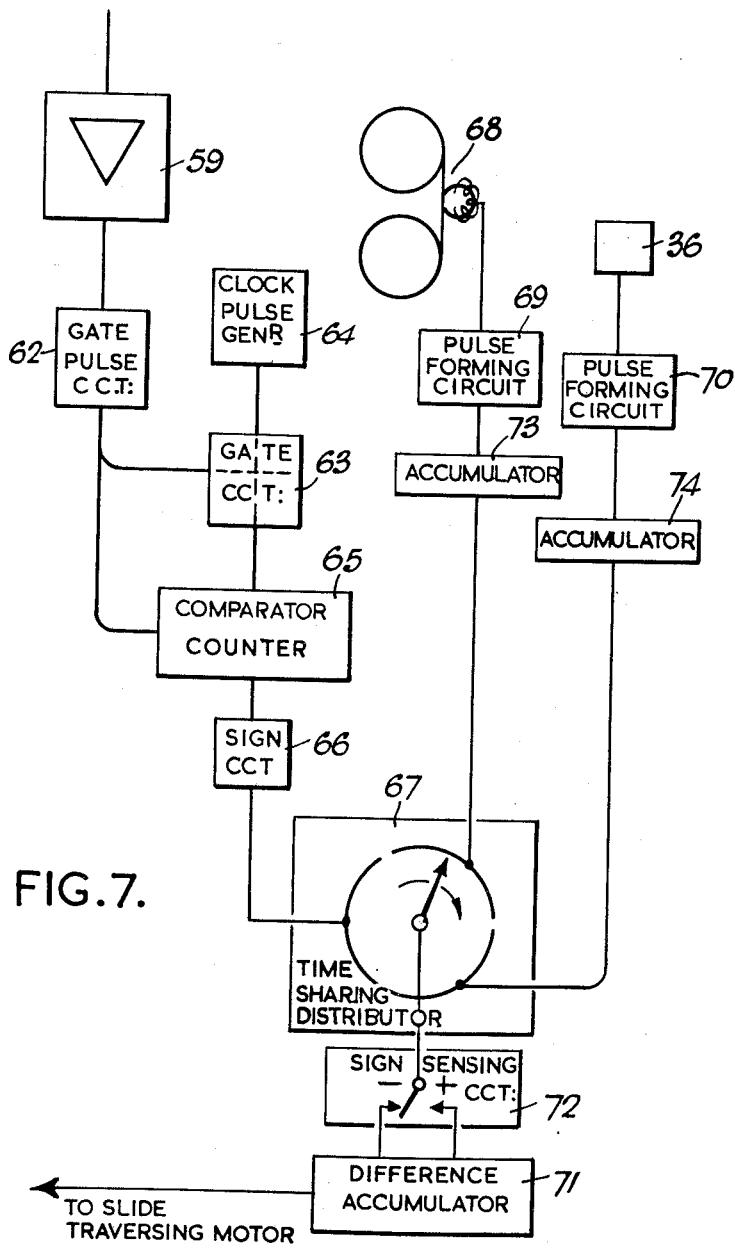
FIG. 7 is a further schematic diagram of electronic circuits and other ancillary equipment for use with the embodiment illustrated in FIG. 1.
Figure 14:
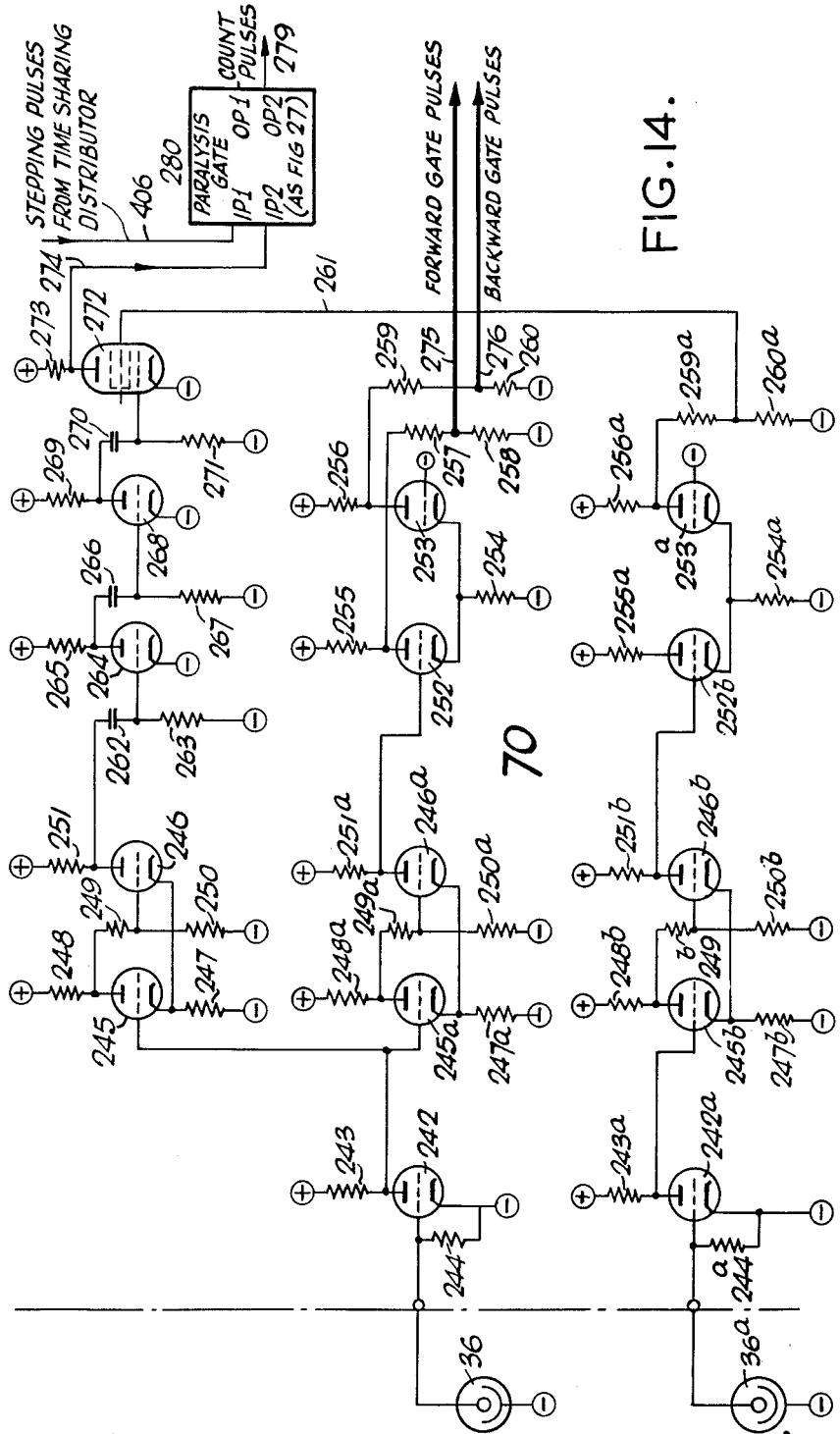

FIG. 14 shows detailed circuits corresponding to pick-up 36 and pulse forming circuit 70 of FIG. 7.

Figure 15:
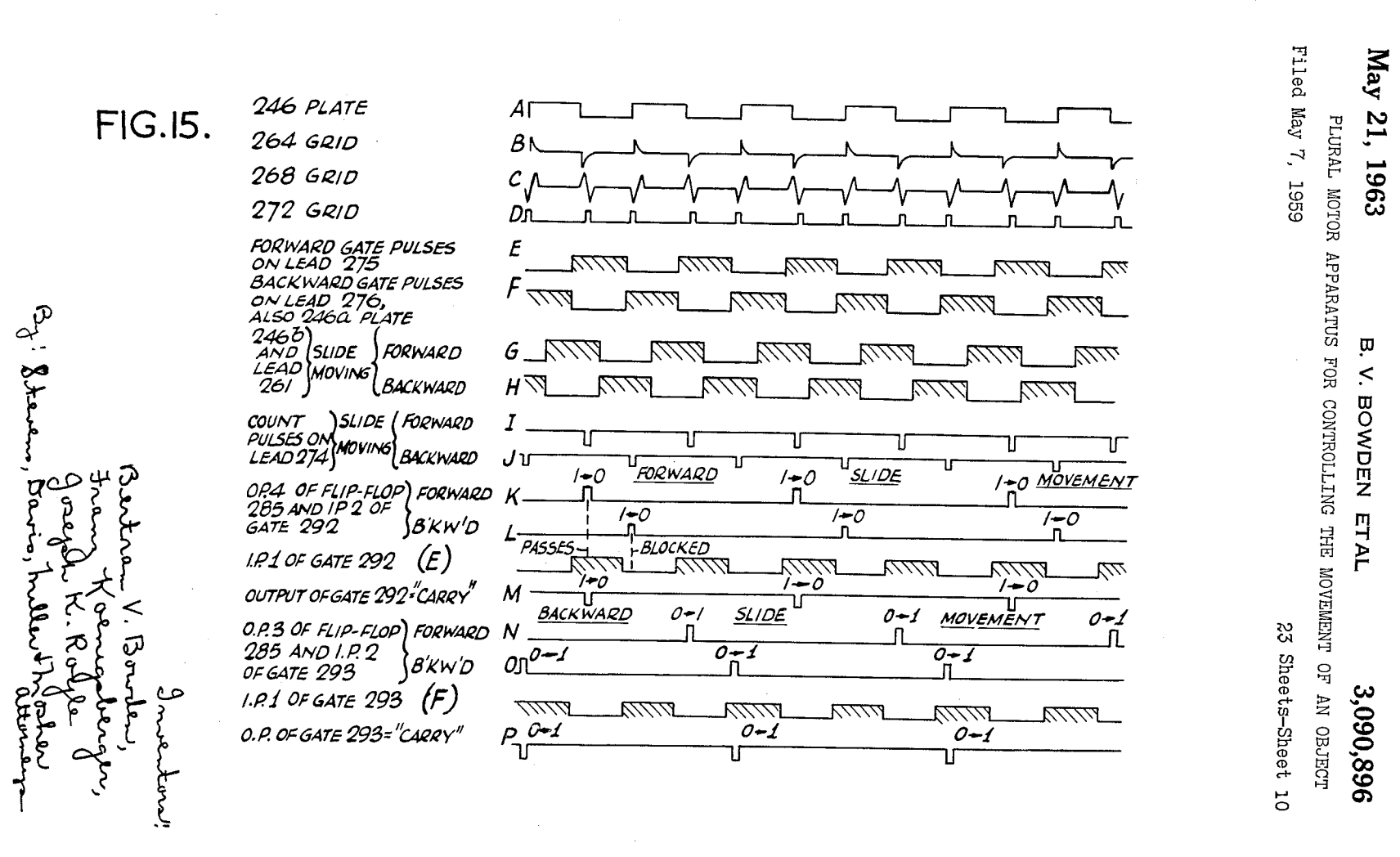

FIG. 15 is a diagram showing the wave forms at various points in FIG. 14.

Figure 16:
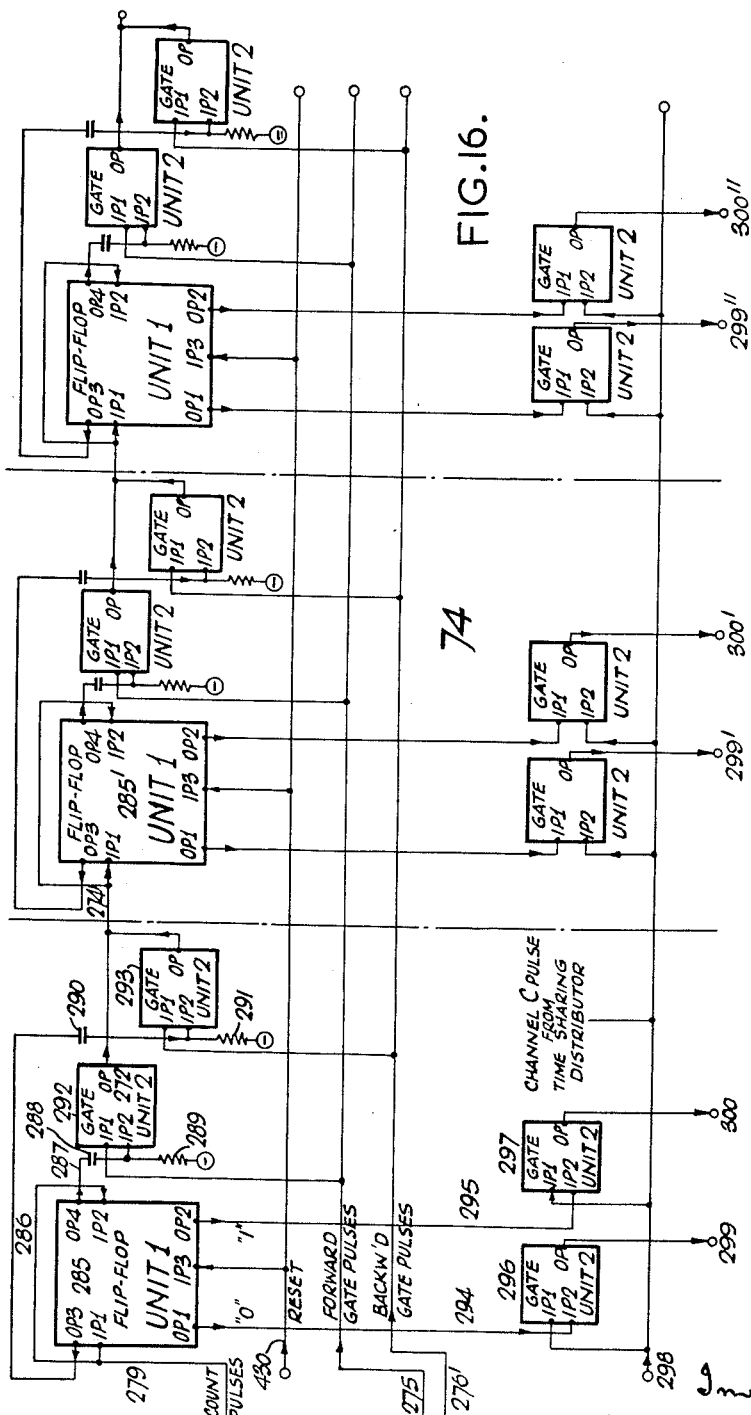

FIG. 16 shows the detailed circuit corresponding to accumulator 74 of FIG. 7.

FIG. 17 shows the detailed circuits of certain standardised circuit units used throughout the circuits of FIG. 7.

Figure 18:
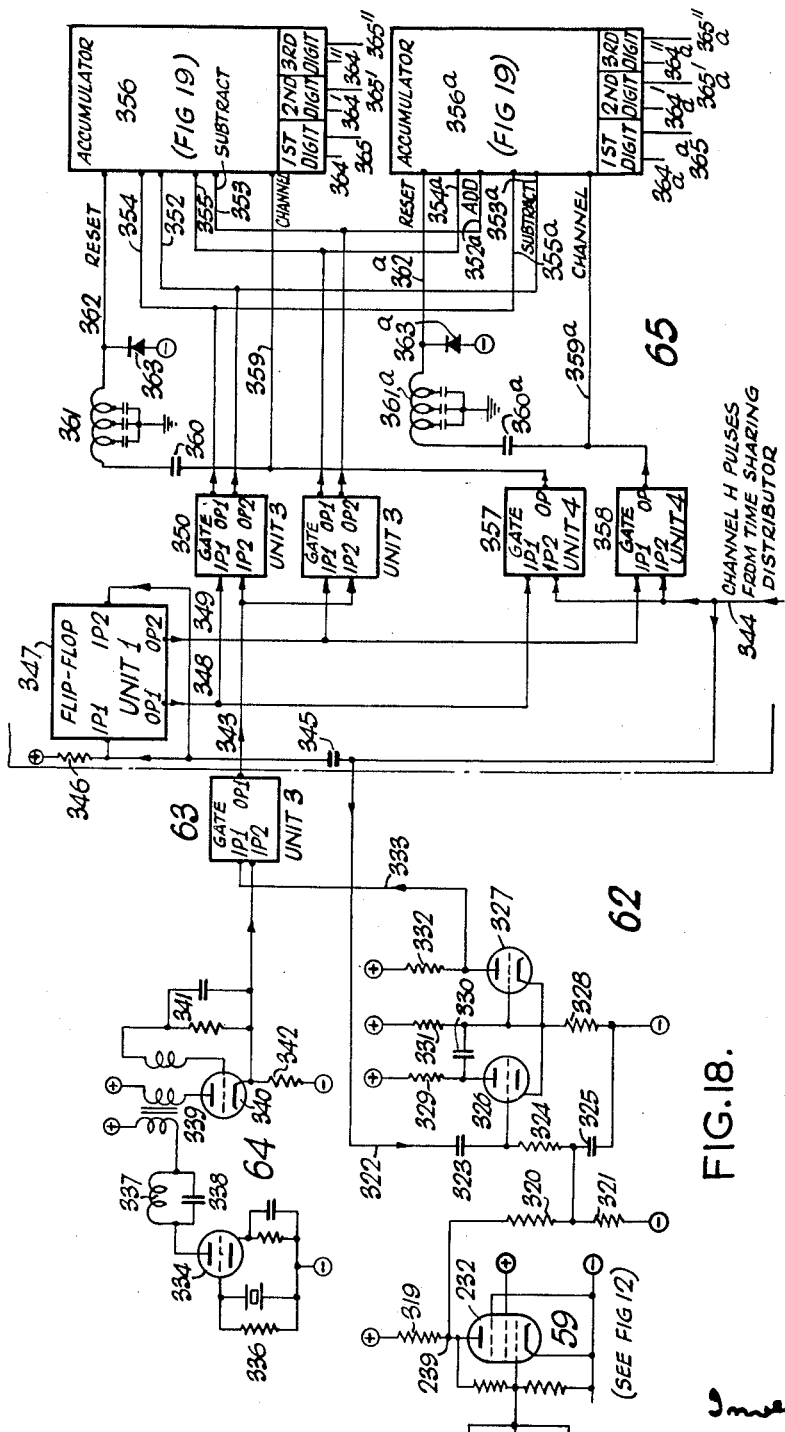

FIG. 18 shows the detailed circuits corresponding to amplifier 59, gate pulse circuit 62, gate circuit 63, clock pulse generator 64, comparator counter 65 and sign circuit 66 of FIG. 7.

Figure 18A:
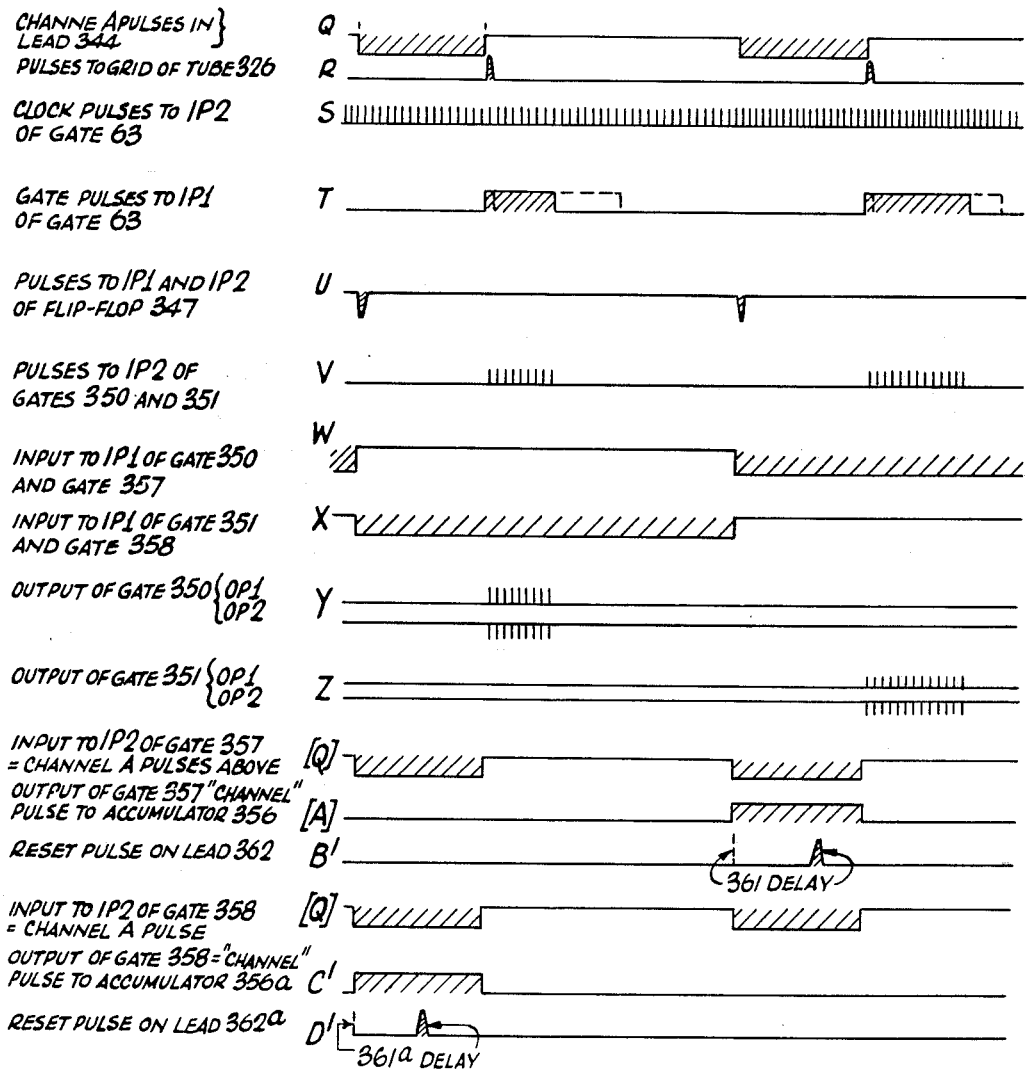

FIG. 18A is a diagram of the wave forms occurring at various points in FIG. 18.

FIG. 19 is a circuit diagram showing in greater detail a part of the circuit shown in FIG. 18 and also the circuit corresponding to accumulator 73 of FIG. 7.

Figure 20:
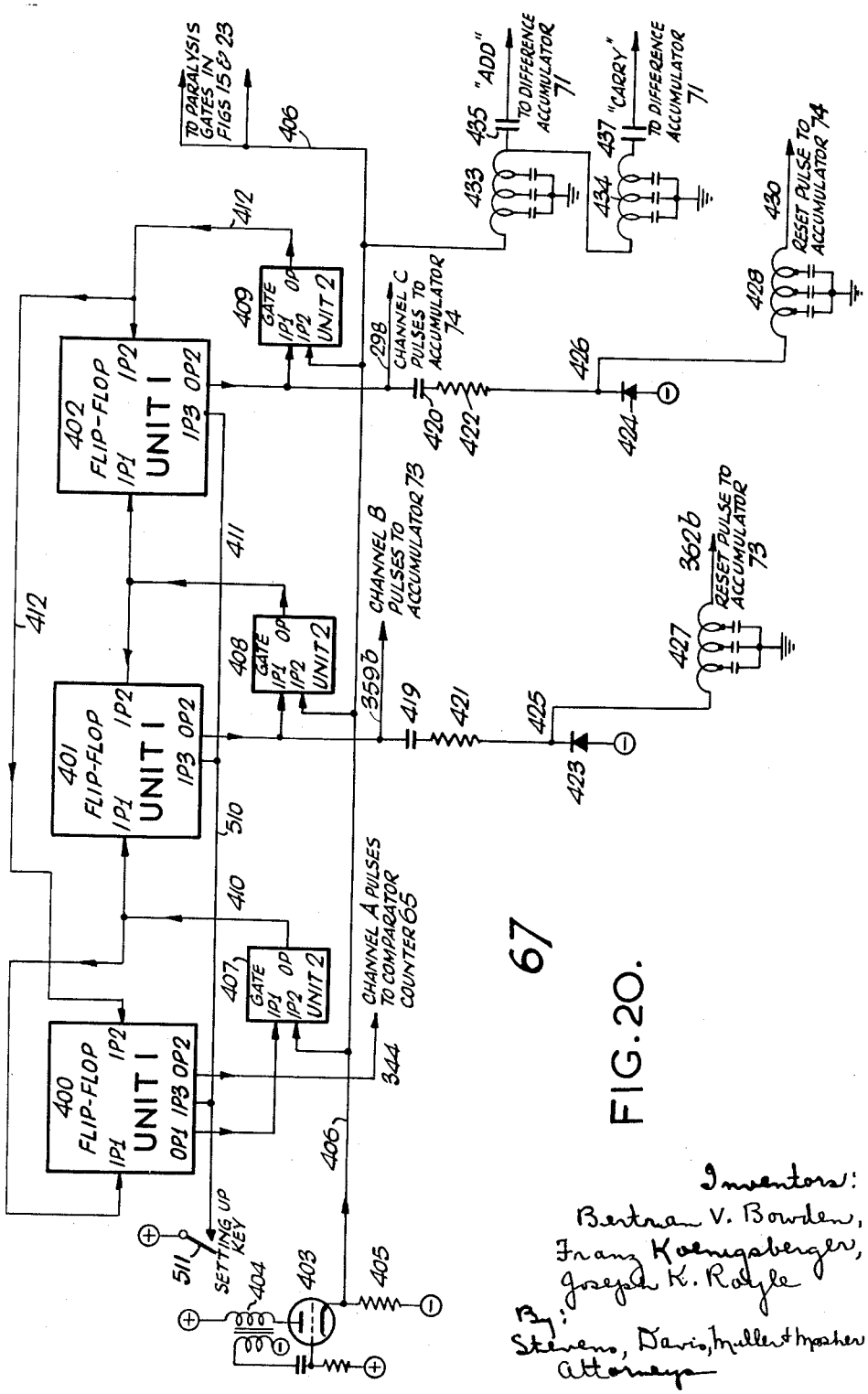

FIG. 20 shows detailed circuits corresponding to time sharing distributor 67 of FIG. 7.

Figure 21:
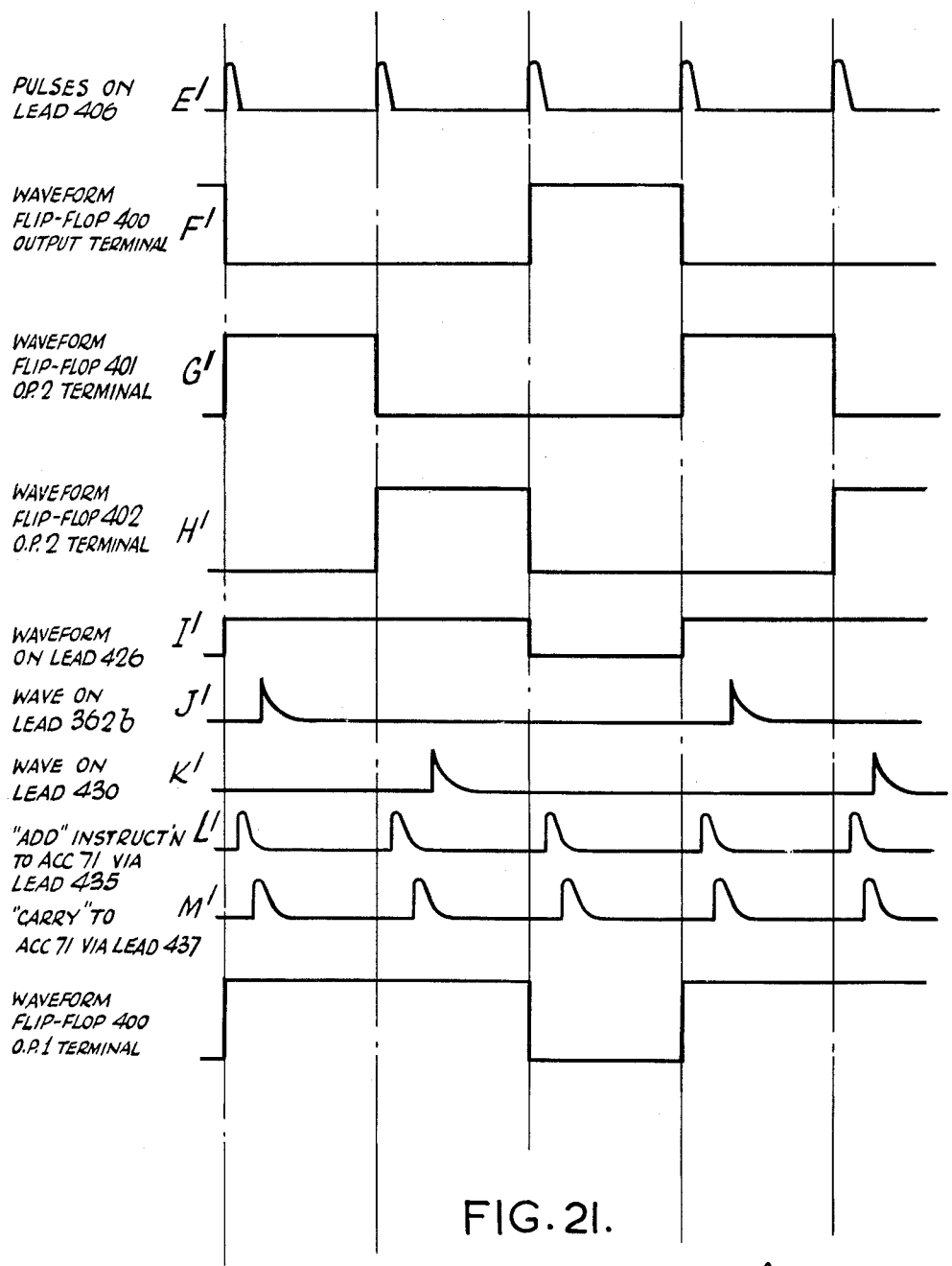

FIG. 21 is a diagram of the wave forms occurring at various points in FIG. 20.

Figure 22:
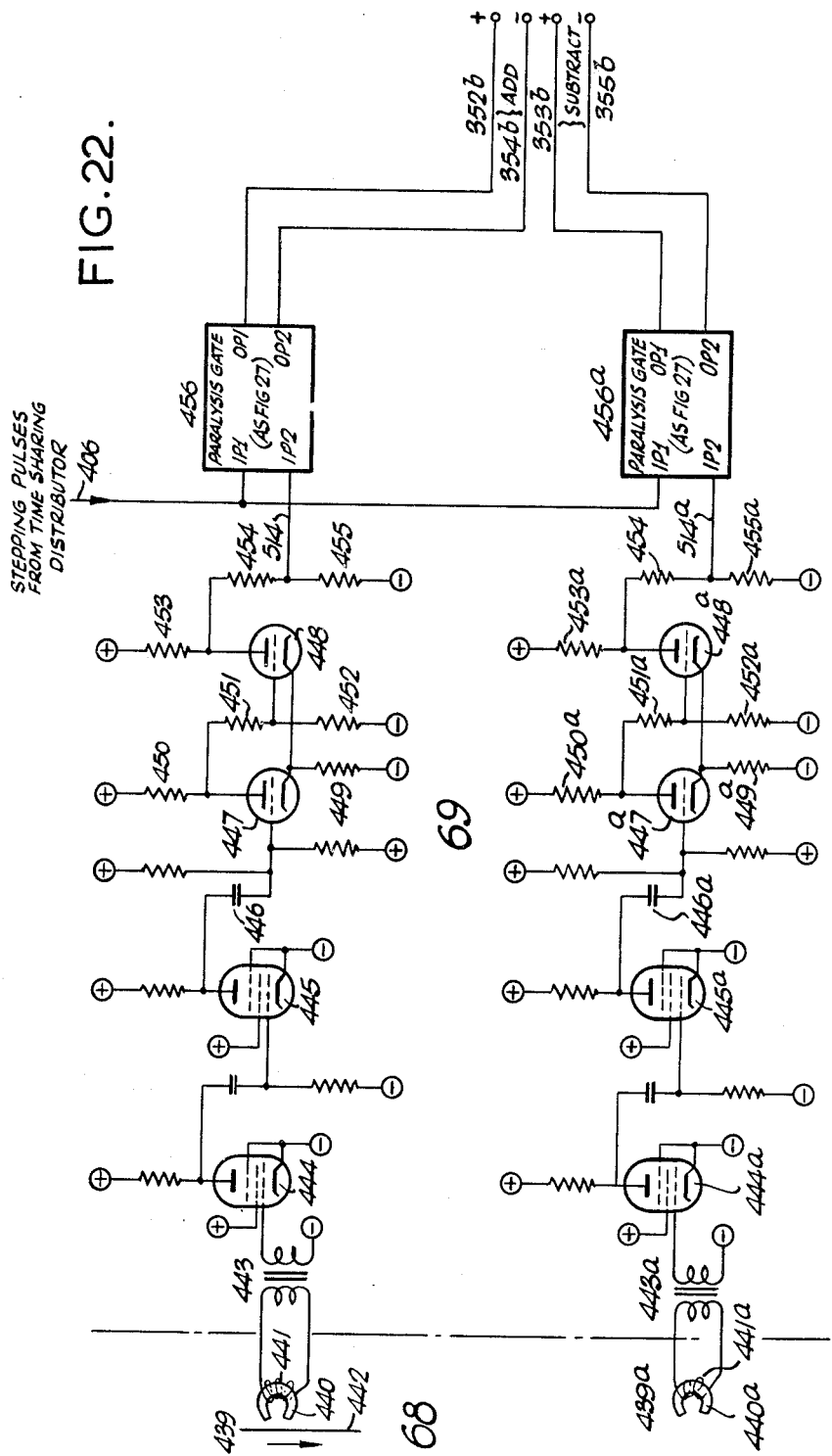

FIG. 22 shows the detailed circuits corresponding to tape pick-up 68 and pulse forming circuit 69 of FIG. 7.

Figure 23:
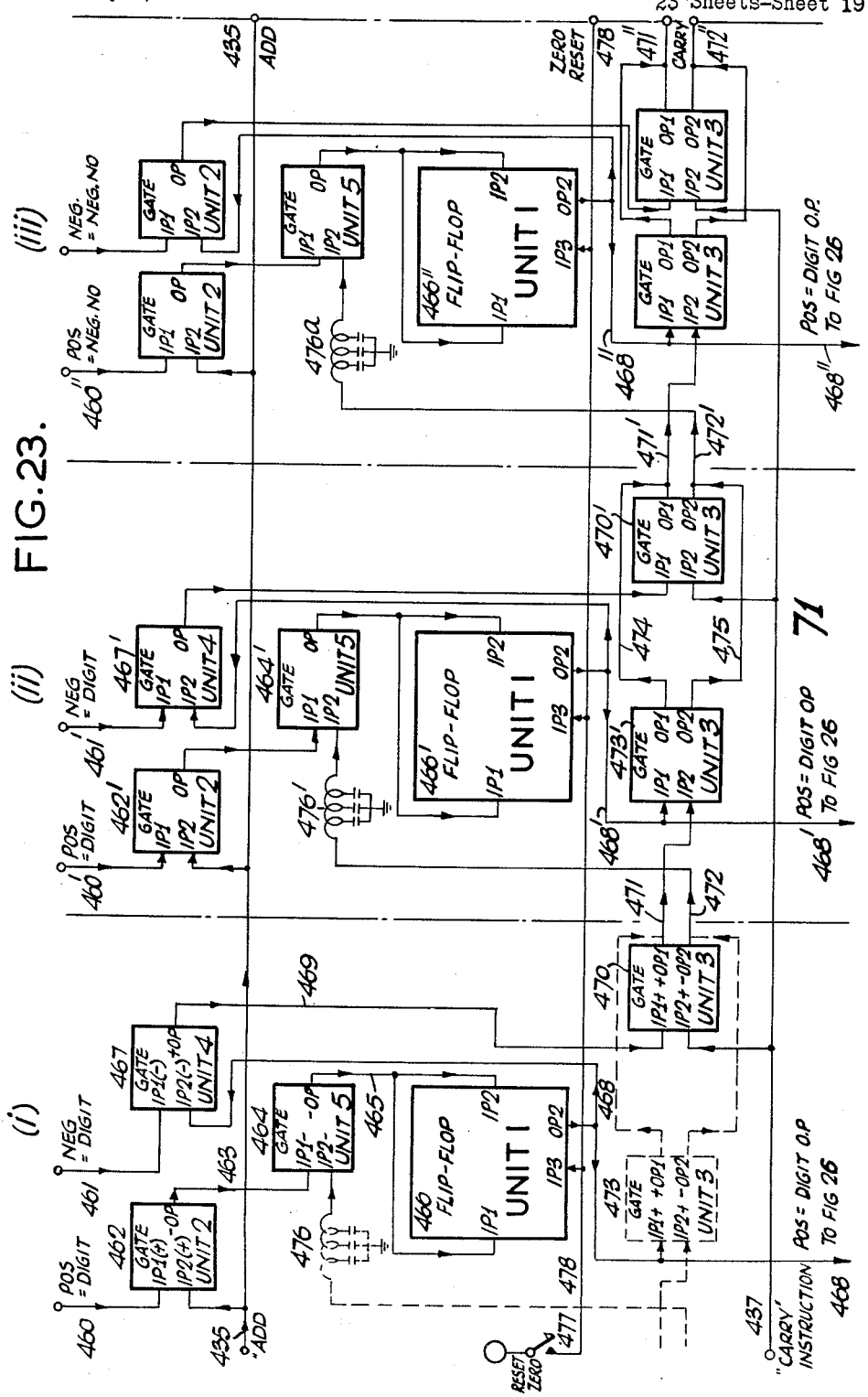

FIG. 23 shows the detailed circuits corresponding to a part of difference accumulator 71.

Figure 24:
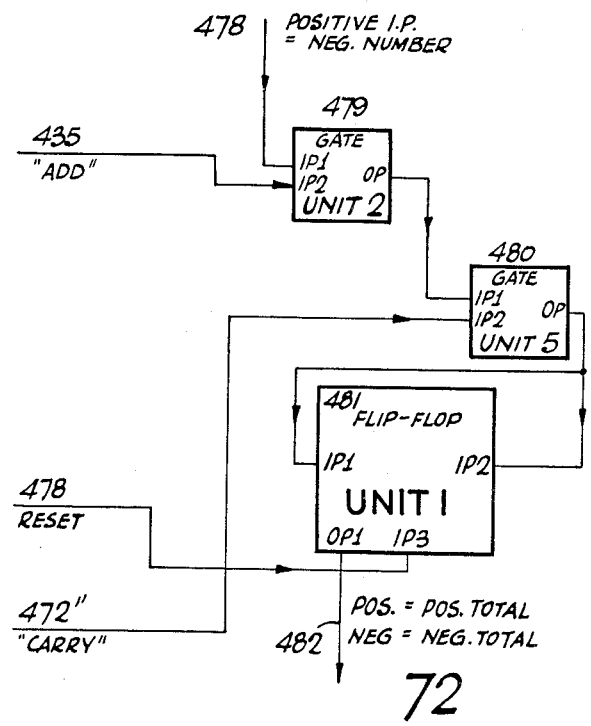

FIG. 24 shows detailed circuits corresponding to sign sensing circuit 72 of FIG. 7.

Figure 25:
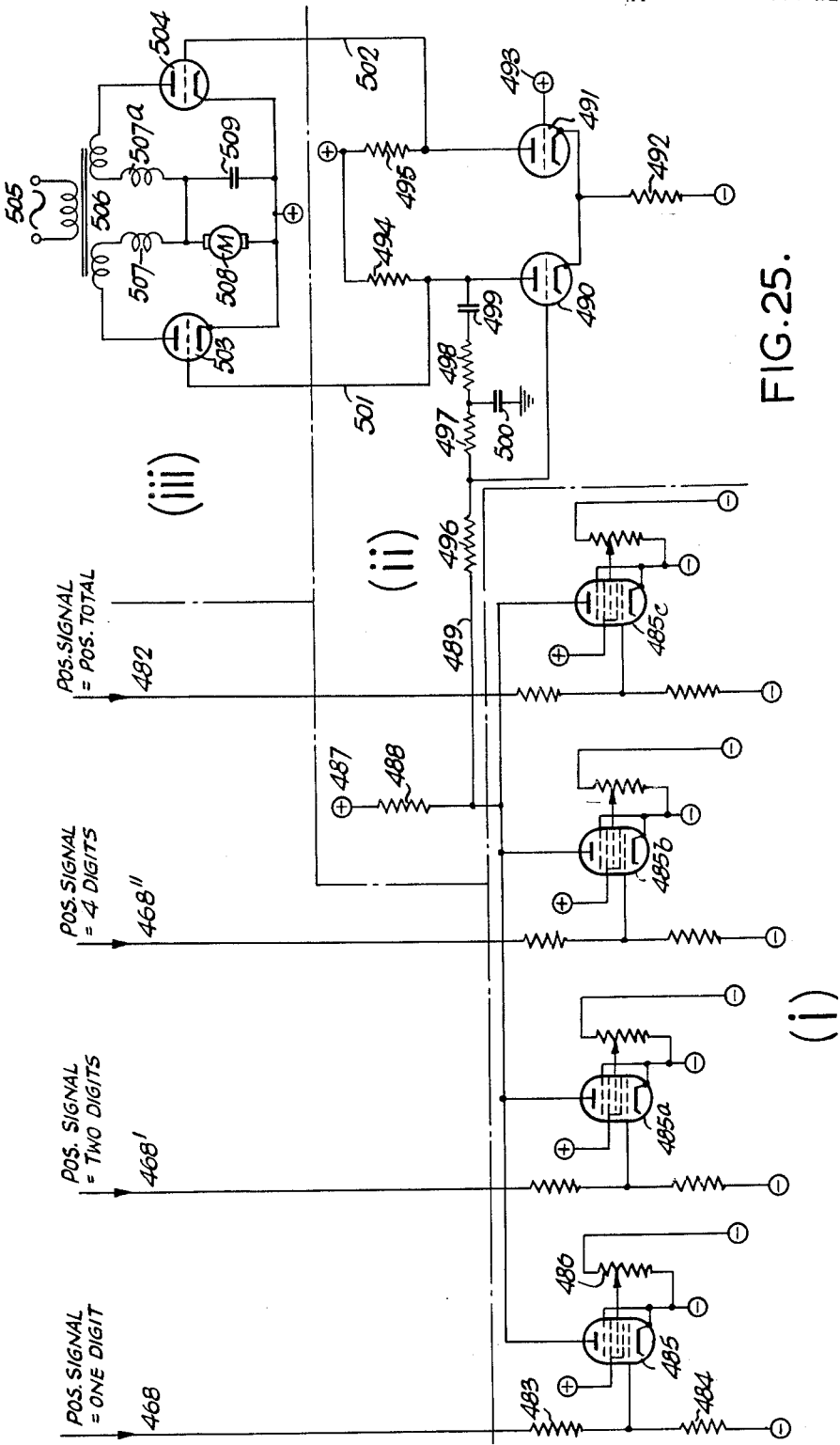

FIG. 25 shows detailed circuits corresponding to another part of difference accumulator 71 of FIG. 7.

Figure 26:
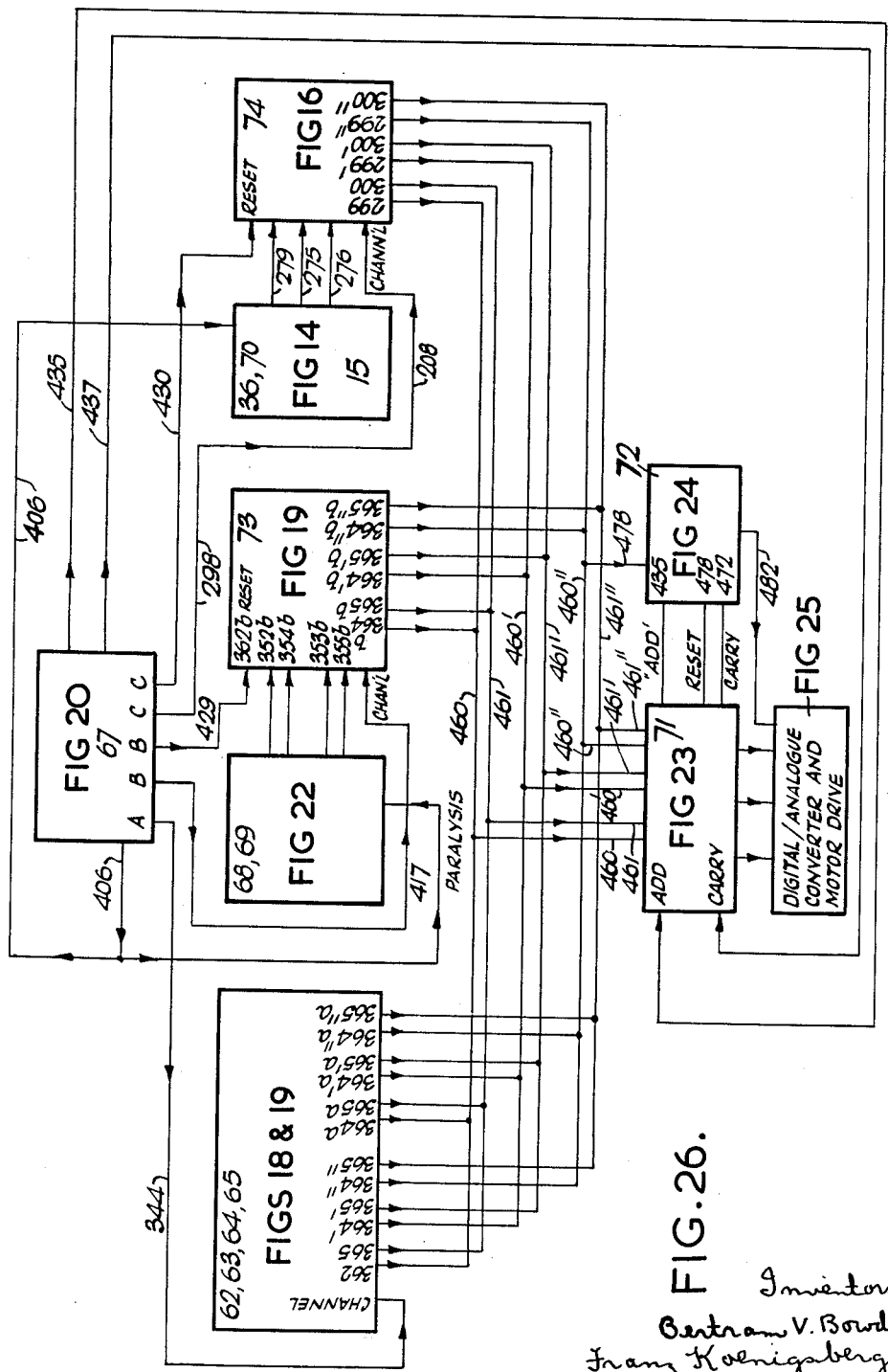

FIG. 26 is a schematic diagram showing how FIGS. 14, 16, 17, 18, 19, 20, 22, 23 and 24 are interconnected, and FIG. 27 shows in greater detail the circuit of a component part appearing both in FIG. 14 and FIG. 22.

FIG. 1 shows in diagrammatic form, a milling machine with a horizontal slide 1 riding on a bed 2 with guiding flanges 3, which are indicated as vertical ridges though in practice they would be of more sophisticated nature. A workpiece 4 is secured to slide 1 by any conventional means (not shown).

A milling cuter 5, mounted in a spindle headstock 6, is carried on a slide 7 riding on a bed 8 with guiding flanges 9 (indicated in the same manner as flanges 3), which run transversely of the flanges 3.

This provides for two dimensional control of the relative movement of tool and workpiece in one plane such as might be required for profile milling.

Slide 1 is moved along its guiding flanges 3 by a lead-screw 1a rotated by a motor 1b, and slide 7 is moved along its guiding flanges 9 by a leadscrew 7a rotated by a motor 7b. Other conventional means for advancing the slide may of course be used. For instance, the slide could be advanced by a hydraulic mechanism.

Any method of indexing the movement of the slides by recording the rotational position of a lead screw or the like is liable to be upset by displacements of the parts of the machine between the recording point and the cutting point and by inaccuracies in slides lead screw or the like. For instance, in FIG. 1 the distance from the edge 10 of the workpiece to the margin 11 of the cut may be gauged by recording the position of slide 7 along bed 8 in the direction of guiding flanges 9, but if there is any side play or bending of slide 1 in relation to bed 2, causing displacements of slide 1 transversely of guiding flanges 3, the actual position of margin 11 will not truly correspond with the position thereof as indicated by the position of slide 7 along guiding flanges 9.

Provision is made for measuring displacements of this type and generating signals which can be applied to any slide on the machine tool whose normal movement runs in the same direction as the displacement, to cause a correcting adjustment to be made to the movement or position of that slide so that the error due to the displacement may be eliminated. These displacement measuring means will now be described in more detail.

It is convenient to designate the directions of relative movement of the tool and the workpiece in terms of an "X axis" defining the theoretical direction of movement of slide 1, and a "Y axis" defining the theoretical direction of movement of slide 7 and chain dotted lines designated "X" and "Y" indicate these axes in FIG. 1, the said axis lines being stepped as they traverse various surfaces in different planes so that the position where an axis lies in relation to various bodies shown in the drawing may be readily apparent.

For measuring displacements of slide 1 in the direction of the Y axis a plate 12 is mounted on bed 2 so as to be bisected by a plane including the Y axis and the tool spindle 13. Suspended from brackets 14 projecting from the side of slide 1, is a bar 15, having a surface 16 which is accurately flat (in fact it is preferred to use an "optical flat"), and which lies in a plane parallel to the X axis.

The surface of 12 and the surface 16 are spaced apart and the length and position of bar 15 is such that the area of 12 and 16 facing one another remains constant for all positions of slide 1 along its guide flanges 3 and so long as it truly follows the X axis, the spacing between the two surfaces does not alter. Any deviation from the X axis due to side play, inaccuracies in the slideways or the like varies the spacing between 12 and 16.

In the preferred arrangements 12 and 16 have electrically conducting surfaces and act as an electrical condenser whose capacity varies on deviations of slide 1 from the X axis path. Electronic circuits are connected to 12 and 16 which generate a signal dependent on changes in the said capacity which is indicative of any deviations of slide 1 in the direction of the Y axis.

This signal is utilised to initiate a correcting movement (or modification of movement) of slide 7 along bed 8. The circuit arrangements for generating the correcting signal and the means for applying it to perform the correction will be explained later in connection with FIGS. 6 and 7.

In order to provide for the case where the displacement of slide 1 takes the form of a yawing movement in relation to its guiding flanges 3, another plate 17 may be mounted on bed 2. Plate 17 is similar in form and manner of mounting to plate 12 but is displaced therefrom along bed 2. If slide 1 is correctly oriented with respect to its slideway (that is to say not deflected traversely) the capacities of 12, 16, and 17, 16 will have a predetermined relationship, being preferably equal. Any yawing displacement of slide 1 however, will cause the relationship between 12, 16 and 17, 16 to depart from the predetermined relationship and the extent of this departure is a measure of the angle of yaw. As plate 12 lies astride the Y axis which includes the axis of the tool spindle the capacity of 12, 16 will provide an adequate measure of deflections of slide 1 so far as Y axis correction is concerned and yawing movements of slide 1 can be ignored as they can be considered to a close approximation, as taking place about a pivot point on the axis of the tool spindle. In certain positions of the tool headstock slide 7 along its slideway 9 however this will not hold good and yawing of slide 1 may produce significant errors in the positioning of the workpiece relative to the tool along the X axis.

Such errors will vary, for any given angle of yaw of slide 1 according to the position of 7 and 9 and the X axis correction required will be mutually dependent on the difference between the two capacities 12, 16 and 17, 16, and the position of slide 7 along slideway 9. It is necessary that these capacities should be continuously compared with one another and with an indication of the position of slide 7 along its slideway 9. The derivation of the required correcting signal from these three sources of information involves a simple problem of geometry well within the capabilities of an elementary electronic computer, and the correction signal can take the form of a visual signal to be used by an operator to modify the readings indicating the position of slide 1 along slideway 2.

The problems of compensating for displacements of a headstock slide such as 7, are different from those of a workpiece-carrying slide such as 1 in certain respects, the most important of which is that yawing movements of such a slide can, to a close approximation, be regarded as taking place about a point on the tool spindle axis so that their effect on the relative position of tool and workpiece can be ignored for most practical purposes. A small plate 18 similar to plate 12 is fixed to the headstock slide in a position such that it is bisected by a plane, parallel to the X axis, which includes the axis of the tool spindle. A bar 19 similar to bar 15 is suspended on brackets 20 from bed 8 in an attitude such that an accurately flat surface 21 (which may be an optical flat) is parallel to and spaced from an outwardly facing surface of 18.

Surface 21 is so aligned that the spacing of 18 from 21 remains unaltered during movements of slide 7 along its slideway 9 so long as plate 18, (or more correctly, a reference point on its surface), remains in a given plane parallel to the Y axis driving such movement. In general this implies that slide 7 is not deflected transversely of its theoretically correct path in the course of movement along its slideway.

With this arrangement the extended flat surface 21 is mounted rigidly on the main body of the machine tool and can be used as a datum representing the Y axis. In the case of the slide 1 as previously described the two plates 12 and 17 may be aligned so as to form the corresponding datum.

Slide 7 is capable of rocking displacements in the rolling plane and the pitching plane relative to its slideway. The first calls for corrections in the X axis and the latter for corrections in the Y axis.

The pivots about which these displacements take place will be constant to a close approximation and as the distance from such pivots to the cutting point is constant the angles of roll and pitch respectively are sufficient to define the errors in the directions of the X and Y axes respectively.

Conveniently these angles may be measured by incorporating large and small plates such as 12, 17, and 16, 18, 21 in the body of the bed 8. FIGS. 4 and 5 show how this may be done.

FIG. 4 is a cross section through the forward end of slide 7 and bed 8 the section plane being parallel to the X axis and the tool spindle axis.

Channels 22, 23 are cut in the lower surfaces of the side flanges of bed 8, and in the top surfaces of the channels, long plates 24, 25, having accurately flat lower surfaces, are fixed by means not shown, which permit them to be accurately aligned so that their lower surfaces lie in the same plane.

This plane is preferably such that the shortest distance from any point on slide 7 to the surface of each of plates 24, 25 does not change when slide 7 moves from one end to the other of its slideway in a direct path without displacements due to inaccuracies of the slideway or the taking up of clearances.

Projecting into the channels 22 and 23 are pillars 26, 27 to the top of which are fixed small plates 28 and 29 similar to plates 12, 17 and 18, which are spaced away from the lower surfaces of 24 and 25 respectively so as to leave a small gap in each case, to constitute condensers 24, 28 and 25, 29, plates 24 and 25 being of a length such that the same area of 24 faces 28; and the same area of 25 faces 29 in all positions of slide 7 along its slideway.

Any rolling of 7, due to cutting loads along the X axis for instance, will cause a difference between the capacities of 24, 28 and 25, 29 which will be a correct measure of the angle of roll. Circuits will be described later, for indicating such capacity differences. The absolute value of the capacities is of no importance for making corrections in the X and Y axis directions but where there is provision for traversing the tool in an axis parallel to the tool spindle axis, as in the case of a die sinking machine for instance one or both of condensers 24, 28 and 25, 29 may be used to measure deflections of slide 7 in this axis and in such a case the plane in which 24 and 25 are aligned should be parallel to the theoretical plane (substantially horizontal in this case) of movement of slide 7.

FIG. 5 shows the arrangement for indicating pitching displacements of slide 7. An additional plate 30 mounted on a pillar 31 is fixed to slide 7 in a position offset from 26, 28 along the Y axis, so as to project into channel 22 in the same way as 26, 28, thus constituting a third condenser 24, 30.

The difference between the capacities of 24, 28 and 24, 30, irrespective of their absolute values, is an index of the angle of pitch of slide 7.

Where it is required to make corrections for axial displacements of the tool, as indicated above, a similar additional condenser can be arranged in channel 23 making four in all, and the average of the capacities of the four condensers is an index of such axial displacements of the tool.

There will also be displacements of the tool spindle from its theoretical axis of rotation due to inevitable clearance in the bearings.

An arrangement similar to that illustrated in FIGS. 4 and 5 may be incorporated in slide 1 and bed 2 though in this case the long plates are preferably mounted in channels in the slide and the small plates on bed 2 in a position such as to be bisected by the Y axis. Y axis errors will be caused by rolling displacements of slide 1 and will be correctly indicated by the angle of roll since, in a profile milling machine, such as that shown in FIG. 1, the height of the tool above the bed will be constant.

A small condenser plate mounted so as to be displaced, along the X axis, from one at least of those which form part of the rolling correction condensers, may be fixed to bed 2 in transverse alignment with plate 17. Here again the angle of pitching displacement alone is of interest as the height of the cutting point above slide 1 is constant.

Where provision for axial movement of the tool is made, as in the case of a die sinking machine for instance, the X and Y axis errors due to pitching and rolling displacements of slide 1, will depend on the position of the tool along its rotational axis, which may conveniently be designated as the "Z" axis. The difference between the capacities of the condenser pairs for pitching and rolling correction will then have to be combined with a signal indicating the position of the tool along the Z axis, in devising signals to correct X axis and Y axis errors resulting from pitching and rolling displacements of slide 1.

In the die sinking case instanced above, bodily Z axis displacements of slide 1 will need correction and in this case the average absolute capacity of the slide 1 rolling correction condensers will be a satisfactory measure of such Z axis displacements of slide 1, since these condensers are always in alignment with a plane containing the tool spindle axis.

Figure 8:
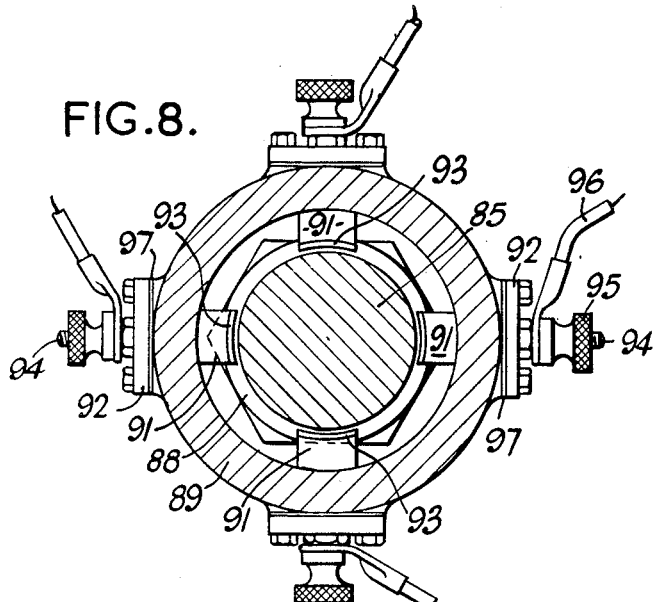
FIGS. 8 and 9 show, in sectioned plan and elevation respectively, the detail of the headstock of the machine tool shown in FIG. 1.
Figure 9:
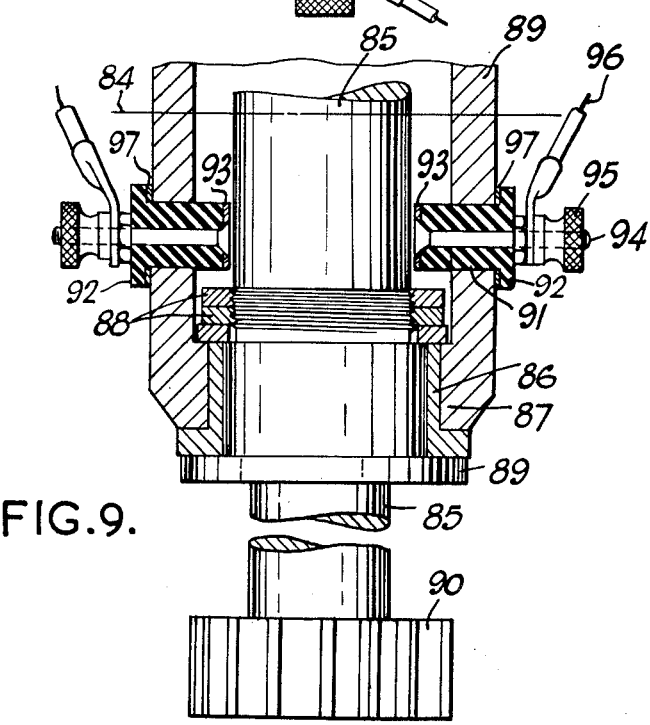

FIGS. 8 and 9 illustrate the application of a capacitor displacement sensing arrangement to the tool spindle. FIG. 8 is a plan of the arrangement shown in FIG. 9, sectioned along line 84 and FIG. 9 is an elevation sectioned along the centre line of the spindle.

The spindle 85, only the lower part of which is shown, runs in a plain bearing bush 86 forced into the lower end of a tube 87 which forms part of the headstock. Lock nuts 88 and a flange 89 on the spindle are provided to take axial thrust loads. A milling cutter 90 is carried by the lower end of the spindle.

Insulating blocks 91 of square cross section pass through closely fitting holes in the walls of tube 89 and have flanges 92 by which they are secured to flattened platforms furnished on the outer surface of tube 89.

The inner ends of blocks 91 are radiused to conform to the cylindrical contour of the spindle and are furnished with electrically conducting coatings 93. A screw 94 has its head embedded in the conducting coating of each block 91 and passes through it to form a shank for a terminal 95 which serves to secure a connecting lead 96.

The conducting coatings 93 are spaced away from spindle 85 by a small clearance which is adjusted by means of shims 97. This clearance varies if the spindle is displaced in its bearings. Each coating 93 forms one plate of a capacitor of which the spindle forms the other.

Four blocks 91 are shown in FIGS. 8 and 9, each pair of diametrically opposite blocks being concerned with the sensing of a displacement of the spindle in one of two directions at right angles to one another.

It is not strictly necessary to use both members of a diametrically opposite pair of blocks 91 but by doing so, a push pull effect can be obtained which facilitates the achievement of a linear characteristic of the correction signal as against spindle displacement.

Whether one or both members of a pair of blocks 91 are used, the correction signal derived from the capacity change due to displacement of the spindle 85 along the diameter joining a pair of blocks is applied to the controlling means for a slide of the machine which runs in a direction parallel to that diameter. In the case of FIG. 1, where the blocks 91 are generally indicated, one diametrically opposite pair will be aligned on the X axis and the other on the Y axis.

It should be noted that side play in a milling cutter spindle, can cause an error in any direction normal to the spindle axis, but two displacement sensing devices spaced 90° apart around the spindle can define the position of the spindle in relation to its bearings.

Although use may be made of the correcting signals derived from the condenser arrangements so far described, to guide the manipulation of manual controls it is in the case where such manipulations are carried out automatically that the invention finds its greatest use.

In one system of this type it has been proposed to use two optical diffraction gratings to indicate the position of a slide along its guides. One grating is a small one and the other is long enough to remain in engagement with the small one over a range of movement of the slide along its guides when both gratings are mounted parallel to one another and to the path of the slide along its guides. One grating is mounted on one of the relatively movable parts and the other on the other of such parts with their surfaces spaced apart by the minimum spacing which obviates contact and their grating lines are oriented so as to be slightly out of parallel alignment. So called "moiré fringes" which take the form of alternate light and dark strips transverse to the grating lines being much larger in width and spacing than the grating lines can be seen when light is passed through the two gratings, as observed along a line normal to the surfaces of the gratings and as movement takes place between the two gratings on movement of the slide along its guides the moiré fringes are seen to move in a transverse manner at a velocity which greatly magnifies the velocity of the slide upon its guides. The passage of these moiré fringes across the line of observation causes a varying of the observed light intensity in a cyclic manner the precise wave form of which is governed by the cross-sectional profile of the grooves of the grating, being substantially sinusoidal where the profile is such that diffracted light is concentrated in one order. The direction of motion of the fringes indicates the direction of movement of the slide. A light cell receiving this varying light intensity will generate a correspondingly varying electrical quantity which can be translated by electronic circuits into a suitable signal. In the system referred to control signals are fed into the system from a punched or varyingly magnetised tape and are in the form of pulses each of which corresponds to the movement of a moiré fringe past the line of observation. Electronic circuits are provided which accept the signal and cause movement of a motor which moves the slide along its guides. The control signals are simultaneously applied to an electronic counter circuit which records their number whilst the signals derived from the light cell on the passage of the moiré fringes after conversion into pulses, are also passed to the counter to cancel the control pulses stored therein. The circuit is arranged so that the motor is stopped when all the control signals applied to the counter have been cancelled. In a practical arrangement distinctive signals from the control circuits and the light cell circuits provide for the control of the movement of the slide in opposite directions along its guides.

This arrangement constitutes a positional servo system the potential accuracy of which can be gauged from the fact that the cyclic variation of the light reaching the light cell passes through a maximum and a minimum in the course of the passage of one moiré fringe past the line of observation and its replacement by another, corresponding to the movement of the slide along its guides for a distance equal to the spacing between adjacent lines on the gratings. A pulse can be derived both from the said maximum and the said minimum so that the position of the slide is determined within limits corresponding to half the grating line spacing. Accurate gratings can be readily produced with 5,000 lines per inch making possible the control of the slide to an accuracy of one ten thousandth of an inch.

If one grating could be fixed to move with the actual cutting point and the other to the fixed body of the machine tool the control servo loop would ensure the accuracy of the machining operation despite displacements of the intervening parts of the machine tool due to bending and play in slides, spindles and the like. Such a placing of the gratings is virtually impossible of achievement, and in any event the delicate optical apparatus of and associated with the gratings must be mounted well clear of the swarf, coolants etc. associated with the cutting process and attachment of one grating to a slide and the other to its bed is in general the best that can be achieved. This leaves outside the loop certain displacements in the direction controlled by the loop; for instance, in FIG. 1. a loop controlling movement of slide 7 along its slideway takes no account of transverse displacements of slide 1 on its slideway due to the take-up of inevitable working clearance nor displacements in the direction controlled by the said loop of the spindle carrying the milling cutter 5 in its bearings, normal to the spindle axis.

Whatever is done to reduce these displacements it is difficult to approach the order of accuracy of which the control loop is capable.

FIG. 1 shows in diagrammatic form a possible way of mounting the diffraction gratings.

Bed 2 has a channel 32 cut along its side, below the level of the bottom surface of bar 15.

A long grating 33 is mounted with its major axis substantially horizontal, and its surface in a vertical plane, so that at least part of its width hangs down below the upper wall of channel 32. A short grating 34 is mounted so as to hang down from any convenient point along the length of bar 15 in a position such that it is parallel to and close to the long grating 32, the latter being accurately aligned parallel to the X axis.

An optical system is supported on bar 15 and consists of a light source 35 suspended on a bracket so that it runs in channel 32, and a focussing system and a light cell 36. The light source 35 is aligned so that a beam of light passes through both gratings and enters the focussing system on the other side of the gratings.

This assembly is roughly indicated by dotted lines in FIG. 1 and more particularly shown in FIGS. 2 and 3.

A similar arrangement is shown in FIG. 1 for slide 7. Along grating 37 is attached to and hangs down below the lower edge of bar 19 and a small grating 38 is fixed to and hangs down below the lower edge of plate 18. As both surface 21 and plate 18 are preferably optical flats, 37 and 38 may be integral with them respectively, the grating rulings being marked on their lower edges. A light source 39 and focussing and light cell unit 40 are mounted on a bracket 41 fixed to slide 7. A machine such as that shown in FIG. 1 will have two control loops, including the two diffraction grating assemblies as above described, one for the X axis and the other for the Y axis but there will still be displacements which are not included in either loop. The correction signals derived from the capacitor 18, 21 (the simplest of the various displacement, correction above described) would, in an automatic control loop system of the type described, be translated into pulses varying in number according to the displacement distance with arrangements for indicating the sign of the correction required.

The loop system requires to have means for distinguishing between the two directions of motion and the correction signals will have to be correctly signed to take account of changes of direction. There are various ways known to the art, for providing for this performance on the part of the loop control system and the measures necessary to co-ordinate the displacement correction signals with such measures will vary according to their nature. The problem is a simple one however and the solution is well within the competence of those skilled in the art.

Having described individually the various methods for sensing displacements and the basic method of feeding such signals into an automatic control loop system, it is now proposed to outline the method of combining the various displacement indications and applying signals into that part of the system which is to secure the correction of displacements.

First take the case of displacements causing errors along the X axis. The following displacements are involved:

(i) Transverse displacements of slide 7, sensed by condenser 18, 21.

(ii) Rolling displacements of slide 7, sensed by condensers 24, 28 and 25, 29.

(iii) Yawing displacements of slide 1, sensed by condensers 12, 16 and 17, 16.

(iv) Pitching displacements of slide 1, sensed by condensers not shown but corresponding to condensers 24, 28 and 24, 30 which sense pitching displacements of slide 7.

In the case of (i) there is a simple capacity variation; in the case of (ii) there is a difference between two capacities which must be loaded by an invariable factor corresponding to the distance between the cutter and the rolling axis; in the case of (iii) there is again a difference between two capacities combined with a variable loading factor dependent on the position of slide 7 along its slideways and information of the latter can be obtained from the Y axis diffraction grating system and caused to provide the required loading in a manner to be described later; in the case of (iv) there is a difference between two capacities which must be loaded by an invariable factor corresponding to the height of cutting point above pitching axis of slide 1.

All these displacements must be reduced to a common denominator so that the resulting unit correction signal in each case corresponds to a unit displacement along the X axis, and the separate signals must be added together having due regard to sign to form a single correction signal which, when fed into the X axis control loop will produce a correction corresponding to the net displacement requiring correction.

Secondly take the case of displacements causing errors along the Y axis.

The following displacements are involved:

(v) Transverse displacements of slide 1 sensed by condenser 12, 16.

(vi) Rolling displacements of slide 1, sensed by condensers not shown but corresponding to condensers 24, 28 and 25, 29 which sense rolling displacements slide 7.

(vii) Displacements of the tool spindle from its theoretical axis of rotation, sensed by condensers 91, 85 (lying in the Y axis).

(viii) Pitching displacements of slide 7, sensed by condensers 24, 28 and 25, 29.

In the case of (v) there is a simple capacity variation; in the case of (vi) there is a capacity variation which must be loaded by an invariable factor corresponding to the distance of the cutting point from the axis of roll; in the case of (vii) there is again a simple capacitance change; in the case of (viii) there is a difference between two capacities which must be loaded by an invariable factor corresponding to the distance from the cutting point to the pitching axis of slide 7.

These corrections must again be reduced to a common denominator and added together having due regard to sign to produce a correction signal of such value and sign as will, when fed into the control loop system for the Y axis, produce the required correction.

Applying the same principles various other corrections on other types of machine can be devised, for instance where axial movement of the tool is provided for, Z axis displacements will arise at various points in the machine which can be sensed by pick-up devices of the general type already described and used, with any necessary loading to produce the correction signals for applying to the Z axis control loop.

Before describing the circuits for deriving the correction signals and applying them to the servo control loops to make corrections for the various displacements, it is convenient to outline certain principles which will preferably govern the organisation of the control and displacement correction system as a whole.

It has hitherto been the case in machine tools that the axes along which the movements of slides was postulated to take place have been defined by the slideways themselves. These slideways may readily be made with accuracies down to a few thousandths of an inch but greater accuracy is difficult to achieve in load bearing members, not merely because of the difficulties of machining truly accurate and rigid sliding surfaces but because of the compressibility of the inevitable oil films.

Automatic control systems of known type, such as the diffraction grating system described in connection with FIG. 1, compensate for inaccuracies in lead screws or other slide traversing mechanisms but performance is still at the mercy of the slides for lateral accuracy.

The control signals prepared for use in the control loops controlling the slides of the machine must be based on the assumption that certain theoretical axes of movement of the slides will be truly followed and if they are not the control signals will not be accurately carried out.

The invention enables the axes of slide motion to be defined by unloaded surfaces which can be of the accuracy familiar in optical elements, which is of an order far exceeding anything likely to be required of a machine tool.

These accurately defined axes are postulated in preparing the control signals for the control loops and within certain practical limits it does not matter if the mean paths of the slideways are not parallel to these axes since the convergence or divergence between the postulated avis and the actual slideway axis will cause a corresponding convergence or divergence between the co-operating elements of the displacement-sensing pick-up and corresponding correction signals will be applied to the appropriate control loop to cause the cutting path to follow the course prescribed by the control signals. The practical limits referred to are set by the limitations of the pick-up devices used, for instance with condenser pick-ups as described in connection with FIGS. 1, 2, 3, 4, 5, 8 and 9, the spacing between the plates must be close to give a practical value to the capacity and any large divergence between the plates will cause the capacity to fall to levels which will be very difficult to measure.

It is not immediately obvious how the X axis is defined in the arrangement shown in FIG. 1, where the long condenser plate 16 moves with the slide. One way of solving this problem is to lock slide 1 in an arbitrarily chosen position along its slideway and then to line up surface 16 so that it lies along the line of the postulated X axis. If when the slide is unlocked and traversed along its slideway, its mean path does not conform to the postulated X axis, 16 will diverge from or converge with plate 12 and cause correction signals to be generated. The mean difference between the capacities of 12, 16 and 17, 16 will remain constant under such circumstances.

Circuits for generating the requisite correction signals will now be described with reference to FIGS. 6 and 7.

It is preferred to derive a voltage proportioned to the instantaneous value of the displacement measured by each pick-up device. The method of doing this will vary according to the type of pick-up in use but as such methods are well-known to the art, it is proposed to describe only the case where condenser pick-up devices are used.

Each individual condenser (consisting of one small plate co-operating with one large plate) is connected so as to form part of the tuning circuit of an electronic oscillator whose oscillation frequency will thus vary with changes in capacity of the condenser. A discriminator circuit of well-known form will then be used to produce a unidirectional voltage proportional to the oscillator frequency.

Detailed circuits suitable for these purposes are disclosed in United Kingdom patent specification No. 577,538 of James Richard Cornelius entitled "Improved Method of and Means for Making Fine Measurements."

Where only the difference between two capacities is of interest the outputs of the two corresponding frequency modulated oscillators can be applied to a mixing circuit of conventional type to provide a difference frequency which will vary according to changes in the difference between the two capacities, and this can be applied to a single discriminator circuit. In the said United Kingdom patent specification No. 577,538 there is disclosed an electronic circuit in which the output from an oscillator, the frequency of which is varied by a measuring condenser, is mixed with the output of a constant-frequency oscillator to provide a difference frequency which is passed to a discriminator circuit capable of providing a voltage varying with the frequency of the said difference frequency. This circuit may readily be modified for the above purpose by replacing the constant-frequency oscillator by a second variable frequency oscillator whose frequency is under control of a second measuring condenser. Alternatively each oscillator can feed a separate discriminator circuit, the D.C. outputs of the two discriminators being subtracted one from another in a subtracting network.

Where an invariable loading of a pick-up indication is required, for instance for computing X axis errors due to rolling displacement of slide 7, an adjustable potential divider can be inserted to tap off a suitable proportion of the discriminator output. Indeed it is desirable that all displacement indications should be passed through such potential dividers so that all correction indications can be calibrated to a level which produces a correction effect conforming to the displacement for which correction is required.

Where a capacity indication requires to be loaded by a variable factor, for instance for computing X axis errors due to yawing displacement of slide 1, the factor being derived from the position of slide 7 along the Y axis, the information for obtaining the factor may be derived from the diffraction grating assembly of the control loop controlling movements in the appropriate axis and combined with the indications derived from the appropriate capacity difference to provide the required loaded correction signal. There is a simpler method of contriving such variable loading however which consists of a potentiometer connected across the output of the discriminator associated with the condensers in question, the slider of the potentiometer being mechanically linked to the slide upon whose movements the loading factor depends.

There will be errors in the potential divider itself and in the mechanical linkages to its slider but as the angular displacements to be loaded are likely to be very small, these errors are unimportant.

The method of combining the displacement indications leading to X axis errors will now be described with reference to FIG. 6.

*Displacement* (i).—Transverse displacement of slide 7 is sensed by condenser 18, 21, which modulates the frequency of an oscillator 42, the output of which is applied to a discriminator 43. Discriminator 43 is adjusted to zero output for a chosen mean capacity of condenser 18, 21 so that displacements on opposite sides of that mean produce output voltages of opposite sign. A calibration potentiometer 44 adjusts the output of 43 so that the correction signal corresponding to unit displacement produces a correction action of unit dimensions.

*Displacement* (ii).—Rolling displacement of slide 7 is sensed by condensers 24, 28 and 25, 29 which respectively modulate the frequencies of oscillators 45, 46, whose outputs are mixed in mixer 47 to produce a difference frequency proportional to the angle of roll. A discriminator 48 is fed by 47 and is adjusted to provide a zero output for a predetermined mean attitude of slide 7 so that displacements in opposite rolling directions, from that attitude, produce output voltages of opposite sign. A potentiometer 49 is provided to load the output of 48 according to the distance of the cutting point from the rolling axis of 7 and it can also be used for calibration.

*Displacement* (iii).— Yawing displacement of slide 1, is sensed by condensers 12, 16 and 17, 16, which respectively modulate the frequencies of oscillators 50 and 51, whose outputs are mixed in mixer 52 to produce a difference frequency proportional to the angle of yaw. A discriminator 53 is fed by 52 and is adjusted to provide a zero output for a predetermined mean attitude of slide 1 (the attitude in which it is locked for aligning 16 along the X axis) so that displacements in opposite yawing directions produce output voltages of opposite sign. A potentiometer 54 loads the output of 53 according to the position of slide 7 along its slideway by means of a mechanical linkage, shown diagrammatically by double lines 55.

An additional calibration potentiometer 56 is provided.

*Displacement* (iv).—Pitching displacement of slide 1 is sensed by condensers analogous to circuit (ii), the loading and calibration potentiometer 57 being adjusted to allow for the distance between the cutting point and the rolling axis of slide 1.

In addition to the circuits shown in United Kingdom patent specification No. 577,538 referred to above, circuits suitable for use as the frequency modulated oscillators 42, 45, 46, 50 and 51 of FIGURE 6 are described in the issue of the periodical "Electronics" dated December 1946, at page 106, in an article by R. W. Dayton and G. M. Foley, and circuits suitable for the discriminators 43, 48 and 53 are described in the United States patent specification No. 1,642,173 and also in the "Proceedings of the Institute of Radio Engineers," volume 25, dated March 1937, at page 289, in an article by D. E. Foster and S. W. Seeley. Components suitable for use as potentiometers 44, 49, 54, 56 and 57 are described in the "Components Handbook," volume 17, of the Massachusetts Institute of Technology Radiation Laboratory Series, dated 1949, particularly in Figures 8.25 and 8.26 on page 277. Circuits suitable for use as mixers 47 and 52 are disclosed in United States patent specification No. 2,039,405.

The outputs of circuits (i), (ii), (iii) and (iv) are passed through individual decoupling resistances to a summation circuit 58 in which they are added or subtracted according to sign. The output of 58, after suitable amplification in amplifier 59 is then a voltage proportional to the combined displacements for which correction is required, having due regard for the signs of those displacements.

A circuit suitable for use as summation circuit 58 is described in the textbook "Electron Tube Circuits" by S. Seeley, published by McGraw-Hill in 1951, at page 148 and in Figure 8.6, and the same book describes a circuit suitable for use as amplifier 59 at page 39 and in Figure 3.1.

The simplest way of using the output of 59 to provide the required X axis correction is to mount the diffraction grating 33 so that it is capable of longitudinal movement against springs 60. A transducer 61 receives the output of 59 and shifts grating 33 by an amount sufficient to cause the X axis control loop to make the necessary displacement.

A circuit suitable for use as transducer 61 is described in the "Proceedings of the Institute of Radio Engineers," volume 36, dated 1948, at page 1,029 and in Figure 8, of an article by V. N. Cohen and A. Bloom.

More detailed circuits representing the schematic blocks of FIGURE 6 are shown in FIGURES 10, 11 and 12, in which the reference numerals used in FIGURE 6 have been set against the corresponding circuits. In FIGURE 10 the lower rectangle marked "(i)" shows the condenser 18 connected in parallel with part of a tapped inductance 200. This combination of inductance and capacity form the freqency determining element of a triode oscillator tube 203, and as the capacitance varies so the oscillator frequency is altered. This oscillator circuit closely resembles an oscillator circuit described in the September 1946 issue of the periodical "Electronics" at page 108, being a "single-ended" and simplified version of the balanced oscillator illustrated in Figure 5 of the article beginning on the said page.

Condenser 201 and resistor 202 enable the correct biasing conditions to be obtained at the grid of the triode 203. The plate of the triode 203 is connected back to the coil 200 via condenser 204 and under these circumstances an oscillating voltage may be obtained at the triode plate due to regeneration in the circuit; the blocking condenser 204 prevents the shunting of the anode current supply source by a low impedance direct current path.

The voltage at the anode of triode 203 is applied to the grid of an amplifier tube 207 via a high frequency transformer consisting of primary and secondary coils 205 and 206 respectively. The tube 207 is a conventional tetrode or pentodes with a tuned plate circuit formed by coil 208 and condenser 209 connected in parallel. This circuit is tuned to the frequency (afterwards called the centre frequency) which is generated by the oscillator when there is no deflection of the condenser 18 from its true position, i.e. when no error is indicated. Coil 211 is also tuned to this frequency by means of condenser 212. Coil 211 together with diodes 213 and 214 forms part of a discriminator circuit of a type which was described in an article in the Proceedings of the Institute of Radio Engineers of 1937 at page 297 and illustrating in Figure 4 accompanying that article.

Coil 211 is coupled inductively to coil 208 and a centre tap connection on coil 211 is connected to one side of coil 208, condenser 210 being a large condenser which appears as a virtual short circuit at the centre frequency. The effect of this connection is to upset the symmetry of the centre tapped coil 211, in that looking from the plate either of diode 213 or of diode 214, the coil has a slightly different resonant frequency, one above and the other below the centre frequency.

It must, however, be noted that the circuit is still symmetrical in that, at the centre frequency, both plates receive an equal excitation. As, at the centre frequency, both diodes 213 and 214 during alternate half cycles pass an equal amount of charge into the respective terminals of the condenser 215 to which their cathodes are connected, no resultant potential differences appears across condenser 215 at the centre frequency.

At frequencies slightly above the centre frequency a greater alternating signal will appear at one diode plate than at the other so that a resultant potential difference of one sign exists across condenser 215. At frequencies slightly below the centre frequency a potential difference of opposite sign is produced.

The condenser 215 is bled by a loading resistor 216 and also by the potentiometer 44. The bleed resistor(s) only allows the potential build-up across the condenser 215 to attain a value such that the amount of charge gained by the condenser during one cycle equals the amount of charge lost across the bleed resistance during that cycle. It also allows the condenser potential to follow a diminution in the signal level. Loading resistor 216 may conveniently be combined with potentiometer 44 though they are shown as separate components in FIGURE 10.

The upper rectangle of FIGURE 11, marked "(ii)" has two oscillator circuits similar to the circuit associated with triode 203 and corresponding items have the same reference numerals with distinguishing subscripts. In these oscillator circuits however plates 24, 28 and 25, 29 take the place of 21, 18 as the variable tuning elements.

The output voltages of oscillator tubes 203a and 203b are transferred by means of transformers 205a, 206a and 205b, 206b interconnected at their secondary windings which are connected to a mixer circuit.

The mixer circuit is a conventional device consisting of four semiconductor diodes 217a, 218a, 219a, 220a connected in the form of a bridge. The sum of the input signals from 206a, and 206b, is rectified in a "fullwave" manner, and the signal so produced contains a mixture of the signal frequency harmonics and the sum and difference of the frequencies and their harmonics. This mixer circuit is of the same type as the mixer circuit described in United States patent specification No. 2,039,405 (Green) and illustrated in a part of Figure 1B of the drawings accompanying that specification.

The plate circuit of amplifier tube 207a, consisting of coil 208a and condenser 209a connected in parallel is tuned to the sum of the two centre frequencies of oscillators 45 and 46 and the parallel combination of coil 211a and condenser 212a is similarly tuned.

The signal from the plate circuit of tube 207a, whose frequency is the sum of the two oscillator frequencies (45 and 46) and whose deviation from the centre frequency is the sum of the frequency deviations of the two oscillators and therefore a measure of two capacitor displacements (24 and 25), is demodulated by the discriminator 211a, 212a, 213a, 214a, 215a, and 216a in the same manner as described above in relation to 211, 212, 213, 214, 215, 216.

FIGURE 11 shows the circuits corresponding to the circuit units "(iii)" and "(iv)" of FIGURE 6. These circuits are similar to the rectangle "(ii)" of FIGURE 10 and operate in the same way though, in the case of rectangle "(iii)" the oscillator variable element consists of 12, 16 for one oscillator and 17, 16 for the other and in the case of rectangle "(iv)" the oscillator variable elements consist for instance of plates (not shown) associated with slide 1 which correspond to 28, 24 and 30, 24 associated with slide 7 and for convenience these numerals, primed, are used in FIGURE 11. In the case of rectangle "(iii)" of FIGURE 11 the output of the discriminator is applied to a potentiometer 54 the slider of which is coupled to slide 7 so that the output from this circuit depends upon the position of slide 7 along its slideway, for reasons previously described.

The four output signals pass from the rectangles "(i)," "(ii)," "(iii)" and "(iv)" of FIGURES 10 and 11 through the calibrating potentiometers 44, 49, 56 and 57 respectively the outputs from which pass through leads 222, 223, 224, 225 to the circuits of FIGURE 12 which correspond to the middle and lower parts of FIGURE 6. There the signals pass through summing resistors 226, 227, 228 and 229 to the grid of the pentode amplifier 232. This amplifier has a grid resistor 231 and a feedback resistor 230 connecting the anode to the grid providing degenerative feedback. The gain in each of the channels representing the incoming connections 222, 223, 224 and 225 depends on the ratio of the individual summing resistor (226, 227, etc.) to the feedback resistor 230 if amplification of the pentode stage with the resistor 230 disconnected is made sufficiently high. These summing resistors and the amplifier tube circuit combine the functions of circuit blocks 58 and 59 of FIGURE 6. Such a summation amplifier is described on page 148 and illustrated in Figure 8.6 of the textbook "Electron Tube Circuits" by S. Seeley published by McGraw-Hill.

A qualitative idea of the working of the circuit may be obtained by assuming the gain without feedback to approach infinity. In order to get a finite signal at the plate, the signal at the grid must tend to zero. The circuit automatically adjusts its potential levels to make this so by means of the potentiometer effect obtained from resistor 230 and each of the summing resistors.

If the gain is finite but high, the signal at the grid may be made small enough to be neglected and the same automatic adjustment may be assumed to take place.

As the signal at the grid of tube 232 is typically very much smaller than the signals at any of the inputs, or at the anode, the signal voltage appearing across resistor 231 will be very much smaller than that across resistors 226 to 230 inclusive.

All these resistors will be of the same order of magnitude as each other, and the signal current in resistor 230 will thus be of a smaller order and its effect can be neglected as far as the potentiometer effects between the various inputs and the anode are concerned.

Resistor 231 is a grid to cathode return resistor to limit the magnitude of ion current from the grid of tube 232.

The plate of tube 232 is connected to a source of high tension current through a high impedance coil 237 wound with many turns of fine wire and mounted on a thin cylindrical bobbin attached to a mounting disc 238. Coil 237 is suspended, by centering means not shown, in the annular gap between a central pole piece 235 and an outer pole piece 234 across which a strong magnetic field is set up by means of a tubular magnet 233 which makes contact with 234 at one end and, via a sole plate 236, with 235 at the other end. Flexible leads 239 and 240 permit free axial movement of coil 237.

Interaction of the magnetic field set up by magnet 233 and the magnet field due to the current in the wire produces a force on the coil and disc assembly 237, 238 and this in turn, acting through a push rod 241, moves the diffraction grating 33 against the force of spring 60, thus providing the necessary displacement of the grating. This coil and magnet assembly represents the transducer 61 of FIGURE 6 and a similar transducer is described in an article commencing on page 1045 of the "Proceedings of the Institute of Radio Engineers" for 1948 and illustrated in Figure 8 of the drawings accompanying that article.

An alternative method of producing the correction is shown in FIGURE 7. The output of amplifier 59 is applied to a gate pulse circuit 62 which produces a succession of pulses evenly spaced as to their starting time but having a duration dependent on the instantaneous value of the output voltage from 59.

A circuit suitable for use as gate pulse circuit 62 is described in the textbook "Electronic and Radio Engineering," 4th edition, published by McGraw-Hill, at page 967 and in Figure 24.21, in an article by F. E. Terman.

These pulses are applied to a gate circuit 63 which is opened in the presence of such pulses to admit passage of clock pulses from a generator 64.

A circuit suitable for use as gate 63 is described in the publication "Waveforms," being volume 19 of the Massachusetts Institute of Technology Radiation Laboratory Series, in section 10.3 and in Figure 10.16, in an article by Chance and others. A circuit suitable for use as clock pulse generator 64 is described in the textbook "Electronic Time Measurements" by Chance and others, published by McGraw-Hill in 1949, in section 4.3 and in Figure 4.6.

Clock pulses passed by gate circuit 63 are received by a pulse counter comparator 65 which is adapted to count such pulses and compare their number with the number of clock pulses received during the previous gate pulse. It is assumed that the output of 59 is always of one sign, a predetermined value representing zero. This means that a predetermined number of clock pulses represents zero, the excess over this number indicating positive displacements and the deficit below this number indicating negative displacements.

A sign circuit 66 converts pulses from 65 above the predetermined number into pulses characteristic of positive displacements and in the case of clock pulses from 65 fewer than the predetermined number the complement to the predetermined number is produced in the form of pulses characteristic of negative displacements.

An alternative method of sign indication is to use a differential amplifier for 59, capable of giving an output voltage of different polarity according to the sign of the input it receivers from 58. Gate pulse circuit 62 should then be duplicated, both halves being biassed so that the gate pulse disappears when the output from 59 is zero, one gate circuit being operated for positive outputs and the other for negative outputs of 59. Clock pulse circuit 64 is gated by two gate circuits such as 63, each controlled by one of the duplicated gate pulse circuits 62. Counter comparator 65 will have an input from each gate circuit and must then be capable of counting in opposite directions according to which input receives pulses, and of adding or subtracting in arriving at the comparison with the previous total.

With either arrangement, 65 is only required to give an output when the incoming pulses during one gating interval differ in number and/or sign from those counted during the previous gating interval. For reasons which will be apparent later, a sign circuit 66 will be required in either case to convert the output of 65 into pulses of negative form or positive form according to the sign of the output of 65.

The output of 66 is applied to one point of a three-point time sharing distributor 67. The other two points are connected to the circuits producing the control pulses and the circuits producing the monitoring pulses respectively. The former are shown schematically as a tape reproducing device 68 feeding a pulse forming circuit 69 which must be capable of producing pulses of two types according to the direction of movement required. Whatever distinguishing characteristics are chosen for these two types of pulses sign circuit 66 must be adapted to produce the same types of pulses. The latter circuits feeding the third point distributor 67 are shown schematically as the light cell circuit 36 (see FIG. 2 and FIG. 6) and a pulse forming circuit 70 similar to 69.

A circuit suitable for use as the time sharing distributor 67 is disclosed in United States patent specification No. 2,021,743 and a device suitable for use as magnetic tape reproducing device 68 is disclosed in the periodical "Electronics" for July 1954 in an article by W. S. Buslik. A circuit suitable for use as pulse forming circuit 69 is disclosed in the "Proceedings of the Institution of Electrical Engineers" (of Great Britain), volume 99, Part II, at pages 94 to 106 in section 10.3 in an article by F. C. Williams, T. Kilburn and G. E. Thomas. A cell suitable for use as photo-electric cell 36 and a circuit suitable for use as pulse forming circuit 70 are disclosed in the periodical "Aircraft Production" for July 1955 at pages 267 to 272 in an article by D. T. N. Williamson and in more detail in United Kingdom patent specification No. 760,321 (published in the United Kingdom October 31, 1956).

The common member of distributor 67 connects the three-points in turn continuously to a difference accumulator 71 via a sign sensing circuit 72 which directs the pulses to one or another inlet to 71 according to sign. Difference accumulator 71 is a two-way counter which keeps a running "profit and loss" account of pulses received from distributor 67 and its output drives the motor 70 which traverses the slide along its slideway.

To avoid the loss of pulses from 69 or 70 which may arrive in the intervals when their points on the distributor 67 are not connected to 72, accumulators 73 and 74 are inserted between 69 and 67 and 70 and 67 respectively.

These accumulators must be of such a type that they can store pulses of either sign and deliver them up when the appropriate point of 67 is swept by the common member at the same time restoring to zero.

The detailed circuits representing the schematic blocks of FIGURE 7 are shown in FIGURES 14 to 27 inclusive and are described below.

The counting principle according to which the circuits of FIGURES 14 to 27 operate uses binary of "radix 2" arithmetic throughout and may be explained as follows.

In a "radix 2" system each digit position is occupied by a "1" or a "0" and the addition of a 1 to any digit place already occupied by a "1" changes that digit to "0" and generates a "carry" of 1 to the next more significant digit place. If two multi digit numbers are being added together a "carry" may have to be passed along several digit places in succession where the additions in those places themselves demand the carrying of "1." This passing on of the "carry" continues until a digit position is reached where there is a "0" in both addend and augend and the carry does not proceed to the stage after that.

If discrete "1"'s are added successively to the least significant digit place there is a "carry" every time a digit place changes from "1" to "0." In the least significant place this change will take place every other addition, in the second place the change takes place every fourth addition, in the third place every eighth addition, in the fourth place every sixteenth addition, and so on.

This will be illustrated in certain examples which follow. In these examples the least significant digit will always appear on the left since the accumulator circuits 65, 73 and 74 have been drawn in FIGURE 19 and FIGURE 16 according to the convention in common use in electronic circuits in which the sequence from cause to effect proceeds from left to right.

This arrangement of the digit places in the said examples differs of course from the arrangement of digit positions in common use in decimal numbers where the least significant figure is on the right of the number, but it is considered to be less confusing to make the order of digit places of the binary numbers correspond with the digit counting stages of the accumulators.

The common decimal arrangement can readily be obtained by turning the sheet containing the example upside down.

The following table shows the binary digit values corresponding to certain decimal numbers, in a four digit binary system.

TABLE I

| Decimal Digit | Binary Digits | | | |
|---|---|---|---|---|
| 7 | 1 | 1 | 1 | 0 |
| 6 | 0 | 1 | 1 | 0 |
| 5 | 1 | 0 | 1 | 0 |
| 4 | 0 | 0 | 1 | 0 |
| 3 | 1 | 1 | 0 | 0 |
| 2 | 0 | 1 | 0 | 0 |
| 1 | 1 | 0 | 0 | 0 |
| 0 | 0 | 0 | 0 | 0 |
| −1 | 1 | 1 | 1 | 1 |
| −2 | 0 | 1 | 1 | 1 |
| −3 | 1 | 0 | 1 | 1 |
| −4 | 0 | 0 | 1 | 1 |
| −5 | 1 | 1 | 0 | 1 |
| −6 | 0 | 1 | 0 | 1 |
| −7 | 1 | 0 | 0 | 1 |
| −8 | 0 | 0 | 0 | 1 |

The way in which the negative numbers are arrived at can best be explained by reference to a conventional cyclometer adding machine working on the decimal system of numbering and having say four digit positions. The least significant figure will be on the right in such a machine, and this convention is for the moment resumed.

The setting "0000" represents a zero total as in any numbering system whatever the radix. If the machine is turned backwards by one unit the reading will be "9999." If it is turned backwards by a further unit the reading will be "9998." These two numbers are called the complements of 1 and 2 to the number represented by the four positions set at "0" with the addition of a "1" to an imaginary next higher digit position, i.e. to 10,000. The complement of a number can therefore be considered to be the equivalent of that number with a negative sign.

If after turning the machine twice backwards leaving the setting 9998, it is turned forwards five units, the dials will retrace their steps through 9999, 0000, 0001, 0002, to 0003. Minus 2 will then have been added to plus 5 to give plus 3.

Similarly, in a binary system, negative numbers can be represented by their complements. For instance (reverting to the arrangement with the least significant digit on the left), the complements of various numbers are as follows:

TABLE II

| Number | Complement | =minus |
|---|---|---|
| 1 | 1 1 1 1 | 1 |
| 2 | 0 1 1 1 | 2 |
| 3 | 1 0 1 1 | 3 |
| 4 | 0 0 1 1 | 4 |
| and so on. | | |

This can be tested by adding "1" to the least significant digit of each number with any necessary carrying to the next more significant digit, when it will be found that the next lower (negative) number will be produced; the same process continues upwards past zero throughout the positive numbers of increasing values, as seen in Table I.

The process of subtraction proceeds in converse manner downwards through Table I. If "1" is successively added to the least significant digit, it is seen that this digit changes from "1" to "0" and back alternately and so far as this place is concerned addition and subtraction are indistinguishable. When descending Table I however it will be found that the next lower number is obtained if the carry to the next higher digit place takes place on the transition from "0" to "1" (rather than the transition from "1" to "0" as in the case of addition).

It is important to note that a four digit place system can only differentiate sixteen different numbers, i.e. from plus 7 down to minus 8, including zero. Therefore if the system is brought to zero before an arithmetical operation, not more than 7 units may be added nor more than 8 units subtracted. In a five digit place system the corresponding limits would be fifteen units for addition and sixteen for subtraction. At the other extreme of a two digit place system the corresponding limits would be 1 unit for addition and 2 units for subtraction. If these limits are exceeded, the system breaks down, for instance +8 according to Table I would be "0001" which is indistinguishable from minus 8 and −9 would be "1110" which is indistinguishable from plus 7.

It will be noted in Table I that all the positive numbers have "0" in the most significant place and all the negative numbers have "1" in the most significant place. This fact is made use of in accumulators 65, 73, 74 and 71 by using the state of the most significant counting stage to indicate the sign of the number stored in the less significant stages.

It will be seen from Table I that any two numbers (negative or positive) can be added together by a straightforward addition process as already outlined, the "1" to "0"=carry rule being applied. For instance:

TABLE III

| +6 | 0 | 1 | 1 | 0 |
| −7 | 1 | 0 | 0 | 1 |
| −1 | 1 | 1 | 1 | 1 |

TABLE IV

| −3 | 1 | 0 | 1 | 1 |
| +5 | 1 | 0 | 1 | 0 |
| +2 | 0° | 1 | 0° | 0 |

An accumulator having a smaller number of digit stages can similarly be connected for addition to an accumulator having a larger number of stages, for instance:

TABLE V

| Small Accumulator | −2 | 0 | 1 | 1 | (1) |
| Large Accumulator | +6 | 0 | 1 | 1 | 0 |
| New Total | +4 | 0 | 0° | 1° | 0 |

TABLE VI

| Small Accumulator | +3 | 1 | 1 | 0 | (0) |
| Large Accumulator | −2 | 0 | 1 | 1 | 1 |
| New Total | +1 | 1 | 0° | 0° | 0 | or

TABLE VII

| Small Accumulator | −3 | 1 | 0 | 1 | (1) |
| Large Accumulator | −5 | 1 | 1 | 0 | 1 |
| New Total | −8 | 0° | 0° | 0° | 1 |

It will be seen that the most significant digit of the smaller accumulator needs to be repeated to the higher stages of the larger accumulator. In practice this is easily achieved by coupling the output of the most significant stage of the smaller accumulator to the inputs of the higher stage(s) of the larger accumulator as well as to the corresponding stage of the latter. This is indicated in Tables V, VI and VII above by repeating the most significant digit of the smaller accumulator in imaginary higher digit places, in brackets.

The above arithmetical principles are applied in the circuit of accumulator 74, shown in FIGURE 17, in the following manner:

This circuit must count pulses received from the diffraction grating pick-ups 36 in each cycle of the time sharing distributor 67 and deliver them up when 74 is scanned by 67, whereafter 74 is reset to zero. The rate of arrival of pulses from 36 is limited by the maximum speed of which the machine tool slide is capable and it is unusual that more than one pulse shall be found in accumulator 74 at any one time though provision is made for more than this. Accumulator 74 will receive positive or negative inputs. Every count into accumulator 74 will start from zero, to which it is repeatedly reset by time sharing distributor 67, and if a positive number is to be counted in, the first stage will change from "0" to "1" with the first unit counted in; the second unit counted in will change the first stage back to "0" and produce a carry which will change the second stage to "1." If the input is negative the first unit changes the first stage over from "0" to "1" (just as in the case of a positive input), but to produce the corect total of 1 1 1 − − − it must be arranged for a "carry" to take place on the "0" to "1" transitions instead of the "1" to "0" transitions. This carry will be passed along the stages as each changes from "0" to "1" to produce −1 in the total. The second unit counted in will change the first stage from "1" back to "0" but there must be no carry. Thus when negative numbers are to be counted in it is only necessary to condition the accumulator to carry on "0" to "1" transitions rather than "1" to "0" transitions and this is done in accumulator 74 by means of two carry gates in each stage, one receiving the "1"–"0" transitions of a flip flop counter unit in the stage and the other receiving the "0" to "1" flip flop transitions. One of these gates is opened for positive counts and the other for negative counts.

Accumulator 65 immediately after one "appearance" on the distributor must count in a number of clock pulses corresponding to the aggregate error signal from amplifier 59 for the time being, hold this total till immediately after the next "appearance" on the distributor, then count in the then current error, but so that the new number is subtracted from the existing stored number in the same way as subtraction is effected in accumulator 74, i.e. by changing the "carry" conditions. The difference is fed out to the different accumulator 71 on the appearance of the succeeding channel pulse and immediately thereafter the accumulator is reset (during the continuance of the same channel pulse) in readiness to receive the new count after the disappearance of that channel pulse.

The error existing at the moment of switching on the apparatus is treated as the datum error for the purpose of the machining programme. Until the slide starts to move in response to command pulses from tape pick-up 68, this starting error will be fed into the accumulator of 65 and repeatedly subtracted from itself to give a zero output to accumulator 71. In fact accumulator 71 will be held at zero by a zeroing key until a few cycles of distributor 67 have been completed so that any residual readings left in the accumulators of 65 from previous operations, have been cleared down by the periodic resetting of the accumulators.

Enough stages are provided in the accumulators of 65 to count up to the extent of the maximum error signal which can arise but as there is a limit to the speed at which a change of error can take place due (inter alia) to inertia of the machine tool parts concerned, the successive differences to be fed into accumulator 71 will be very much smaller than the total counts so that it is not necessary to connect all the stages of the accumulators of 65 to accumulator 71. Whilst the second count is being fed into this accumulator, it is also being applied (as the first count) to another accumulator which has previously been read into the difference accumulator 71 and has been cleared down to zero. These two accumulators work in turns.

Accumulator 73 is the same as one of the accumulators of 65 but it has merely to receive inputs from tape reading device 68, which may be negative or positive and will not in general provide more than one unit per "appearance" on the distributor 67. The counting procedure is as previously described in relation to Table I above. After each total has been read out the accumulator is reset to zero. The inputs to accumulator 73 consist of pulses of the same type whether negative or positive commands are involved but in the case of positive commands the pulses are routed into the "add" input of the accumulator and advance its setting the positive direction with "carry" on "1" to "0" transitions, whereas negative commands are routed to the "Subtract" input of the accumulator and regress its setting in the negative direction (according to Table I), with "carry" on "0" to "1" transitions.

The various accumulators are fed into difference accumulator 71 in turn by simple addition stage to stage with conventional carry arrangements on "1" to "0" transitions. This method of addition has already been explained in relation to Tables III, IV, V, VI and VII above.

FIGURE 14 shows circuits corresponding to items 36 and 70 and FIGURE 15 shows wave forms involved, as described by Pack and Obetz, in the Journal of the Optical Society of America, volume 43, pages 505 to 509.

It has been indicated above that in an automatic machine tool controlling previously proposed, movements of a slide are monitored by means of diffraction gratings, a short grating which may be carried by the slide, being moved over a long grating which may be carried by the slideway, a light beam passing through the two gratings being intercepted by a light cell arrangement adapted to distinguish between different directions of movement of the slide and to deliver distinctive signals for these two directions of movement. In one known system of this type two light cells are provided and they are located so as to intercept two beams (one to each cell) which pass through the two gratings at points separated along the direction of movement of the moiré fringes by a distance equal to one quarter of the distance between adjacent fringes so that, on relative movement of the gratings the sinusoidal outputs from the light cells are in quadrature phase relationship. FIGURE 14 relates to a system of this type, the two light cells being designated 36 and 36a.

The two cells 36 and 36a receive sinusodially modulated optical signals in phase quadrature through the grating pair and these signals are individually amplified by vacuum tubes 242 and 242a, output signals appearing across the plate resistors 243 and 243a. The resistors 244 and 244a form the loads for their respective photocells 36 and 36a and also serve as grid-to-cathode return resistors for the amplifier tubes 242 and 242a.

The two plate signals are subsequently dealt with in different manners. The signal from plate resistor 243 is connected to two identical circuits via the grids of triode tubes 245 and 245a.

Tubes 245 and 246 together with associated resistors 247 to 251 inclusive constitute the so-called Schmitt trigger circuit described in the Journal of Scientific Instruments, 1938, volume 15, page 24. The circuit has two stable states, in which one tube is heavily conducting and the other cut off. The state in which both valves are conducting is unstable due to positive feedback via the common cathode resistor 247 and thus a sharp transition from one stable state to the other stable state is obtained.

Tube 245 becomes suddenly conductive when its grid is raised (positive) above a certain critical potential and remains conductive until hte grid falls (negative) below a second critical potential (below the first critical potention) whereupon the circuit reverts to its original state with 245 not conducting.

The second trigger circuit comprises tubes 245a and 246a and associated resistors 247a to 251a and is of similar form to the first trigger circuit except that its critical potentials are adjusted to values within the range of the critical potentials of the first trigger circuit.

The outputs of the light cells 36 and 36a are of sinusoidal wave form with a phase relation which depends upon the direction of motion of the slide.

The sinusoidal signal from 36, applied to the inputs of the two trigger circuits triggers and re-triggers each circuit cyclically so that a rectangular wave, shown at A in FIGURE 15, appears at the plate of tube 246 and a similar wave, shown at F in FIGURE 15, appears at the plate of tube 246a.

A third trigger circuit composed of tubes 245b and 246b and associated resistors 247b to 251b inclusive, is exactly similar to the trigger circuit 245a/246a, and converts the amplified sinusoidal signal from photocell 36a into a square wave, shown at G and H in FIGURE 15, which appears at the plate of tube 246b and is in quadrature phase relationship with the signal from the plate of tube 246a. When the machine tool slide is moving forwards the phase of this square wave is as shown at G of FIGURE 15 and when the slide is moving backwards the phase of the square wave is as shown at H of FIGURE 15.

The square waves F and G (or H) of FIGURE 15, are amplified respectively in two cathode coupled amplifiers, one comprising two tubes 252 and 253 with associated resistors 254 to 256, and the other comprising two tubes 252a and 253a, with associated resistors 254a to 256a. Such amplifiers are described in British patent specification No. 482,740 of A. D. Blumlein.

Square waves in antiphase (shown at E and F in FIGURE 15), appear respectively at plates of tubes 252, 253 whence they are applied to potentiometers formed by resistors 257, 258 and 259, 260, the tappings of which lead respectively to leads designated "forward gate pulses" 275 and "backward gate pulses" 276.

These potentiometers are adjusted to give the required voltage conditions on the forward and backward gate pulse leads, as is hereinafter explained.

The amplifier comprising tubes 252a and 253a and associated resistors 254a to 256a is similar to the amplifier comprising tubes 252 and 253. An output consisting of a square wave, shown at G (or H) in FIGURE 15, is taken from the plate of 253a only and is fed via a potentiometer consisting of resistors 259a, 260a, to the third grid of gating tube 272 via lead 261.

The square wave output from the first trigger stage (i.e. from the plate of tube 246) is connected to an amplifier tube 264 via a small condenser 262 so chosen that in conjunction with a grid resistor 263 a high pass filter section is formed which passes only the sharp transitions of the applied wave form to the grid of a following tube 264, from which alternatively positive and negative pulses (shown at B in FIGURE 15) are obtained in an amplified form across anode resistor 265. Condenser 266 and resistor 267 act in a similar manner to the condenser and resistors 262, 263 and each pulse is formed into a bi-directional pulse (shown at C in FIGURE 15) which is again amplified by triode tube 268, this tube being normally biased to full conduction so that a positive going pulse wave (shown at D in FIGURE 15), appears across anode resistor 269 for each negative going peak of the bi-directional pulses C, corresponding to each square wave transition originally appearing across the anode resistor 251 of tube 246.

Coupling capacitor 270 feeds these pulses into the control grid of gating tube 272.

Gating pulses received on lead 261 (shown at G (or H) in FIGURE 15) ensure that alternative pulses are gated out or blocked, and according to the phasing of the input photocell signals each of the pulses (shown at I (or J) in FIGURE 15) appearing at lead 274, designated "count pulses" either produced during a forward gate pulse (E in FIGURE 15) or during a backward gate pulse (F in FIGURE 15), on leads 275 and 276 respectively. This arises from the fact that the signal from light cell 36a, from which is derived the gating signal (G (or H) in FIGURE 15) appearing on lead 261, has either the phase shown at G in FIGURE 15, for one direction of travel of the machine tool slide, or a phase removed therefrom by 180° which is shown at H in FIGURE 15, these phases of the gating signals on lead 261 being reckoned in relation to the phases of the signals derived from light cell 36 as they are shown at E and F of FIGURE 15. Pulses derived from the photocells 36 and 36a occur in random timing. It is thus possible that the pulses delivered on lead 274 may clash in accumulator 74 with the reset pulses which, as explained in detail below (in relation to FIGURE 16) are applied by time sharing distributor 67 to accumulator 74.

If such a coincidence occurred a count pulse would be lost, leading to a positioning error in the machine tool. The paralysis gate 280 is introduced to prevent such a coincidence by holding back any count pulse occurring within a certain time on either side of a reset pulse and releasing it after that time has expired.

The circuit of paralysis gate 280 is described in detail in relation to FIGURE 28.

Count pulses emerging from paralysis gate 280 are applied over lead 279 to accumulator 74.

It will be shown below how the signals on the count pulses lead 279 are utilised to distinguish between the different directions of movement of the machine tool slide.

Details of accumulator 74 of FIGURE 7 are shown in block form on FIGURE 16. This circuit is in the form of that described by Pack and Obetz in the said article in the Journal of the Optical Society of America having been previously described in an article by Barney commencing on page 962 in the periodical "Electrical Engineering" (New York) volume 68.

This accumulator is composed of identical flip flop units designated "Unit 1" and identical gates designated "Unit 2." The detailed circuits of these "Unit 1" and "Unit 2" schematic blocks are shown in FIGURE 17 and described below in relation to that figure. FIGURE 16 shows three identical binary counter stages separated by vertical chain-dotted lines.

The action of the accumulator is as follows:

A series of negative pulses is received by flip flop unit 285, these pulses having the timing shown at I of FIGURE 15 or J of FIGURE 15 according to the direction of movement of the slide as reproduced by the pulses on lead 261 of FIGURE 14 which have the phase of either G or H of FIGURE 15. The flip flop is triggered from its existing state into the alternative state producing a positive going transition on lead 286 and a negative going transition on lead 287 or vice-versa depending on the original state of the flip flop. These transitions are respectively turned into short pulses of the same polarities as the transitions by means of condenser-resistor combinations 288, 289 and 290, 291.

The pulses are fed to the input terminals "IP2" of two gates 292, 293 each having two input terminals designated "IP1" and "IP2." The "IP1" terminals of the two gates 292 and 293 receive the forward gate pulses from lead 275 and the backward gate pulses from lead 276 respectively which have the wave forms shown at E and F in FIGURE 15, so that gates 292, 293 are alternately opened and shut.

The arrival of a positive pulse at IP2 of either of gates 292 or 293, while IP1 terminal is at a positive potential produces a negative-going output pulse which is applied to flip flop 285' via lead 279' and the process is then repeated at each stage of the counter.

Connections are so arranged in each stage of the accumulator that a flip flop transition from 1 to 0 in conjunction with a forward gate signal produces, from output "OP" of gate 292 a "carry" pulse for application to the following stage. Likewise a transition from 0 to 1 in the flip flop accompanied by a backward gate signal will produce, from output "OP" of gate 293 a "carry" pulse on 279' (etc.) for application to the following stage.

The timing of the count pulses in lead 279 during forward movement of the slide are shown at I of FIGURE 15 and the timing of the count pulses in lead 279 during backward movement of the slide are shown at J of FIGURE 15. OP4 of flip flop 285 passes a pulse to gate 292 for every other count pulse applied to IP1+IP2 of 285. This is shown in K and L of FIGURE 15, the pulses being differently timed according to the direction of slide movement. Gate 292 passes the OP4 pulses only when the slide is moving forward since only in these circumstances do these pulses coincide in time with the forward gate pulses (E of FIGURE 15) in lead 275. The OP4 pulses so passed (shown at M of FIGURE 15), represent "1 to 0" transitions of 285 and are "carried" to the next state.

OP3 of flip flop 285 passes a pulse to gate 293 for every other count pulse applied to IP1 and IP2 of flip flop 285 and as these pulses represent the opposite direction of transition of 285 to those represented by the pulses at OP4, they have a different timing from the OP4 pulses. The OP3 pulses are timed differently according to whether the slide is moving forwards or backwards. This is shown at N and O of FIGURE 15. Gate 293 passes the OP3 pulses only when the slide is moving backwards since only then do the OP3 pulses coincide with the backward gate pulses (F of FIGURE 15) on lead 276.

The OP3 pulses so passed (shown at P of FIGURE 15) represent "0 to 1" transitions of 285 and are "carried" to the next stage.

The state of flip flop 285 is fed out from OP1 and OP2 via leads 294, 295 to Unit 2-type gates 296, 297 which receive a periodic channel pulse via lead 298.

During the channel pulse, which is synchronised with the distributor (67 of FIGURE 7), a negative going pulse of the channel gate pulse duration will appear on lead 299 if the flip flop 285 is in the "0" state. There will be no pulse on 299 when 285 is in the "1" state. The alternative conditions hold on output lead 300.

The leads 299 and 300 constitute means for "reading" the flip flop digit state out of the difference accumulator 71.

A positive reset pulse applied from time sharing distributor 67 (FIGURE 20) to lead 430 resets all the flip flops to zero state via their input terminals IP3. The reset pulse is timed to occur after the channel pulse as will be explained below.

FIGURE 16 shows three accumulator stages for recording binary digits. In the ordinary way not more than one count pulse of either sign will be stored in accumulator 74 at a time since, in a machine tool with two or more slides moving simultaneously along different axes to form a profile or solid shape no slide must be allowed to accumulate a debt of unfulfilled command pulses as this would destroy the co-ordination of the two or more slide movements required to produce the desired profile or shape on the workpiece. Three accumulator stages are nevertheless provided to cater for the case where a quick approach of the tool to the workpiece from a rest position is programmed without limiting the command pulse rate to be below the fastest speed of which the slide driving mechanism is capable, and for similar eventualities.

Circuit diagrams of the basic units used in FIGURE 16 are shown inter alia in FIGURE 17.

Flip flop Unit 1 is based on the said circuit described by Pack and Obetz in the said volume of the Journal of the Optical Society of America and is a two-state circuit of a type well-known in the binary counter art.

Tubes 301, 301a with their associated circuit elements are arranged so that only one tube can conduct at a time. Potentiometer 305, 306A ensures that if tube 301 is conducting the grid potential of the other tube 301A is held negative to such an extent that the tube will not conduct. The resulting high plate potential of triode 301a is fed back to the grid of tube 301 via potentiometer 305a, 306, 307 and holds the grid of 301 positive, thereby maintaining the tube in full conduction.

The converse conditions apply when tube 301a is conducting and 301 cut off. The anodes of tubes 301 and 301a are connected respectively through isolating diodes 308 and 308a to input terminals IP1 and IP2.

If a negative input pulse is applied to the two anodes simultaneously via IP1 and IP2 and diodes 308, 308a, both tubes are cut off momentarily and two memory condensers 309, 309a, connected between 301 anode and 301a grid, and 301a anode and 301 grid respectively, help to ensure that after the decay of the trigger pulse the circuit changes its state so that the other tube is conducting.

When tube 301 is conducting the circuit will be considered to store a "0," when tube 301a conducts the circuit will store a "1."

Four output terminals are shown:

310 (OP1) is negative when the state of the flip flop is 1;

311 (OP2) is negative when the state of the flip flop is 0;

312 (OP3) produces a positive going transition when the circuit changes from "0" to "1," and stays positive till the next change of state.

313 (OP4) produces a positive going transistion when the circuit state changes from "1" to "0," and stays positive till the change of state.

A positive pulse applied to terminal 314 (IP3) resets the circuit from "1" to the "0" state if it is not already in the "0" state.

Positive coincidence gate, Unit 2, used in FIGURE 16 is described in the textbook Radar System Engineering, published by McGraw-Hill in 1947, at page 509, and in FIGURE 13.27 and consists of a pulse mixing tube 314 and its plate resistor 315.

Tube 314 has two control electrodes connected to terminals 316 and 317 designated IP1 and IP2. When these two grids are driven positive the anode current of the tube increases and the anode potential falls. When this circuit is used in a role such as gate 292 of FIGURE 16 and a relatively long positive pulse is applied to IP1, the anode current does not change so long as the potential of the other grid connected to IP2 remains unaltered. When a count pulse arrives at IP2 however, both control electrodes are positive simultaneously and the anode voltage of 314 falls, resulting in a negative output pulse at output terminal 318, which is designated "OP."

FIGURE 18 shows the detailed circuits corresponding to schematic blocks 59, 62 and 63 of FIGURE 7, and FIGURE 18A shows the wave forms at various points in the circuits of FIGURE 18.

Amplifier 59 consisting of tube 232 and its associated resistors is similar to the amplifier of FIGURE 12 but as its output is obtained by means of an anode resistor 319 instead of the transducer 61, the circuit is repeated in FIGURE 18, using the same reference numerals as are used in FIGURE 12.

The signals developed across anode resistor 319 represent the combined signals of the various error sensing devices illustrated at (i), (ii), (iii) and (iv) in FIGURE 6.

These signals are transmitted via potentiometer 320, 321 to the input of gate pulse circuit 62 which is of the type described at page 967, and illustrated in FIGURE 24.21 of the textbook by Terman called "Electronic and Radio Engineering," Fourth edition, published by McGraw-Hill.

In this circuit, tubes 326 and 327 with associated components 328 to 332 inclusive form a monostable multivibrator circuit, the stable state being that in which tube 327 conducts and 326 is cut off. Negative pulses (Q in FIGURE 18A) referred to as "channel A pulses" are applied to lead 344 and the positive going trailing edges of these pulses are converted by a small condenser 323 into positive going trigger pulses (R in FIGURE 18A) which appear at the grid of tube 326 causing it to conduct whereby tube 327 is cut off. This is an unstable state of the circuit from which it reverts to its former state with 327 conducting, after a period depending on the circuit constants and the supply potentials and also on the potential at the grid of tube 326 which is obtained via feed resistor 324 and a by-pass condenser 325 from the tapping of potentiometer 320, 321.

The duration of this unstable state of circuit 62 can be made to be linearly proportional to the input potential which represents the said combined error signals. The output of circuit 62 is in the form of a positive going pulse (T in FIGURE 18A) appearing across plate resistor 332 of tube 327 and is proportional in duration to the dwell of the circuit 62 in its said unstable state and it is fed by lead 333 to gate circuit 63. Gate circuit 63 is shown in detail in FIGURE 17 and is of the "Unit 3" type which is described below in detail. It has two input terminals designated IP1 and IP2. The output from 62 is applied to IP1.

Clock pulse generator 64 is shown in the top left hand corner of FIGURE 18 and is of the type described in Section 4.3 and in FIGURE 4.6 of the textbook called "Electronic Time Measurements," by Chance and others, published by McGraw Hill, in 1949. The generator 64 comprises a triode tube 334 and quartz crystal unit 335 connected in a simple form of oscillator circuit in which the crystal 335 with its damping resistor 336 form a tuned grid circuit for the tube, and coil 337 and condenser 338 in parallel act as a tuned plate circuit, tuned to the same frequency as the grid circuit. Feedback is obtained via the stray plate-to-grid capacitance of tube 334, and causes the circuit to oscillate at the crystal frequency.

Current variations in the anode circuit are fed via a pulse transformer 339 to the grid of a tube 340 connected as a blocking oscillator. Tube 340 is made to conduct momentarily once per cycle of the wave form received from tube 334 by the "blocking" action of the transformer 339 and the grid biassing circuit 341. The resultant current pulses through cathode resistor 342 give rise to a train of positive clock pulses (S in FIGURE 18A) at the cathode of tube 340 which are passed to IP2 of gate 63.

Gate 63 gives an output only when positive pulses are simultaneously present at IP1 and IP2. The clock pulses from clock pulse generator 64 have a frequency such that several clock pulses occur during the shortest duration of pulse from gate pulse circuit 62. The output of gate 63 at its OP1 terminals is in the form of bursts of positive clock pulses (V in FIGURE 18A), the number in each burst being proportional to the value of the said combined error signals.

The successive bursts of positive going clock pulses are fed along lead 343 into the comparator counter 65, the circuit of which is shown to the right of the chain-dotted line in FIGURE 18. Channel A pulses from lead 344 are also fed into comparator counter 65.

The leading edge of each channel A pulse is negative going and it is fed by means of a small condenser 345 and resistor 346 into the input terminals IP1 and IP2 of a flip flop 347 which is of the Unit 1 type shown in FIGURE 17. The flip flop is therefore alternately triggered from one state to the other by each of the negative going pulses (U in FIGURE 18A derived from the leading edges of the channel A pulses.

Outputs from flip flop 347 (W and X respectively in FIGURE 18A) are taken via leads 348 and 349 to gates 350 and 351 which are of the Unit 3 type shown in FIGURE 17 and to be described below. Gates 350 and 351 are opened alternately and allow pairs of identical positive and negative going bursts of clock pulses, from OP1 and OP2 respectively of each gate to appear first at the output of gate 350 (Y in FIGURE 18A) and then at the output of gate 351 (Z in FIGURE 18A) and thereafter alternately for every channel A pulse occurring on lead 344.

These bursts of pulses are fed alternately to the "add" terminals 352 and 354 and to the "subtract" terminals 353 and 355 of a reversible accumulator 356 and to corresponding terminals of another identical accumulator 356a except that the connections are reversed so that pulses fed into the "add" terminals of accumulator 356 are fed into the "subtract" end of terminals on 356a and vice versa.

Accumulators 356 and 356a are for convenience shown in FIGURE 18 as schematic blocks. The detailed circuit of these identical accumulators is shown in FIGURE 19 and the operation of the circuit will be explained below.

Output leads 348, 349 from OP1 and OP2 of flip flop 347 are connected also respectively to the input terminals of two gates 357 and 358 and the channel A pulses are connected to the input terminals IP2 of gates 357 and 358 via lead 344. Gates 357 and 358 are of the type designated "Unit 4" in FIGURE 17 and to be described in detail below.

Positive output pulses appear at the output terminals OP, of gates 357 and 358 when both inputs of a gate are coincidentally at negative potential and thus the channel A pulses are fed alternately via leads 359 and 359a to the accumulators 356 and 356a where they act as "channel" pulses (A and C in FIGURE 18A).

These channel pulses cause the outputs of accumulators 359 and 359A to be "read" alternately to the difference accumulator 71.

Sharp transitions of the wave forms at the OP terminals of gates 357 and 358 are converted into pulses of the same polarity as the transition by means of small condensers 360, 360a respectively and the resultant pulses are delayed by means of electromagnetic delay lines 361, 361a of the type described at page 413 and in FIGURE 13.28(b), in the textbook "Pulse and Digital Circuits," by Millman and Taub, published by McGraw-Hill, in 1956.

Semiconductor diodes 363, 363a suppress the pulses arising from negative going transistions of the wave form from the OP terminals of gates 357 and 358. The pulses reaching leads 362 and 362a (B' and D' in FIGURE 18A), are called "reset pulses" and their function is to reset to zero the flip flop stages of accumulators 356 and 356a at appropriate times in readiness for the next count. The delay introduced by 361 and 361a is such as to allow time for the state of accumulators 356 and 356a to be transferred to difference accumulator 71 and for the latter to "carry" through its digital stages, before the reset pulses on leads 362, 362a can reach the accumulators 356, 356a.

The basic operations of comparator counter 65 may be summarised as follows:

Bursts of clock pulses from unit 63 are fed simultaneously into the two accumulators 356, 356a, being applied alternately on the one hand to the "add" terminals of 356 and the "subtract" terminals of 356a, and on the other hand to the "subtract" terminals of 356 and the "add" terminals of 356a.

Accumulator 356 having recently been reset to zero, receives a burst of clock pulses at its "add" input through leads 352, 354.

Accumulator 356a having stored the positive count from the previous burst of clock pulses now receives the present burst of pulses at its "subtract" input through leads 353a, and 355a and, in a manner to be explained in detail in relation to FIGURE 19, the present count is subtracted from the previously stored count so that the resultant stored number represents the difference between the previous count and the present count.

This information, stored in the form of states of the flip flop circuits of FIGURE 19, is fed out to the accumulator 71 when the channel pulse is present on lead 359a. After the delay introduced by 361a, accumulator 356a is reset to zero and with the arrival of the next channel A pulse on lead 344 the state of flip flop 347 is reversed and the roles of accumulators 356, 356a are now interchanged.

After the reset pulse has zero'd one of the accumulators, it lies quiescent for the remainder of the duration of the channel pulse. At the end of the channel A pulse the positive going transition is transmitted along lead 322 to trigger the gate pulse circuit 62 once more, and a further burst of clock pulses is produced which is fed into accumulators 356, 356a via gate 351 to input lead pairs 353, 355 and 352a, 354 respectively, and so the process continues.

The difference between the previous and the present count appearing in binary form, is transferred to difference accumulator 71 via leads 364, 365, 364′, 365′, 364″, 365″, etc., after one count and via leads 364a, 365a, 364′a, 365′a, 364″a, 365″a, etc.

The clock pulses which are counted by the accumulators 356 and 356a have a recurrence frequency many times as great as the pulses derived from the diffraction grating scanner 36 which are counted by the circuits of FIGURE 16. Each clock pulse will nevertheless represent the same linear dimension as the pulses from 36. The reason for this is that the error signals applied to gate circuit 62 represent the total existing error at any one time though of course only the change in the total error is of interest. At any one time the aggregate error may amount to say .002 inch which represents 20 clock pulses. Even if this error should remain constant for a time these 20 clock pulses must be counted in by accumulators 356 and 356a and subtracted to produce a zero reading which is applied to difference accumulator 71. Accumulators 356 and 356a must therefore be capable of counting up to something more than 20 clock pulses in either direction. This would necessitate 7 binary stages for accumulators 356 and 356a though for the sake of simplicity only 3 stages are shown in FIGURE 19.

The different senses of the errors signalled from the circuits of FIGURE 6 are preferably distinguished by adjusting gate pulse circuit 62 so that the maximum of cumulative error in the direction in which the gate pulse length diminishes, gives a gate pulse length which will pass a small number of clock pulses through gate 63. The mean cumulative error position will then produce gate pulses from 62 which will pass say 55 clock pulses through 63. Counts of less than 55 clock pulses per gate pulse from 62 will represent negative errors and counts of more than 55 clock pulses will represent positive errors.

The circuit used for accumulator 356 and accumulator 356a is shown in FIGURE 19. The same circuit is also used for accumulator 73. Such a circuit is described at page 59, and in FIGURE E in the textbook "Control Engineering" by Blundi published by McGraw-Hill in July 1955.

In describing the functions of accumulators 356 and 356a in relation to FIGURE 18 the same reference numerals are used for corresponding input and output leads but in the case of the latter these numerals are followed by the letter "a." In the description of accumulator 73 below the numerals are letter "b." In FIGURE 19 however only the basic reference numerals are used.

Negative going pulses received on leads 352, 353 are applied to the input of diode gate 368 and are passed on by lead 369 to the trigger inputs of a Unit 1 type flip flop 370. Diode gate 368 is of the Unit 5 type shown in FIGURE 17 and described in detail below. The purpose of diode gate 368 is to pass pulses from either lead 352 or 353 into flip flop 370 without the passage of pulses between the two input leads themselves.

Flip flop 370 has its OP1 terminal connected to a Unit 3 type gate 373 via lead 371 and lead 372 connects the OP2 terminal of flip flop 370 to a Unit 3 type gate 374.

If, while flip flop 370 is in the "1" state (OP2 terminal then being positive), a negative pulse is applied over lead 352 to IP1 of a Unit 5 type gate 368 which passes on the negative pulse to flip flop 370 to change its state but reliance is placed on the slight delay in the change over of 370 to hold the potentials of OP1 and OP2 of flip flop 370 in their initial states so that a corresponding positive going pulse, received on the "add" lead 354, can pass through gate 374 before the flip flop 370 changes state, OP1 of 374 producing a positive going pulse which is applied to IP2 of the next stage gate 374' and a simultaneous negative going pulse to the Unit 5 type diode gate 368' of the following stage which causes the flip flop 370' of that stage to be triggered into its alternate state but reliance is again placed on the slight triggering delay of the flip flop to ensure that it does not change over until the corresponding pulse has passed through gate 374'.

If flip flop 370 is in the "0" state, gate 374 will be blocked to the passage of pulses from lead 354, but Unit 3 type gate 373 will now be unblocked and any pulse appearing on lead 355 will be passed onto the next stage flip flop 370' via diode gate 368'.

Three identical stages of accumulator are shown in FIGURE 19. Sufficient stages must be provided to deal with the maximum number of pulses expected.

Gates (Unit 2) 75 and 376 act in the same manner as gates 296, 297 of FIGURE 16 and enable the digit state of flip flop 370 to be read out on leads 364, 365 connected to the difference accumulator 71.

Thus leads 364, 365 indicate the lowest digit 364', 365' the next highest digit and so forth.

It will be noted that when the input pulses appear on the "add" leads 352 and 354 the "carry" operates on the "1" to "0" transition of the flip flops so that the stored total advances in the positive direction (see Table I above) and when the input pulses appear on the "subtract" leads 353 and 355 the "carry" operates on the "0" to "1" transitions of the flip flops so that the stored total regresses in the negative direction (see Table I above).

Basic units used in FIGURES 18 and 19 and shown on FIGURE 17 but not previously described, will now be described.

The Unit 3 pulse gate in FIGURE 17 is basically similar to the Unit 2 gate of FIGURE 17 in that it is responsive to positive inputs applied simultaneously to its IP1 and IP2 input terminals which are connected to two control grids of a multi-electrode tube 379 which is rendered conducting when the said control grids are both positive but is non-conducting when one or both of the control grids is or are at the normal negative potential. As in the case of the Unit 2 gate the plate of the tube goes negative when the tube is rendered conductive and this condition appears at the OP2 output terminals.

In place of the resistive plate load 315 in the Unit 2 circuit, the primary winding of a transformer 380 forms the plate load of tube 379 the secondary winding of which is connected to the other output terminal OP1. The connection of the transformer 380 is such that when tube 379 moves from cut-off to conduction a positive pulse appears at OP1 to match the corresponding negative pulse at OP2 so that the output of the gate consists of a pair of pulses of opposite polarity. If tube 379 were to be held conducting for an appreciable length of time, OP2 would stay negative whereas OP1 would not stay positive but would revert to negative since transformer 380 only responds to transitions. As the Unit 3 gate is only required to deal with pulses of short duration however this state of affairs will never arise and the outputs from OP1 and OP2 will be effectively contemporaneous, equal and opposite.

Positive gating pulses of relatively long duration are applied to IP1 and render the gate "open" for the passage of positive clock pulses of relatively short duration, during the presence of the said gating pulses. Clock pulses occurring when the gate is open are reproduced at OP1 and OP2.

Unit 4 of FIGURE 17 is a negative coincidence gate and is described at page 38, and shown in FIGURE 4–1b of the book "High Speed Computing Devices" by Engineering Research Associates, published by McGraw-Hill in 1950.

Unit 4 consists of two pentode tubes 385 and 386 whose plates are connected to a common load resistor 387. If either or both input terminals IP1 and IP2 are positive, each being connected to the grid of one of the tubes, there will be a conduction current flowing in anode resistor 387. A positive going output signal is produced at the output terminal OP only when both input terminals IP1 and IP2 are sufficiently negative to cut off conduction in both tubes simultaneously. The potential of the output from OP is adjusted by suitable selection of the values of two resistors 391, 392 which form a potentiometer between the anodes of the tubes and a point of negative potential.

Unit 5 of FIGURE 17 is a diode "Or" gate and is described at page 395, section 13.2 and shown in FIGURE 13.3 of the textbook "Pulse and Digital Circuit" by Millman and Taub, published by McGraw-Hill in 1956.

Two semi-conductor diodes 393, 394 have their anode elements connected via a common terminal 397 to a resistor 395 the other end of which is connected to a positive potential terminal 396.

If varying potentials (negative with respect to the positive terminal 396) are applied to input terminals IP1 and IP2 to which the cathode elements of 393 and 394 are respectively connected, the diode connected to the most negative of the two terminals will conduct and as its resistance in this condition is extremely low the potential at terminal 397 will be almost the same as the said most negative potential and therefore negative with respect to the less negative of the input potentials. The other diode will thus be cut off due to reverse bias.

The output terminal OP which is connected to the common terminal 397 will tend to follow the potential of the most negative of the input terminals IP1 and IP2.

If IP1 and IP2 are both initially at the same potential and negative pulses are applied to either or both of them a negative pulse will appear at OP for every pulse occurring at either IP1 or IP2. Furthermore, because one diode is non-conducting when a pulse input is applied only to the terminal to which the other diode is connected, the non-conducting diode blocks the path between the two input terminals so that there is no cross coupling between the two inputs.

FIGURE 20 is a schematic diagram of time sharing distributor 67 and is based on a three channel distributor described at page 62, and shown in FIGURE C in the textbook "Control Engineering," by Blundi, published by McGraw-Hill in July 1955.

The distributor comprises three flip-flops 400, 401, 402 which are of the Unit 1 type shown in FIGURE 17. These flip flops are sequentially triggered by means of pulses from a blocking oscillator consisting of tube 403 and its associated pulse transformer. Such a blocking oscillator is described at page 502 and shown in FIGURE 13.19, of the textbook "Radar System Engineering" edited by Ridenour, and published by McGraw-Hill, in 1947.

An output, developed across cathode resistor 405, is taken from the cathode of tube 403 and a train of positive going pulses is transmitted along lead 406 to the IP2 terminals of gates 407, 408 and 409, which are of the Unit 2 type shown in FIGURE 17.

If flip flop unit 400 is in the "0" state and flip flops 401, 402 are also in the "0" state prior to the occurrence of a pulse on lead 406, then only gate 407 is able to pass the pulse since IP1 of this gate is connected to OP1 of flip flop 400 rather than OP2 as in the case of flip flops 401 and 402. Therefore a negative going pulse appears at the OP terminal of gate 407 and is passed via lead 410 to the IP terminal of flip flop 400 which is thereby triggered into the "1" state, shutting gate 407. The same pulse is applied to the IP1 terminal of flip flop 401, which, being in the "0" state, is triggered into the "1" state.

Gate 408 has its IP1 terminal connected to the OP2 terminal of flip flop 401 and is now the only gate capable of passing the second pulse from lead 406 and on doing so produces on its OP terminal a negative pulse which is passed via lead 411 to IP2 of flip flop 401 and IP1 of 402 (which are interconnected), to trigger flip flop 401 to the "0" state and flip flop 402 to the "1" state.

The third pulse can now be transmitted only by gate 409 and the resulting pulse produced its OP terminal is applied via lead 412 to IP2 to flip flop 402 and IP2 of flip flop 400 so that the three flip flops are reset to their original state from whence the process is continued indefinitely.

For the distributor to work properly all flip flops must initially be in the "0" state or at any of the intermediate states described above. When the power is first switched on however, the states taken up by the flip flops would normally be arbitrary it is necessary to ensure that they take up one or other of the said required initial settings. This is arranged by resetting all the flip flops to zero by applying a positive potential to their IP3 terminals over lead 510 by means of a setting up key 511.

This is the reason for the reversal of the leads to IP1, IP2, OP1 and OP2 of flip flop 400 as compared with the corresponding connections to flip flops 401 and 402.

FIGURE 21 shows the relations in time of the various pulses occurring in FIGURE 20. E' shows the pulse train on lead 406 and wave forms F', G' and H' are the wave forms appearing at OP1 of flip flop 400 and at OP2 of flip flops 401, 402 respectively, these wave forms being applied to the IP1 terminals of gates 407, 408 and 409 respectively.

Wave forms G' and H' denoted "Channel B pulses" and "Channel C pulses" respectively in FIGURE 20 are fed respectively via lead 359b to the channel input terminal on accumulator 73 (FIGURE 19), and via lead 298 to the channel input terminal on accumulator 74 (FIGURE 16).

The channel A pulse is required to be negative, as previously indicated in the description of FIGURE 18, and is therefore obtained from the OP2 terminal of flip flop 400 and is fed along lead 344 to comparator counter 65 (FIGURE 18). The wave form of these channel A pulses is shown at I' in FIGURE 21.

The wave forms G' and H' occurring on leads 359a and 298 are separately fed via small condensers 419, 420, and isolating resistors 421, 422 to the cathode elements of semi-conductor diodes 423, 424 respectively, with the result that only the transitions in the original flip flop wave forms are transmitted 422 with diode 424, the function of diodes 423, 424 being to remove the negative transitions and leave only positive pulses for transmission along leads 425, 426.

These trains of pulses are delayed by electro-magnetic delay lines 427 and 428 similar to delay line 361 mentioned previously, and are brought out by leads 362b and 430.

The pulses appearing on lead 406 (E' in FIGURE 21) are passed through two electro-magnetic delay lines 433, 434 in series. An output taken after the delay line 433 is fed by lead 435 to the "add" terminal of accumulator 71. The delay is sufficient to allow the flip flop 400, 401 or 402, as the case may be, to have completely changed its state before the pulse appears on lead 435. This pulse train is shown at L' in FIGURE 21.

The pulses from lead 406 are further delayed by delay line 434 and appear on lead 437 which is connected to the "carry" terminal of difference accumulator 71. These pulses are shown at M' in FIGURE 21.

Lead 362b is connected to the reset terminal of accumulator 73 (FIGURE 19) and the reset pulse train, shown at J' in FIGURE 21, is delayed by delay line 427 so that resetting occurs shortly after a "carry" pulse to difference accumulator 71 has occurred.

Lead 430 is similarly connected to the reset terminal of accumulator 74 (FIGURE 16) and the wave form of the pulses on 430, shown at K' in FIGURE 21, is also delayed by delay line 428 so as to occur shortly after a "carry" pulse to difference accumulator 71 has occurred.

Time sharing distributor 67 will be seen to provide instruction pulses to the accumulators 73, 74 and to comparator counter 65 in rotation so that each unit may be read out and reset in turn.

FIGURE 22 shows the connection of magnetic tape reproducing device 68 and pulse forming circuit 69.

Magnetic tape reproducing devices for the storage of pulse data are well known in the art. Such a device is shown in National Bureau of Standards (U.S.A.) Circular Number 551 published January, 1955, page 116, FIGURE 6.5.

Many systems can be used for the recording and reading of pulses which represent positive or negative movement instructions from a single tape channel and one reading head.

Systems of this type differentiate between the polarities of the areas of magnetisation occurring on the track in the manner described in an article by Booth commencing on page 233 of the July, 1949 number of the periodical "Electronic Engineering" published by Morgan Brothers, London, England.

The system shown in FIGURE 22 employs two magnetised parallel tracks on the same tape read individually by reading heads 439, 439a, which are positioned side by side.

Movement instructions on each track consist of positive pulses of magnetisation occurring at intervals along each track. One track on the tape, read by head 439, contains the forward movement instructions and the other track, read simultaneously by head 439a, contains instructions for movement in the reverse direction.

Heads 439, 439a each consisting of a small horse-shoe shaped iron yoke 440, (440a) on which are wound turns of copper wire (441a) are positioned so that the ends of the yoke 440 (440a) are in close proximity to the magnetic tape 442 which is moving in the direction indicated by the arrow in FIGURE 22.

The passage of a magnetised portion of tape across a reading head causes a positive going pulse, followed immediately by a negative going pulse, to be developed across the ends of the winding which is applied by means of a transformer (443, 443a) to circuits of the type described in the said article by Booth and shown in FIGURE 14 and 18 of that article.

These circuits consist of two resistance-capacity coupled amplifier tube stages 444 and 445 (444a and 445a) and their associated components, which amplify the signal obtained from the reading heads.

The amplified signal is fed via condenser 446 (446a) to a Schmitt trigger circuit consisting of tubes 447 and 448 (447a and 448a) and associated components 449 to 453 (449a to 453a) inclusive which is similar to the trigger circuit consisting of items 245 to 251 inclusive shown in FIGURE 14 and described above.

In the normal condition of this trigger circuit tube 447 (447a) is conducting due to the bias potential applied to the grid of tube 447.

Signal excursions more negative than a critical potential cut off 447 and cause the trigger circuit to change state, in which condition it will remain until the signal rises above the critical value again.

Thus for every double pulse (positive followed by negative as explained above) generated at reading head 439 (439a) a negative pulse appears at the plate of tube 448 (448a).

These pulses are transmitted through potentiometer 454, 455 (454a, 455a) to the pulse input terminal IP2 of paralysis gate 456 (456a).

These paralysis gates provide simultaneous negative and positive going pulses via leads 352b and 354b to the "add" terminals and via leads 353b, 355b to the "subtract" terminals of accumulator 73.

Paralysis gates 456, 456a are identical and the detailed circuit is shown in FIGURE 27 to be described below. The purpose of these gates is to ensure that pulses of random timing derived from 68 are not lost if they happen to occur when accumulator 73 is receiving the reset pulse.

Accumulator 73 is as shown in FIGURE 19 and is exactly similar to accumulators 356 and 356a described earlier.

When FIGURE 19 is referred to in the role of accumulator 73, the numerical references of FIGURE 19 are followed by the identifying reference character "b" and connections to accumulator 73 from circuits shown in other figures, are in those other figures given the reference numerals shown against those connections where they enter FIGURE 19, but followed by "b." The state of the digit stages of accumulator 73 is passed over leads 364b, 365b; 364'b, 365'b; 364"b, 365"b when the channel B pulse is applied to difference accumulator 73 along lead 359b from time sharing distributor 67 (FIGURE 20).

FIGURE 23 shows the detailed circuits of difference accumulator 71 of FIGURE 7. This circuit is described as a "parallel adder" in a paper by West and De Turk commencing on page 1452 of the "Proceedings of the Institute of Radio Engineers," volume 36, 1948, and is shown in FIGURE 11 of the drawings illustrating the paper.

Three consecutive digit stages are shown in FIGURE 23 at (i), (ii) and (iii), corresponding items having the same reference numerals but primed for stage (ii) and double primed for stage (iii).

In fact there must be sufficient stages in difference accumulator 71 to store the peak error number ever likely to be encountered and whilst it is in general not intended that this shall exceed one unit there will be occasions when it will be called upon to store larger differences. An additional or "sign indicating stage" is provided and is shown in FIGURE 25. This stage is in effect an additional digit stage. This sign indication stage co-operates with the last sign of FIGURES 19 and 20 to perform the formation of sign circuit 66 in FIGURE 7.

At each stage the necessary addend is introduced by leads 460, 461; 460', 461'; 460", 461"; which are connected as shown in FIGURE 26 to the digit outputs of accumulators 73 and 74 and comparator counter 65 so that stage (i) of difference accumulator 71 deals with the least significant digit and so on of the number to be read in. Direct connection only exists with one of the input units (65, 73, 74) at a time and this occurs when the appropriate channel pulse is applied to that unit.

The presence of a "1" at the accumulator input is indicated by the lead 460 (460', etc.) having a positive potential with respect to lead 461 (461', etc.) and a "0" by the reverse condition.

Thus the digit "1" appearing as a positive potential on lead 460 opens gate 462 (Unit 2 of FIGURE 17) so that an "add" pulse on lead 435 from time sharing distributor 67 appears as a negative pulse on the output terminal OP of gate 462 and is transmitted by lead 463 to gate 464 (Unit 5 of FIGURE 17). The sole function of gate 464 is to pass either input pulse without permitting the transfer of signals between the input terminals. Lead 465 now carries the negative going pulse to flip flop 466 (Unit 1 of FIGURE 17) via its input terminals IP1 and IP2.

The arrival of this pulse triggers the flip flop to its alternate state. This is equivalent arithmetically to "'addition without carry."

The carry process is then initiated.

Gate 467 (negative coincidence) receives an input potential from lead 461 via its IP1 terminal, and a signal from OP2 of flip flop 466 is fed via lead 468 to the input terminal IP2 of gate 467. When both these signals are negative, a positive pulse appears at the gate output terminal OP. This is transmitted via lead 469 to the input terminal IP1 of gate 470 (Unit 3 of FIGURE 17) and opens the gate to the "carry" pulse from time sharing distributor 67 which occours slightly after the "add" pulse from the time sharing distributor.

Thus if there is a "1" in the addend and a "1" stored in the flip flop before the addition, the flip flop is changed to "0" after the addition and a carry pulse is passed onto the next stage via leads 471 and 472 which are the carry leads to the succeeding stage. Lead 471 passes a positive pulse for "carry through" purposes and lead 472 carries a simultaneous negative pulse to trigger after a slight delay the flip flop 466'.

The carry instruction pulse to the accumulator is brought in on lead 437 from time sharing distributor 67, and is suitably delayed from the "add" instruction pulse on lead 435 as previously explained in the working of FIGURE 20.

The "add" and "carry" instruction pulses each occur three times per cycle of the time sharing distributor 67 (FIGURE 20), but the difference accumulator 71 is only connected to the reading-out terminals of 65 (356, 356a)—73 (356b)—74—one at a time in turn, due to gating action of the channel pulses, and it is only connected to each channel for a short period during which the add and carry pulses are active.

Flip flop 466' may already be set in the "1" state before the arrival of a carry pulse and in this case it will be necessary to reset the flip flop to zero and also to pass the carry pulse on yet one stage further, i.e. to flip flop 466″.

This process known as "carry through" is performed as follows:

When the flip flop 466′ is in the "1" stage a positive potential is maintained on lead 468′ so that Unit 3 type gate 473′ is held open to the arrival of a carry pulse which may appear on lead 471 from the preceding stage. This carry pulse consists of a pair of simultaneous positive and negative going pulses on leads 474 and 475 respectively, which are then joined at the outputs of gate 470′ onto leads 471′ and 472′. The carry is then passed over to the next higher stage, the carry pulse already on lead 472 being delayed in electro-magnetic delay line 476 (which is similar to delay line 361 described earlier) and is then used to trigger flip flop 466′ after the carry pulse has been passed through gate 473. Gate 473 is now closed to any further passage of pulses.

The complete sequence of operations in difference accumulator 71 is as follows:

(1) A channel pulse allows access of digits from the reading-out terminals of one of the accumulators 65, 73 or 74 to leads 460, 461, etc. and thence to gates 462, 467 etc. thus the gates 462, 462′, 462″ etc. are set to allow for the adding process to take place. The states of the gates 462, 462′, 462″ etc. depend only on the states of the digit inputs on leads 460, 460′, 460″ etc. the states of the gates 467, 467′, 467″ etc. however depend on the state of the digit inputs on leads 461, 461′, 461″ etc. and also on the states of the flip flop 466, 466′, 466″ etc.

(2) The "add" pulse from time sharing distributor 67 appears on lead 435 resulting in a change of flip flop state whenever a "1" input occurs at any stage or in no change if a "0" input occurs. This process represents "add without carry."

At the termination of this process, gate 467 and with it gate 470 are set depending on the digit input information on lead 461 and on the state of the flip flop in that stage. Thus if a digit is present on lead 461 and the flip flop 466 is in the zero state the gate 470 will be open in preparation for a "carry" to be generated at terminals 471, 472 on the arrival on lead 437 of the "carry" pulse from time sharing distributor 67.

Gate unit 473′ will be open or closed depending on whether there is a "1" or "0" respectively stored in flip flop 466′ and this will determine whether a "carry" pulse from gate 470 appearing on leads 471, 472, will be transmitted to terminals 471′, 472′, forming a "carry through."

(3) The "carry" pulse from time sharing distributor 67 follows the "add" pulse after a time delay sufficient to ensure that all the gate transitions of the "add without carry" process have previously taken place.

Then, if gate 470 is open, a pulse pair is produced on leads 471, 472, and a carry pulse is passed on to the next stage.

The pulse on lead 471 is transmitted to gate 473 and if that gate is open due to flip flop 466′ being in the "1" state, a "carry through" operation is performed and a carry pulse appears on leads 471′, 472′.

(4) After a suitable delay period determined by delay line 476′ the negative carry pulse on terminal 472 is fed via gate unit 464′ to flip flop 466′ and triggers this into its alternate state thus "adding in the carry."

The arithmetic of the carry process may be further explained as follows. If the succeeding stage is standing at "0" after the "add" process, a carry from the previous stage will change it to "1" after a delay. In the meantime, however, it is at "0" with gate 473′ closed. Whether gate 470 is open or not depends upon whether the stage was at "0" originally with no addend in that stage or whether it was changed to "0" in the "add" process of a "1" in the addend. In the former case there will be no further carry but in the latter case the stage should carry on its own account which it does via gate 470′. Suppose however that the next stage is standing at "1" and there is a carry from the previous stage. It makes no difference in this case whether the stage in question was standing at "1" originally or was changed to "1" from "0" by reason of a "1" in the addend. The carried digit will ultimately change it back to "0" (after the said delay) which is a situation demanding a carry. The same result is in fact achieved by passing the carry from the previous stage, via gate 473″, through the stage under consideration, to the next succeeding stage before the stage under consideration is triggered to "0" over 472′, and delay line 476″. With this method of operating the carry process, it is necessary that the "carry" and "carry through" should be under control of the various flip flops in the states in which they were left at the end of the "add" process, the changes demanded by the carried digits being made after a delay.

The following table illustrates the method:

TABLE VIII

*Normal Mental Addition Process*

| Addend | | 1 | 1 | 1 | 1 | 0 |
|---|---|---|---|---|---|---|
| Initial number | | 1 C | 1 C | 0 | 0 | 1 |
| Sum | | 0 | 1 | 0 C | 0 C | 0 |

TABLE IX

*The Process of FIGURE 23*

| Addend | 1 | 1 | 1 | 1 | 0 |
|---|---|---|---|---|---|
| Initial number | 1 | 1 | 0 | 0 | 1 |
| "Add" (without carry) | 0 | 0 | 1 | 1 | 1 |
| Carry | C | C | | | |
| Carry through | | | C | C | |
| Final state | 0 | 1 | 0 | 0 | 0 |

The presence of a "C" between two digit spaces changes the digit to the right in the "add" line from "1" to "0" or vice versa.

The accumulated totals are stored as a succession of "1's" and "0's" in the successive flip flop units, beginning with the least significant digit in 466, the next significant digit in 466′, and so on.

At the commencement of a machining operation the difference accumulator 71 can be manually reset to "0" in all its stages by closing switch 477 which connects all the IP3 input terminals of all the flip flops of difference accumulator 71 to a positive potential via lead 478.

It is required to convert the digital information appearing on leads 468, 468′, 468″ etc. of accumulator 71, to analogue information in order that it may be used to supply power after suitable amplification to drive the slide traverse motor. For this purpose leads 468, 468′, 468″ etc. transmit the states of the successive flip flops (to the OP2 terminals of which they are respectively connected), to an analogue-to-digital converter shown in FIGURE 25.

Difference accumulator 71 has to handle binary inputs from three sources and is not reset during the controlling process. Due to the servo action of the complete device, however, the total stored into the accumulator represents positioning error and the servo loop will react to keep the total in the accumulator as small as possible. Thus in practice, if the slide movement is programmed on the magnetic tape input device to keep the accelerations of the machine below certain limits, it is possible to keep the stored error in accumulator 71 to a minimum during operation.

The input from accumulator 74 must be continually reducing the total in difference accumulator 71 as the slide driving mechanism moves to fulfill the programme input from accumulator 73 and to correct the error input from comparator counter 65. If these latter inputs are in the direction chosen as representing positive numbers applied to difference accumulator 71 then movements of the slide in the direction necessary to fulfil the programme and correct the error must give rise to negative numbers applied to difference accumulator 71 from accumulator 74. This is simply a matter of correctly phasing the connections from the various pick-up devices (36, 68 and (i), (ii), (iii), (iv) of FIGURE 6) in the correct senses, the directions "Forward" and "Backward" referred to in connection with FIGURES 14, 15 and 16 being purely arbitrary.

Difference accumulator 71 has a "sign" stage which is virtually an additional digit stage also but as this "sign" stage differs in several respects from the digit stages shown in FIGURE 23 it is shown separately at FIGURE 24 and explained below.

In the sign stage circuit of FIGURE 24 no carry generation or carry through facility is needed. Therefore only one input 478, corresponding to the digit inputs 460, 460' etc. of the counting stages, is required.

This is a positive input, i.e. a "1" is represented by a positive potential and a "0" by a negative potential. Lead 478 applies this input to input terminal IP1 of a Unit 2 type gate 479 and when this gate is opened by a positive or "1" input at 478, it allows "add" pulses to be passed through to a Unit 5 type gate 480 and thence on to a Unit 1 type flip flop 481. In this respect the sign stage of FIGURE 24 is similar to one stage of accumulator 71 shown in FIGURE 23.

The carry input lead 472" is taken directly to the IP2 terminal of gate 480 and not through a delay line (such as 476 in FIGURE 23) as there is no requirement for the timing of the flip flop trigger to be delayed for carrying purposes as in FIGURE 23.

Accumulator 71, as explained previously, has sufficient stages to handle peak positive and negative accumulated totals and the circuit of FIGURE 24 is the equivalent of an extra digit stage so far as the storage capacity of the accumulator is concerned. The circuit operates in exactly the same way as the digit stages of FIGURE 23 except that there is no provision for carry.

It will be noticed from FIGURE 26 that the third digit stage of the circuit of FIGURE 23 is connected to the 460" lead to which the outputs of the third digit stages of 65, 73 and 74 are connected, and that lead 478 (the input lead to the FIGURE 24 circuit), is also connected to lead 460". This gives effect to the arithmetic described above in relation to Tables V, VI and VII by repeating the highest value digit of a smaller accumulator in to the higher digit places of a larger accumulator as represented by the digits in brackets in those tables.

The output lead 482 from OP1 of flip flop 481 of FIGURE 24 has a special function which will be explained later in relation to FIGURE 25.

Digital to analogue conversion can readily be carried out by making a postive signal on lead 468 (FIGURE 23) equivalent to 1 unit of voltage, a signal on lead 468' equivalent to 2 units of voltage, on lead 468" to 4 units of voltage, and on lead 482 (FIGURE 24) to −8 voltage units. Thus an analogue voltage may be set up by simple electrical addition of these four voltages as will be seen in the analogue-to-digital converter to be described at FIGURE 25.

FIGURE 25 shows the circuitry necessary to transform the digit output from leads 468, 468a, 468b, and 478 (of FIGURES 23 and 24) into a control signal to be fed to the slide motor.

The figure shows three units (i), (ii), and (iii) connected in series.

These are:

(i) A digital to analogue converter based on the "Binary Quantizer" described by Barney in an article commencing on page 962 and shown in FIGURE 5 (VI8 and associated components), in volume 68 of the periodical "Electrical Engineering," published in New York in 1949.

(ii) A transfer function shaping amplifier as described at page 132, and shown in FIGURE 65 in the 1st edition of the textbook "Servo Mechanisms" by West, published by English Universities Press, London in 1953 and modified as described later in the manner of U.K. Patent Number 482,740 by Blumlein (referred to in the description relating to FIGURE 14 above). This unit modifies the analogue signal obtained from the converter in order that a phase lead may be introduced in the error signal to account for excessive phase lag at the higher range frequencies likely to occur in the servo loop and thereby helps to improve the loop stability. The modifying unit also processes the low frequency components of the signal, in that the amplification of the unit is progressively increased as the frequency of the signal component is decreased so that the loop gain of the whole servo mechanism is increased by many times at frequencies tending to zero. By this means positional lag when the slide is moving at constant rate may be almost completely removed.

In the middle range of signal component frequencies the unit gain is kept to a value dictated by the required loop gain of the system.

(iii) A power amplifier which drives the slide traversing motor and is derived from apparatus described at page 419 and shown in FIGURE 12.35 of the book "Electronic Instruments," by Greenwood and others published by McGraw-Hill in 1948.

These three units are described in detail below:

The digit signal on lead 468 is applied to a potentiometer consisting of two resistors 483 and 484 in series. The values of these two resistors and of the negative potential to which the bottom end of resistor 484 is returned are chosen to produce a cut off condition in tube 485 when the signal on the lead 468 is negative and to cause the tube to pass current when the digit signal is positive.

Thus a positive signal on the lead 468 causes a current to flow in the plate circuit of tube 485 and this current may be adjusted by means of potentiometer 486, which varies the potential on grid 3 of the tube, to a value which represents one unit of error accumulated in accumulator 71. This current will flow from the positive terminal 487 through resistor 488 which is also connected to the plates of three other tubes—485a, 485b, 485c.

These tubes are connected to leads 468', 468", 482 in the same way as tube 485 is connected to lead 468 so that currents flowing in the plate electrodes of tubes 485a, 485b, 485c, all flow through resistor 488. These currents are adjusted to correspond to two units, four units and eight units of error respectively, so that in general varying totals in difference accumulator 71 will cause one or more tubes to conduct and cause varying voltages to appear across resistor 488.

It is arranged that a zero total in difference accumulator 71 will correspond to eight current units flowing in resistor 488 and that zero current in this resistor corresponds to −8 error units, and also 15 current units correspond to +7 error units.

The current in resistor 488 is now therefore an analogue of the error total in accumulator 71 displaced by eight units.

Thus lead 489 will carry a fluctuating voltage which is a negative analogue of the error total indicated in difference accumulator 71. Lead 489 passes the error signal on to the modifying amplifier circuit enclosed in dotted lines in FIGURE 25 and designated "(ii)." The modifying circuit consists of a differential amplifier with two tubes 490, 491 whose cathodes have a common feed resistor 492. This amplifier is similar to the amplifier in FIGURE 14 consisting of elements 252 to 256 inclusive and mentioned previously.

The potential at terminal 493 is such that the potential at the grid electrodes of tubes 490 and 491 are equal with eight current units flowing through resistor 488, i.e. the differential amplifier is in a balanced condition with zero error in the accumulator 71.

Equal resistors 494, 495 in each plate circuit of the differential amplifier produce a potential drop at each plate which is the error signal passed on to the motor amplifier designated "(iii)" in FIGURE 25.

Modification of the input signal is carried out by elements 496, 497, 498, 499, 500, connected in such a manner that they supply a feedback voltage from the plate circuit of tube 490 back to the grid electrode of the same tube.

Condenser 500 is very much smaller than condenser 499 and both are chosen so that at the middle range of frequencies, condenser 500 is virtually an open circuit and condenser 499 is a virtual short circuit. At such frequencies the gain is determined by the ratio of the sum of resistors 497 and 498 to resistor 496 in the manner described already in relation to feedback amplifier 59 in FIGURE 12.

At frequencies sensibly higher than these, the condenser 500 will have a reactance comparable with the associated resistors 497 and 498, and will introduce a phase change which can be shown mathematically (as described in the said textbook "Servo Mechanisms") to induce a phase lead of the output voltage relative to the input voltage. This phase lead as mentioned above is essential for loop stability.

At very low frequencies the reactance of condenser 499 will increase and will increase the total impedance of the arm containing elements 497, 498, 499. Thus the gain tends to increase as the component frequency decreases since the ratio of the impedances between this arm and the resistor 496 will increase.

Thus the gain will tend at very low frequencies to the open circuit gain of the differential amplifier without feedback.

The increased gain reduces positional lag at any given slide velocity as it decreases the amount of error signal needed to drive the motor at any given speed.

The signal taken from the plates of tubes 490, 491 via leads 501, 502 is the difference in potential between the two plates. Thus zero output signal occurs when the two plates are at equal potentials, and errors of either sign necessitate the plate of one tube being more positive than the other or vice versa.

The signals on leads 501, 502 are taken to the grid electrodes of triode tubes 503 and 504.

The plate circuits of these two tubes are energised by an alternating current supply 505 by means of transformer 506. Either secondary winding energises one field winding 507 or 507a of D.C. motor 508, and also supplies part of the armature current for motor 508.

The plate circuits of tubes 503, 504 conduct on alternative half cycles due to the rectifying action of the tubes.

Field windings 507, 507a are equal and are connected in an opposing manner so that with the same current flowing in each winding, zero field magnetisation is produced. The armature current is a full-wave rectified sign wave, each half cycle being contributed by alternate tubes.

Thus with a balanced input on leads 501, 502 no motor torque is produced.

An unbalance in field windings 507, 507a due to an unbalance in the input signals to the grids of tubes 503, 504 causes the motor to rotate in one direction or the other, depending on the sign of the unbalance at the input.

In this manner a motor spindle speed is obtained which is proportional to the static positional error. This is a manner of control well-known in the art of linear positioning servo mechanisms.

Condenser 509 smooths out the voltage ripple across the armature terminals of motor 508 and helps to minimize torque ripple at twice mains frequency in the motor spindle.

The paralysis gate circuit in FIGURES 14 and 22 will now be described in detail in relation to FIGURE 27.

Pulses from the magnetic tape reproducing device 68 and the photocell head 36 are received in a quasi-random manner. It is thus possible that incoming pulses from these devices may clash with the reset or add pulses which occur in a rhythmic manner in the equipment.

Any such clashing or coincidence of pulses would involve a loss of count and therefore a positioning error in the system. It would also cause trouble, if the count input were to occur in the time between the "add" (into difference accumulator 71) instruction pulses and the carry instruction pulses as a wrong augend would then be placed in the difference accumulator 71, with undesirable results.

A critical time may be defined during which pulses should not be received in the counting circuitry. This time period would start at the same time as the channel pulse, would continue during the add and carry pulses, and would finish shortly after the reset pulse. This period will be called the "paralysis period" and occurs three times per cycle. The paralysis gate circuit shown in FIGURE 27 is designed to overcome these difficulties.

This circuit performs the following functions:

During the paralysis period the counting pulses of the various channels are diverted into a delaying channel so that any pulses received during the paralysis period are delayed by a time greater than the time for which the count is diverted. In this manner a pulse which arrives during the paralysis period will be delayed until after this period has elapsed and will be counted on the next complete cycle.

This action is performed by two Unit 3 type gates 510, 511 which are set so that gate 511 is normally open and 510 is normally closed. The necessary gating signals being supplied on leads 512, 513 to the IP1 terminals of the gates from the circuitry which is described below. During the critical time, lead 512, which normally has a negative tending potential, has a positive pulse applied to it to open gate 510. At the same time, lead 513, normally positive, is supplied with a simultaneous negative pulse to close gate 511. The pulse duration is made to be the same as the critical period length.

Input pulses are received on terminal IP2 and passed via lead 514 and inverting transformer 515 to leads 516 and so to the IP2 terminals of gates 510 and 511 together.

When gate 511 is open (as it is for most of the time) a pulse received on lead 516 (from IP2) generates a pair of pulses, one positive going pulse at OP1 of gate 511 and on lead 517 and one negative going pulse at OP2 of gate 511 and on lead 518.

The pulses pass through semiconductor diodes 519 and 520. As these already have a slight forward bias which is aided by the polarity of the pulses, the diodes will conduct and outputs will appear on leads 521, and 522 simultaneously to be passed to the following accumulators for counting purposes.

During the paralysis period the gate 511 is shut and gate 510 is open. A signal pulse appearing at this time will generate a pair of opposite polarity pulses on leads 523 and 524 and these will be delayed by passing through electromagnetic delay lines 525 and 526 and out through semiconductor diodes 527 and 528 onto leads 521 and 522 as before.

The circuit is further complicated by the need to retard the leading and trailing edges of the paralysis pulse for a short while if a pulse is already in existence on the output terminals of either gate 511 or 510.

Thus if a signal pulse is already in existence on leads 517, 518 from gate 511, the negative pulse on lead 518 is fed back into the paralysis pulse-forming-circuit to "inhibit" the production of a paralysis pulse.

On the other hand, if a signal pulse pair is in existence at the outputs of gate 510 a positive pulse is applied into the paralysis pulse forming circuit to maintain the paralysis pulse until the signal pulse in question is ended.

In this manner there is no tendency for a pulse to be split by the paralysis gating circuit so as to appear as two separate pulses to be fed into the counter.

The paralysis circuitry will now be described:

The trigger pulse for the paralysis circuit is obtained from time sharing distributor 67 via lead 406 and is applied to input terminal IP1. This positive going pulse is shown in FIGURE 21 and occurs three times per cycle of time sharing distributor 67.

Lead 406 introduces this signal to the grid electrode of tube 529 via coupling condenser 530.

Tubes 529 and 530 are connected into a monostable multivibrator circuit of exactly the same type as that used in gate pulse circuit 62 shown in detail in FIGURE 18. In this case, however, the bias on the left hand tube of the pair is not obtained from a varying signal source, but from a stable negative potential source connected to terminal 532.

The values of resistors 533 and 534 are chosen in conjunction with condenser 535 to give the proper paralysis pulse duration.

The paralysis pulse appears at the plate end of resistor 536 as a positive going rectangular pulse which is applied through resistor 537 to the grid of tube 538, together with the maintaining pulse on lead 523 which is fed via coupling condenser 539 and isolating resistor 540, and the inhibiting pulse on lead 518 fed via coupling condenser 541 and isolating resistor 542.

The size of the negative going inhibiting pulse that may appear at the grid of tube 538 via lead 518 is made such that it is capable of nullifying the effect of the positive going paralysis pulse and thus is able to hold the paralysis pulse off the grid of tube 538 until the end of the inhibiting pulse.

The maintaining pulse at the grid of tube 538 is made large enough effectively to extend the paralysis pulse, should its normal duration end when a pulse is already on lead 523.

Tubes 538 and 543 are connected as a differential amplifier with a common cathode resistor 544.

The potential on terminal 545 connected to the grid of tube 543 is set so that tube 538 is just cut off and no current is flowing in plate resistor 546.

The two plate potentials are applied to potentiometer 548, 549; and potentiometer 550, 551; respectively and thence to the input terminals IP1 of gates 510 and 511, so that gate 511 is normally conducting.

The appearance of a positive going paralysis pulse at the grid of tube 538 causes the tube 538 to conduct fully and 543 to be cut off, for the paralysis period. This in turn changes the states of the gates 510, 511.

Semi-conductor diodes 527, 519 are returned to a negative potential through resistor 552 so that they are both conducting. The appearance of a positive pulse on lead 517 maintains diode 519 in conduction while diode 527 is cut off due to reverse biassing so that the signal is not fed back through delay line 525 and onto the inhibiting line 523.

Similar arrangements exist for the isolating of leads 524 and 518 where diodes 528, 520 are returned to a positive potential through resistor 533.

The various condenser arrangements (except in the case of FIGURES 8 and 9) are shown as simple two-plate arrangements, the long plate being mounted on a solid block of material. In many respects, however, it is preferable to use an optical flat for the large plate having both sides exposed. The surfaces on both sides must be flat and parallel to one another to optical standards. The smaller plate should then be duplicated so that there is one small plate facing each side of the large plate and the resulting differential condenser is connected to the co-operating electronic circuit in push pull which improved linearity.

Where the condenser plates are of insulating material (optical flats are usually made of glass) the working surfaces must be coated with a metallic or other electrically conductive layer which may be applied by cathode sputtering or any other process which accurately reproduces the optical flatness of the backing on the conducting surface.

Instead of using a capacitor displacement sensing device a voltage generating electro-mechanical transducer may be used. Such a transducer would have a stylus member making contact with an accurately flat surface parallel to the direction of relative movement of the slide along its track and any displacement of the slide transversely of the track would deflect the stylus member. In the various arrangements shown in FIGURE 1 the flat surface would be mounted in the same attitude as the larger capacitor plate and the transducer in the position of the smaller plates.

The transducer could be of the piezo-electric crystal type as used in gramophone pickups or alternatively it could comprise a strain-gauge element strained in varying degree according to the displacement of the stylus.

The correction signals require to be effective, in controlling the positioning or movement of a slide whose normal direction of movement is in line with the displacements to be corrected, at the precise instant when the displacements occur. The transducer may therefore be of a type (e.g. electro-magnetic) which only gives an output during actual movement of the stylus member but it is preferred to use a transducer which gives an output dependent on displacement since there is little difficulty in designing the associated electronic circuits so that they give the correct timing to the correction signals.

We claim:

1. Apparatus for controlling a machine tool of the type that has means for producing relative movement between a workpiece and the tool of said machine tool along two predetermined paths, a first path and a second path, which paths are at an angle to one another, and means for indicating the position along at least the first path of a first member constrained to move along that path, and means for controlling the accuracy with which said first member takes up its indicated position along said first path, comprising means for measuring displacements in the direction of the first path of a second member, said second member being nominally movable only along said second path and being so related to said first member that movements of said second member in the direction of said first path are accompanied by similar movements in said direction of said first member, means for deriving a signal varying according to the extent of such displacements of the second member, and means under control of that signal for modifying the movement of the first member along said first path to compensate for the said displacements.

2. Apparatus for controlling a machine tool of the type which has at least two slides, a first slide and a second slide, and at least two slideways, a first slideway and a second slideway, upon which machine tool the first and second slides are respectively movable along a first path and a second path substantially at right angles to the first path, so as to provide relative movement between the tool of said machine tool and a workpiece in two orthogonal directions in a plane, a first slide-moving mechanism for moving the first slide along the first path, a second slide-moving mechanism for moving the second slide along the second path, a control system for controlling at least the first slide-moving mechanism, said control system comprising means for receiving control signals characteristic of a desired relative movement between the tool and the workpiece along the first path, means for indicating the position of the first slide along the first path and slide movement control means responsive to the signal receiving means and position indicating means for controlling the first slide-moving mechanism according to the said signals, the said apparatus further comprising displacement measuring means having at least one pair of co-operating measuring elements, one element of any such pair being attached to a first part and the other element to a second part, said two parts being included in a group of parts of the machine tool which provide a mechanical linkage from and including the second slideway on the one hand to the point of contact between the tool and the workpiece on the other hand, means for measuring relative movements between the said two elements of any one of said pairs of measuring elements resulting from those relative displacements, of the machine tool parts to which the said elements are attached, which result in relative movement between the tool and the workpiece in the direction of the first path, means for generating correction signals characteristic of such relative movements between the said elements of the said one pair of measuring elements and means for applying those signals to the said control system associated with the first slide to modify the effect of the control signal receiving means and the position indicating means to the extent and in the sense required to compensate for the said displacements.

3. Apparatus as claimed in claim 2 comprising second displacement measuring means having at least one pair of co-operating measuring elements, one element of any such pair being connected to a first part and the other element to a second part, said two parts being included in a group of parts of the machine tool which provide a mechanical linkage from and including the first slideway on the one hand to the point of contact between the tool and the workpiece on the other hand, means for measuring relative movements between the said two elements of any one of said pairs of measuring elements resulting from those relative displacements of the machine tool parts to which the said elements are attached, excluding bodily displacements of the first slide along the first slideway, which result in relative movement between the tool and the workpiece in the direction of the first path, means for generating correction signals characteristic of such relative movements between the said elements of the said pair of measuring elements and means for applying those signals to the said control system associated with the first slide to modify the effect of the control signal receiving means and the position indicating means to the extent and in the sense required to compensate for the said displacements.

4. Apparatus as claimed in claim 3 in which the displacements between the said parts of the machine tool which provide a mechanical linkage from and including the first slideway to the point of contact between the tool and the workpiece, are rotational displacements other than the rotation of a tool-carrying spindle in bearings and in which the displacement measuring means comprises two pairs of measuring elements, the pairs being spaced apart along the direction of the first path and one element of each pair being attached to each of the said relatively movable parts of the machine tool, means for generating two sets of correction signals, one set of signals being characteristic of relative movements between the elements of one pair of measuring elements and the other set of correction signals being characteristic of relative movements between the elements of the other pair of measuring elements, means for continuously comparing the two sets of signals and deriving from the difference between the two sets of signals a combined signal characteristic of the angle of the said rotational displacement and means for applying the combined signal to the control system associated with the first slide to modify the effect of the control signal receiving means and the position indicating means to the extent and in the sense required to compensate for the said rotational displacements.

5. Apparatus as claimed in claim 4 having means whereby the extent to which the said rotational displacements cause relative movements between the tool and the workpiece in the direction of the first path is maintained dependent upon the relative position between the tool and the workpiece in a direction normal to the axis about which the said rotational displacements take place and means for measuring the relative position between the tool and the workpiece in the said normal direction and means for modifying the effect of the said combined signal on the said control system to the extent and in the sense necessary to compensate for the said effect of changes in the relative positions of the tool and the workpiece in the said normal direction.

6. Apparatus as claimed in claim 4 having means for combining a plurality of correction signals relating to corrections to be made in the same path so as to form a single correcting signal.

7. Apparatus as claimed in claim 2 in which any one of said pairs of measuring elements comprises at least two electrically conducting plates one fixed to one of two relatively movable parts of the said machine tool and the other plate to the other part, one of such plates being larger than the other and the two being mounted with opposed flat surfaces spaced apart from one another, in attitudes such that the area of one of such surfaces opposite the other remains unchanged for all positions of relative movement of the said two parts of the machine tool, and such that the spacing between the surfaces changes on the occurrence of the displacement to be measured, the said flat surfaces being of electrically conducting material so as to form an electrical condenser.

8. Apparatus as claimed in claim 7 in which the correction signal generating means comprises an electronic oscillator having a tuning circuit to which the said condenser is connected as a tuning element to vary the oscillation frequency on variation of the capacity of the said condenser, and means for generating a signal varying in degree and sign in accordance with changes in the capacity of the said condenser.

9. Apparatus as claimed in claim 7 in which an additional smaller plate is mounted adjacent said larger plate, so as to form two condensers each connected as a tuning element of a separate electronic oscillator and provided with means for continuously measuring the difference between the frequencies of the two oscillators to indicate the angle of a rotational displacement in a plane bisecting all the plates.

10. Apparatus as claimed in claim 1 in which the displacement measuring means comprises a first electrically conducting plate mounted to move with a first part of the machine tool between the track on which a slide is movable and the point of contact between the tool and the workpiece and a second electrically conducting plate mounted upon a second part of the machine tool which is between the first part and the track upon which the said other slide is movable, the said first and second plates being in planes parallel to one another and to the track last mentioned and of such sizes that the area of one plate facing the other is substantially constant for all positions of the said other slide upon the said track, the said plates being spaced apart so as to form an electrical condenser the capacity of which varies according to displacements of the first part relative to the second part in directions transverse to the said track.

11. Apparatus for controlling a machine tool comprising means for supplying control signals representing a relative movement required to take place between two relatively movable parts of the machine tool intervening between the fixed body of the machine tool and the point of contact between a tool and a workpiece, means for producing relative movements between the said two parts, control means for the movement producing means, means for applying the control signals to the control means, means for indicating the relative position of and movements between the said two parts and generating monitoring signals corresponding to such position and movements, means for applying such signals to the said control means to complete a servo control loop regulating the response of the movement producing means to the control signals, means for measuring displacements occurring between any two points on the machine tool between the fixed body thereof and the point of contact between the tool and the workpiece, which are not included in the said control loop, means for generating correction signals representing such displacements and means for applying the correction signals to the control means to modify the operation of the control loop and the response of the movement producing means by an amount corresponding to the said displacements.

12. Apparatus as claimed in claim 11 in which the indicating means comprises a long graduated element and a short indexing element mounted on each of the said two parts and in which the means for applying the correction signals to the control means comprises a resilient mounting for one of such elements and electro-mechanical transducer means to which the correction signals are applied and which is mounted so as to move the said element on its resilient mounting along the axis of relative movement between the said two parts.

References Cited in the file of this patent
UNITED STATES PATENTS

| | | |
|---|---|---|
| 2,492,731 | Branson | Dec. 27, 1949 |
| 2,837,707 | Stokes | June 3, 1958 |